US012800354B2

(12) United States Patent
Sun et al.

(10) Patent No.: US 12,800,354 B2
(45) Date of Patent: Nov. 17, 2026

(54) STRETCHABLE FABRIC SENSOR, WEARABLE ELECTRONIC DEVICE INCLUDING THE SAME, AND METHOD OF MAKING THE SAME

(71) Applicant: Yale University, New Haven, CT (US)

(72) Inventors: Huanbo Sun, Beijing (CN); Rebecca Kramer-Bottiglio, Hamden, CT (US); Lily Behnke, New Haven, CT (US)

(73) Assignee: Yale University

( * ) Notice: Subject to any disclaimer, the term of this patent is extended or adjusted under 35 U.S.C. 154(b) by 208 days.

(21) Appl. No.: 18/890,914

(22) Filed: Sep. 20, 2024

(65) Prior Publication Data

US 2025/0102327 A1 Mar. 27, 2025

Related U.S. Application Data

(63) Continuation-in-part of application No. 18/718,839, filed as application No. PCT/US2023/032593 on Sep. 13, 2023.

(60) Provisional application No. 63/406,925, filed on Sep. 15, 2022.

(51) Int. Cl.

| | |
|---|---|
| ***G01D 5/241*** | (2006.01) |
| ***A41D 13/12*** | (2006.01) |
| ***G01D 18/00*** | (2006.01) |
| ***H01B 5/14*** | (2006.01) |
| ***H01B 13/008*** | (2006.01) |

(52) U.S. Cl.
CPC ....... *G01D 5/2417* (2013.01); *A41D 13/1281* (2013.01); *G01D 18/00* (2013.01); *H01B 5/14* (2013.01); *H01B 13/008* (2013.01); *A41D 2500/10* (2013.01); *A41D 2500/20* (2013.01); *A41D 2500/50* (2013.01)

(58) Field of Classification Search
USPC ........................................................ 324/661
See application file for complete search history.

(56) References Cited

U.S. PATENT DOCUMENTS 11,559,438 B2 1/2023 Hunt et al.
2018/0029290 A1* 2/2018 Bottiglio ................. H05K 1/16

FOREIGN PATENT DOCUMENTS

| | | | |
|---|---|---|---|
| CN | 117516765 | A | 2/2024 |
| JP | 2021502845 | A | 2/2021 |
| WO | 2014204323 | A1 | 12/2014 |
| WO | 2019167744 | A1 | 6/2019 |

* cited by examiner

*Primary Examiner* — Farhana A Hoque
(74) *Attorney, Agent, or Firm* — Carmody Torrance Sandak & Hennessey LLP

(57) ABSTRACT

A stretchable fabric garment for human motion capture that incorporates one or more stretchable fabric sensors and/or textile sensor units, a method of making a textile sensor unit and a method of making the stretchable fabric garment including the one or more stretchable fabric sensors and/or textile sensor units. The stretchable fabric sensors and/or textile sensor unit can be integrated into everyday clothing to measure human motions. The stretchable fabric sensors and/or textile sensor units are made of thin layers of breathable fabrics and exhibit high strains, excellent cyclic stability, and high water vapor transmission rates, which allows for sweat evaporation.

19 Claims, 40 Drawing Sheets

| Fabric | Courses per inch | Wales per inch | Diameter of the fibers (μm) | Thickness (mm) | | Normalized weight (g/m²) | |
|---|---|---|---|---|---|---|---|
| | | | | Bare | Laminated | Bare | Laminated |
| Conductive | 48 ± 0.0 | 52 ± 0.0 | 12.6 ± 0.6 | 0.45 ± 0.004 | 0.47 ± 0.017 | 161.2 ± 5.37 | 196.9 ± 5 26 |
| Nylon | 88 ± 2.6 | 69.5 ± 1 | 22 ± 0.4 | 0.53 ± 0.000 | 0.54 ± 0.005 | 232.8 ± 0.69 | 270.9 ± 0.69 |
| Polyester | 82 ± 3.6 | 46 ± 1.6 | 13.2 ± 1.3 | 0.74 ± 0.008 | 0.75 ± 0.013 | 325.2 ± 3.7 | 360.8 ± 3.7 |
| Cotton | 60 ± 2.3 | 42 ± 0.0 | 19.4 ± 3.3 | 0.55 ± 0.008 | 0.56 ± 0.009 | 182.6 ± 0.69 | 213.6 ± 2.02 |

STRETCHABLE FABRIC SENSOR, WEARABLE ELECTRONIC DEVICE INCLUDING THE SAME, AND METHOD OF MAKING THE SAME

CROSS-REFERENCE TO RELATED APPLICATIONS

The present application is a continuation-in-part of U.S. application Ser. No. 18/718,839 filed on Jun. 12, 2024, which is a national stage application of PCT/US2023/032593 filed on Sep. 15, 2023, which claims the benefit of U.S. Provisional Application No. 63/406,925 filed on Sep. 15, 2022, the subject matter of each of which is herein incorporated by reference in its entirety.

STATEMENT OF FEDERALLY SPONSORED RESEARCH

This invention was made with government support under IIS-1954591 awarded by the National Science Foundation. The government has certain rights in the invention.

FIELD OF THE INVENTION

The present invention relates generally to a stretchable fabric garment for human motion capture that incorporates one or more fabric capacitive strain sensors and/or textile sensor units. The fabric capacitive strain sensors are and textile sensor units are made of thin layers of breathable fabrics and exhibit high strains, excellent cyclic stability, and high water vapor transmission rates.

BACKGROUND OF THE INVENTION

In recent years, a growing interest in wearable electronic devices has turned continuous health monitoring into an achievable and mainstream concept, with revolutionary implications for human health, safety, and performance. While wearable commercial devices currently allow users to monitor physiological data such as heart rate, skin conductance, and respiration patterns, there remain a need for noninvasive human motion monitoring systems capable of capturing the body strains involved in everyday activities. In addition, there also remains a need for noninvasive human motion monitoring systems that are more comfortable for the user and can be used in a home or clinic environment for real-time diagnosing and/or monitoring of conditions such as sleep-based movement disorders (i.e., limb movement disorders, restless leg syndrome, REM-sleep behavior disorder, etc.) and other chronic conditions, and that can also be used for post-op recovery and remote health monitoring.

In situ collection of human motion data is crucial for advancing the current state of a broad range of disciplines including human-robot interactions, virtual reality, sports performance, and personalized health monitoring and rehabilitation. Most commonly, human motion data is collected via use of optical, electromagnetic (EM), and inertial measurement unit (IMU) motion capture systems. Although optical motion capture systems, consisting of multiple cameras oriented around a subject, are broadly considered the gold standard for high accuracy, these systems are susceptible to measurement errors and loss of analyzable data due to occluded lines of sight. Such setups limit the spatial volume of the analysis and necessitate controlled laboratory environments.

Optical systems, such as Vicon or Motion Analysis, are known for their high accuracy and rely on multiple cameras empirically placed around a subject within a confined laboratory space. The labor-intensive process of labeling markers and the potential for data loss due to visual occlusion detract from their practicality compared to more portable options like EM. EM systems utilize electromagnetic receivers positioned at various body joints to capture signal from a stationary base station, enabling the determination of joint positions and orientations. Although providing greater flexibility than optical systems, they are sensitive to electromagnetic interference and reliance on sensor distances to the base and pose variety for accuracy. IMU systems, like Xenoma e-skin MEVA, use gravity and inertia as reference to measure accelerations and rotations of body parts. While IMU systems provide versatility across environments and do not require external signal references like EM, they are susceptible to transient mechanical vibrations and positional drift over time. Additionally, optical markers, EM sensors, and IMUs typically come in rigid, less user-friendly forms. An ideal motion capture system would combine the accuracy of optical systems with portability of EM, and environmental adaptability of IMU systems. It should also be unrestricted by surroundings, compliant to body, and capable of providing accurate whole-body joint measurements.

In contrast, electromagnetic motion capture systems employ sensors that provide measurements without requiring lines of sight. However, this method is limited to use in controlled settings because electromagnetic interference from the surrounding environment can lead to measurement errors.

Like electromagnetic motion capture sensors, IMUs can be mounted onto the subject and provide measurements using only the onboard gyroscope and accelerometer. While the use of IMUs is not limited to controlled laboratory settings, they exhibit positional drift in long-term measurements and are typically made of rigid components, which limit user comfort.

The development of soft strain sensors has shown promise for circumventing the existing challenges of traditional motion capture systems and enabling unobtrusive integration of human motion monitoring. Typically, such soft strain sensors employ conductive composites with fillers such as carbon black, carbon nanotubes, metallic nanoparticles, silver nanowires, graphene, liquid metals, and/or ionic fluids to create electrodes. Silicone-based elastomers such as polydimethylsiloxane (PDMS), biodegradable compostable elastomers (a commercial product of which is available from Eco-Flex under the tradename Ecoflex®), and high performance silicone rubbers (a commercial product of which is available from Smooth-On, Inc. under the tradename Dragon Skin™) usually serve as both insulating host materials and highly stretchable substrates. The use of such compliant materials allows soft sensors to conform to curvilinear surfaces (e.g., elbows, knees) and withstand the everyday skin deformations of human joints (in the range of 40%-55% strain) without impeding natural motion.

Most soft strain sensors transduce uniaxial mechanical deformation into a change in either electrical resistance or capacitance. Resistive strain sensors have demonstrated higher sensitivities than capacitive strain sensors overall, but many also show limited electromechanical robustness, hysteresis, and low sensing stability due to crack formation and mechanical damage at high strains. Since the sensor response of most capacitive sensors relies on the overlapping area of electrodes, capacitive sensors generally show more linear and stable behavior, both of which are particularly important in human motion monitoring.

Although there are many capacitive strain sensors known in the art, there remain several key ongoing challenges in the field regarding breathability, maximum measurement frequency, and sensor-garment integration. Based thereon, it would be desirable to provide a stretchable fabric garment or other wearable device that encompasses one or more wearable capacitive sensors that addresses these identified limitations.

Wearable strain sensors for movement tracking are a promising paradigm to improve clinical care for patients with neurological or musculoskeletal conditions, with further applicability to athletic wear, virtual reality, and next-generation game controllers. Clothing-like wearable capacitive strain sensors can support these use cases, as the fabrics used for clothing are generally lightweight and breathable, and interface with the skin in a manner that is mechanically and thermally familiar.

Physiological data captured by wearable devices offers multifaceted insights into various bodily functions, including heart rate, respiration rate, pulse oximetry, sweat, and body temperature. However, it is important to note that both physical and mental activities influence sensor readings, such as an increase in heart rate. Decoupled sensing presents an opportunity for more targeted applications. Specifically, analyzing human whole-body motion behavior data derived from physical activities can yield a diverse range of insights, spanning health, performance, entertainment, and social interactions. This data can be instrumental in healthcare applications by monitoring daily activity levels, identifying irregular movement patterns, and tailoring personalized treatment plans and interventions.

Moving beyond mere exercise tracking and goal-setting for fitness and wellness, leveraging detailed distributed body parts can optimize sport training programs, mitigate injury risks, and enhance performance analysis. The development of intuitive, user-friendly interfaces is crucial, especially in integrating gesture-based virtual reality systems and augmented reality applications. Such interfaces can significantly enhance user experience and interaction, extending their applications in rehabilitation and the creation of assistive exoskeleton technologies for individuals with disabilities or mobility impairments. Furthermore, whole-body motion behavior data is also valuable for studies in psychology, biomechanics, neuroscience, and robotics, facilitating investigations into human movement behaviors, cognition, and social interactions.

Despite the prevalence of elastomer-based sensors, such sensors compromise thermophysiological and skin sensorial comfort due to the low air permeability and water vapor transmission of elastomers. Recently, the use of fabrics to improve sensor comfort has been explored. For example, a soft parallel-plate capacitor constructed using conductive fabric as electrodes and a silicone layer as the dielectric material has been introduced (A. Atalay et al., "Composite Capacitive Strain Sensors for Human Motion Tracking," Advanced Materials Technologies, Vol. 2, 1700126 (2017). Although this sensor uses fabric as the outer exposed (conductive) layers, the internal silicone dielectric layer limits the overall breathability of the sensor. Another capacitive sensor (Park et al., "Sim-To-Real Transfer Learning Approach for Tracking Multi-DOF Ankle Motions Using Soft Strain Sensors," IEEE Robotics and Automation Letters, Vol. 5, No. 2, pp. 3525-3532, April 2020) uses silicone to bind fabric layers such that fabrics serve as both the electrode and dielectric materials. In both of these works, as well as most wearable electronics and sensor literature, the breathability of the sensor materials was not characterized.

Resistive sensors operate based on a simple increase in electrical resistance with increasing strain (and corresponding decreasing cross-sectional area). Because the output is simple resistance (or voltage), the signal conditioning is relatively easy. The major issue with resistive sensors, especially for high-strain applications, is the coupling between the electrical and mechanical material behaviors. All elastic materials (needed for high strains) show non-linear stress versus strain dependencies and mechanical hysteresis, and these characteristics result in non-linear resistance vs strain dependencies and electrical hysteresis for resistive sensors. Furthermore, resistive fabric sensors tend to be especially sensitive to the shifting contacts between individual fibers in the fabric, which means a constantly changing the electrical pathway through a conductive fabric sensor.

Capacitive sensors operate via a changing capacitance between two electrodes separated by a dielectric material, which decreases in thickness with increasing strain, thus bringing the electrodes closer together with increasing strain or further apart with decreasing strain. The output is capacitance, which needs to be transduced into a voltage, and therefore the signal conditioning circuits are more complex. However, capacitive sensors decouple the mechanical and electrical behaviors. So, while elastic capacitive sensors still show nonlinear mechanical behavior and hysteresis, the electrical behavior is typically linear and shows no hysteresis. This linearity and lack of hysteresis is one of the main advantages of capacitive sensors.

In addition, capacitive sensors are made up of multiple layers that must be well-bonded. However, fabric layers do not inherently bond to one another and stacked layers of unaltered fabric have a tendency to easily slide over one. Researchers have responded to this challenge by using silicones or other adhesives as the dielectric layer, which enables good bonding between two conductive fabric electrodes. However, by using silicone layers in the sensor, it is no longer fully fabric. That is, while the surface may still feel like a fabric, making it soft and familiar to the touch, the sensor component will not have air permeability or a water vapor transmission rate (WVTR) that meets the standard of wearability.

SUMMARY OF THE INVENTION

The inventors of the present invention have developed a fully fabric capacitive sensor and a textile sensor unit that use a porous, breathable fabric adhesive to bond the fabric electrode and dielectric layers and that is adhered to, integrated into, or otherwise coupled with a wearable device such as a flexible fabric garment. In addition, the fabric capacitive sensors and textile sensor units described herein are designed to meet the air permeability and WVTR requirements of wearable electronic devices, including flexible fabric garments.

It has been established that electrode resistance can affect the maximum frequency at which capacitance can be accurately measured, with characteristic frequencies around 5 kHz. However, as described herein, the inventors of the present invention have discovered that it is possible to achieve stable capacitance measurements up to 1 MHz using microcontrollers such as single-board microcontrollers (i.e., standard plug and play Arduino or similar hardware) in combination with the fabric capacitive sensors and textile sensor units described herein. The fidelity of the sensor response at high frequencies indicates its suitability for broader translation into soft robotics applications.

Continuous enhancements in wearable technologies have led to several innovations in the healthcare, virtual reality, and robotics sectors. One form of wearable technology is wearable sensors for kinematic measurements of human motion. However, measuring the kinematics of human movement is a challenging problem as wearable sensors need to conform to complex curvatures and deform without limiting the user's natural range of motion. In fine motor activities, such challenges are further exacerbated by the dense packing of several joints, coupled joint motions, and relatively small deformations.

The present invention utilizes a plurality of entirely textile-based sensor units with the aim of creating a wearable device such as a stretchable fabric garment that seamlessly covers one or more body joints, accurately reconstructs joint movements, and extracts meaningful data on human motion patterns and behaviors. The present invention develops an accurate, customizable, comfortable, portable, washable, and affordable stretchable fabric garment that encompass a full-body suit or a portion thereof and is capable of seamlessly capturing daily whole-body motions and deriving insightful information to comprehend human behavior.

In one embodiment, a customizable stretchable fabric garment can be created for an individual. This involves the following steps:

a. determining direction and placement of one or more textile sensors units on the stretchable fabric garment;
b. marking the placement of the one or more textile sensor units determined in step a) on the stretchable fabric garment;
c. adhering one or more textile sensor units to the stretchable fabric garment; and
d. constructing wearer body position using sensor data obtained from the one or more textile sensor units.

Using this process, an optimized stretchable fabric garment can be produced that is equipped with a plurality of capacitive strain sensors or textile sensor units covering one or more whole-body joints along with their respective degrees of freedom (DoFs).

In one embodiment and as further described herein, to ensure wearer comfort, stretchable, breathable, washable, conductive fabric, including the same material as used in the sensor unit, may be used as conductive interconnects to connect all sensors to a central data acquisition (DAQ) board.

Portability can be achieved by customizing a DAQ with an onboard microprocessor and power supply to read all of the sensors of the stretchable fabric garment and transmit the sensor readings to an external computer via a wireless technology standard such as a Bluetooth communication protocol.

Soft capacitive strain sensors and textile sensor units as described herein are composed of conductive composites and flexible substrates to form an electromechanical structure, functioning as either resistors or capacitors to measure body stretch and joint bending. Stretchable fabric materials exhibit favorable properties and suitability due to their breathability, body compliance, affordance, and accessibility.

As described herein, a strain sensor crafted entirely from conductive and non-conductive fabrics, bound together with a breathable thermoplastic fabric adhesive demonstrates homogeneous and stable sensing performance over a large strain (~90%).

The design, fabrication, and characterization of a stretchable fabric garment in the form of a thin, breathable sensing glove capable of reconstructing fine motor kinematics is also described. The fabric glove features capacitive sensors made from layers of conductive and dielectric fabrics, culminating in a non-bulky and discrete glove design.

Wearable systems invite tangible interactions with robots in contexts such as virtual reality (VR), augmented reality (AR), and teleoperation. Recent developments in wearable technology have incorporated soft sensing mechanisms for kinematic measurements. However, human motion invokes challenges associated with complex curvatures and form factors to which rigid systems do not comply. Capacitive strain sensors and textile sensor units present a promising solution for the challenges associated with measuring human kinematics due to their deformability and robustness under strain. Notwithstanding the advantages of such sensors, fine motor joints present unique challenges for kinematic estimation due to their small angular displacements, coupled joint motions, and number of joints in close proximity.

Many sensing gloves have been designed for applications ranging from VR to robotics. However, current solutions include bulky mechanical components and complex wiring systems that impede motion and cause discomfort. Other gloves include elastomer-based sensors that prevent the overall breathability and washability of the glove. A wearable sensing glove made entirely of fabrics to minimize the amount of material required for sensing, while maintaining properties traditional to garments is desired.

Fabric-based electronics also allow for the tight coupling of technology into traditional garments. As described in detail herein, fabric-based strain sensors can be easily integrated into garments while maintaining properties native to fabrics, including breathability and washability.

While fabric-based technologies have been implemented toward fine motor motion monitoring, limitations in fabric-based sensing gloves still remain with respect to the quantification of accuracy, minimalistic design, and the conservation of properties inherent to textiles. The fabrication process of a fabric sensing glove and the glove's ability to accurately estimate joint angles compared to ground truth from a motion capture system is described herein. The use of the fabric sensor in a stretchable fabric garment in the form of a glove improves upon current solutions that include bulky, cumbersome, and uncomfortable components.

It is an object of the present invention to provide a fabric capacitive strain sensor.

It is another object of the present invention to provide a fabric capacitive strain sensor for integrating into stretchable fabric garments and other wearable devices.

It is another object of the present invention to provide a fabric capacitive strain sensor that is breathable.

It is another object of the present invention to provide a fabric capacitive strain sensor that meets the air permeability and water vapor transmission rate requirements of stretchable fabric garments and other wearable devices.

It is yet another object of the present invention to provide a fabric capacitive strain sensor or textile sensor unit to measure human motion when contained within a stretchable fabric garment or other wearable device.

To that end, in one embodiment, the present invention relates generally to a stretchable electronic sensor or textile sensor unit, wherein the stretchable electronic sensor or textile sensor unit comprises:

two or more stretchable fabric electrodes separated by at least one stretchable dielectric layer, wherein the two or more stretchable fabric electrodes are secured to the at least one dielectric layer with two or more adhesive layers.

In another embodiment, the present invention also relates generally to a stretchable electronic sensor or textile sensor unit, wherein each stretchable electronic sensor or textile sensor unit comprises, in order:

a first outer stretchable conductive fabric layer;
a first inner stretchable dielectric layer;
an inner stretchable conductive fabric layer;
a second inner stretchable dielectric layer; and
a second outer stretchable conductive fabric layer;
wherein an adhesive layer is sandwiched between each of the layers of the stretchable electronic sensor, wherein the adhesive layer comprises an adhesive film, and wherein the layers of the stretchable electronic sensor or textile sensor unit are joined together to form the stretchable electronic sensor or textile sensor unit.

The present invention also relates generally to a wearable electronic device comprising one or more stretchable electronic sensors or textile sensor units described herein, wherein the wearable electronic device comprises a stretchable garment,
wherein the stretchable garment comprises an outer surface and an inner surface;
wherein the one or more stretchable electronic sensors are coupled to or integrated into the stretchable garment at a location where it is desirable to monitor motion of a user.

In one embodiment, the stretchable garment itself comprises one of the first inner stretchable dielectric layer or the second inner stretchable dielectric layer of the one or more stretchable electronic sensors; and one of the first outer stretchable conductive fabric layer and the second outer stretchable conductive layers is contactable with the user's skin.

In another embodiment, the textile sensor unit is formed separately from the stretchable fabric garment and is adhered to or otherwise coupled with the stretchable fabric garment at one or more locations where it is desirable to measure motion of a wearer, such as one or more major joints of the body.

BRIEF DESCRIPTION OF THE FIGURES

Features and aspects of embodiments are described below with reference to the accompanying drawings, in which elements are not necessarily depicted to scale, and in certain views, parts may have been exaggerated or removed for purposes of clarity.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1:
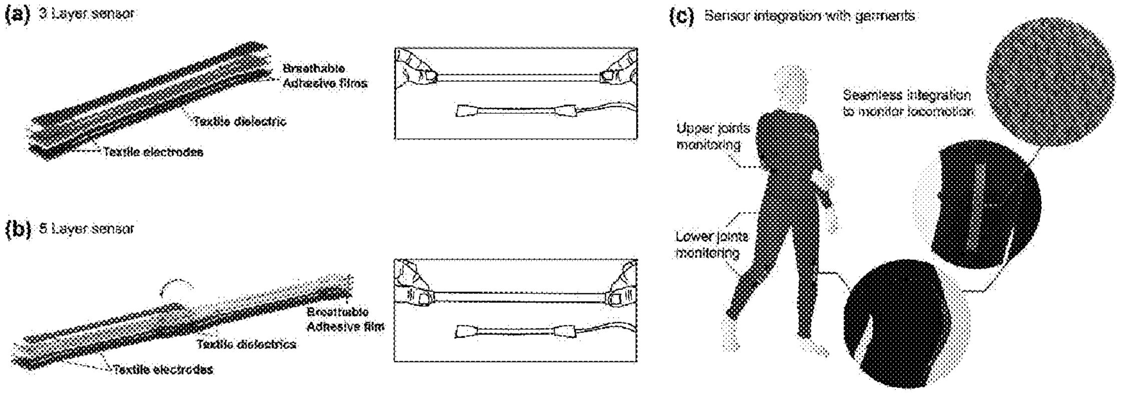

To assist those of ordinary skill in the art in making and using the disclosed assemblies, systems and methods, reference is made to the appended figures, wherein:

FIG. 1 depicts the overview of the fabric sensor in which (a) the fabric sensor has a three-layer construction, (b) the fabric sensor has a five-layer constructure, and (c) where the fabric sensors are integrated into garments for human motion monitoring.

Figure 2:
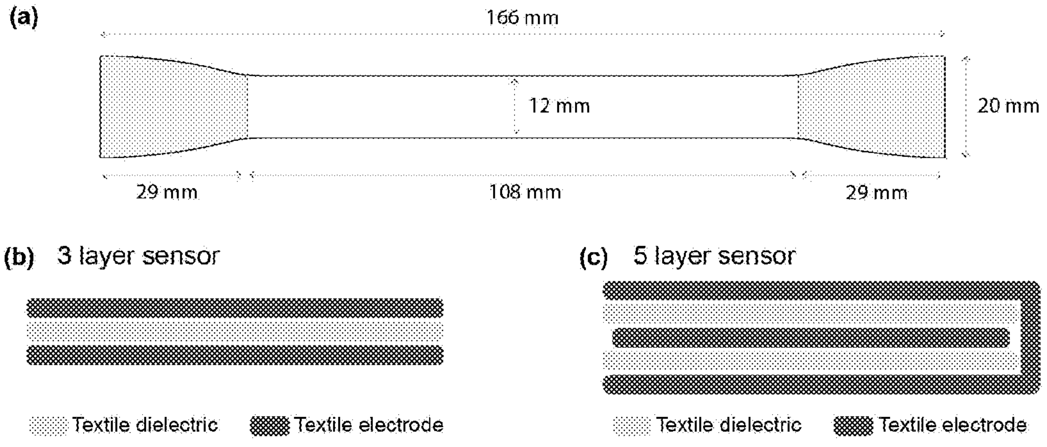

FIG. 2A depicts dimensions of one example of a dog-bone shaped sensor in accordance with the present invention. FIGS. 2B and 2C depicts schematic representations of 3- and 5-layers of the sensors.

Figure 3:
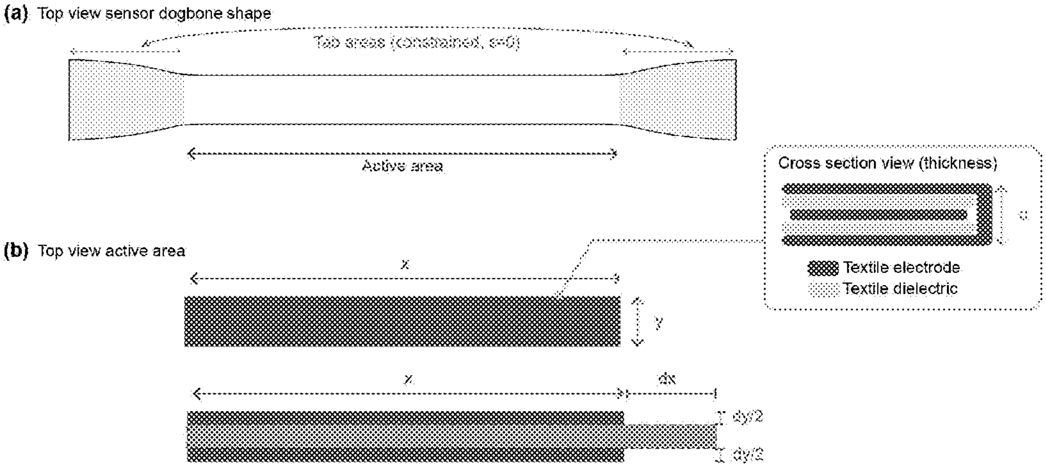

FIG. 3A depicts another view of the dog-bone shaped sensor of the present invention and FIG. 3B depicts changes in the sensor dimension during tensile stretch, resulting in a measurable change in capacitance.

Figure 4:
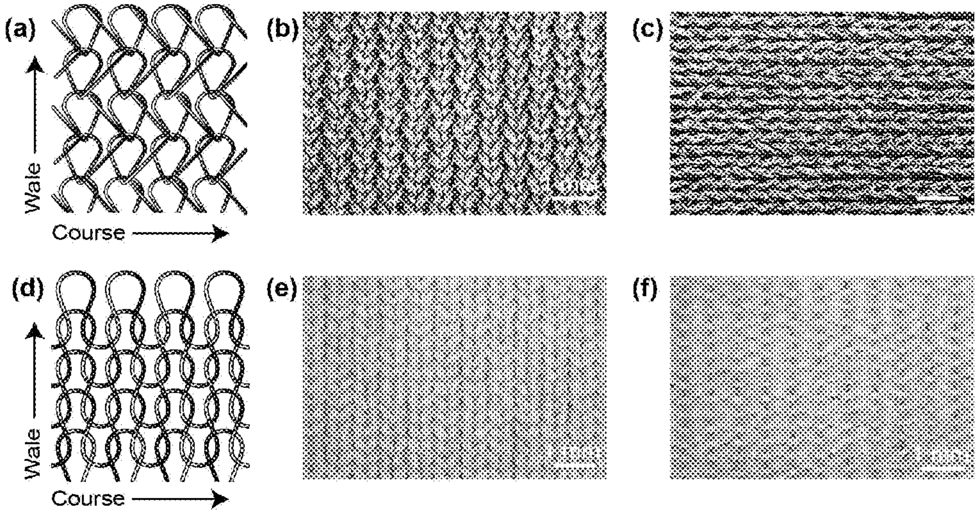

FIG. 4A depicts a schematic image of a warp-knit tricot structure conductive fabric along with optical images of the front and back of the conductive fabric. Both the conductive fabric and the dielectric nylon fabric exhibit a warp-knit tricot structure, which is textured on one side and smooth on the other. FIG. 4B depicts a schematic image of a weft-knit jersey structure conductive fabric along with optical images of the front and back of the conductive fabric. Both polyester and cotton fabrics exhibit a weft-knit jersey structure, where each loop in the vertical direction is "hung" on top of the previous loops in the horizontal direction.

Figure 5:

FIG. 5 depicts SEM images of a pristine adhesive film in accordance with the present invention.

Figure 6:
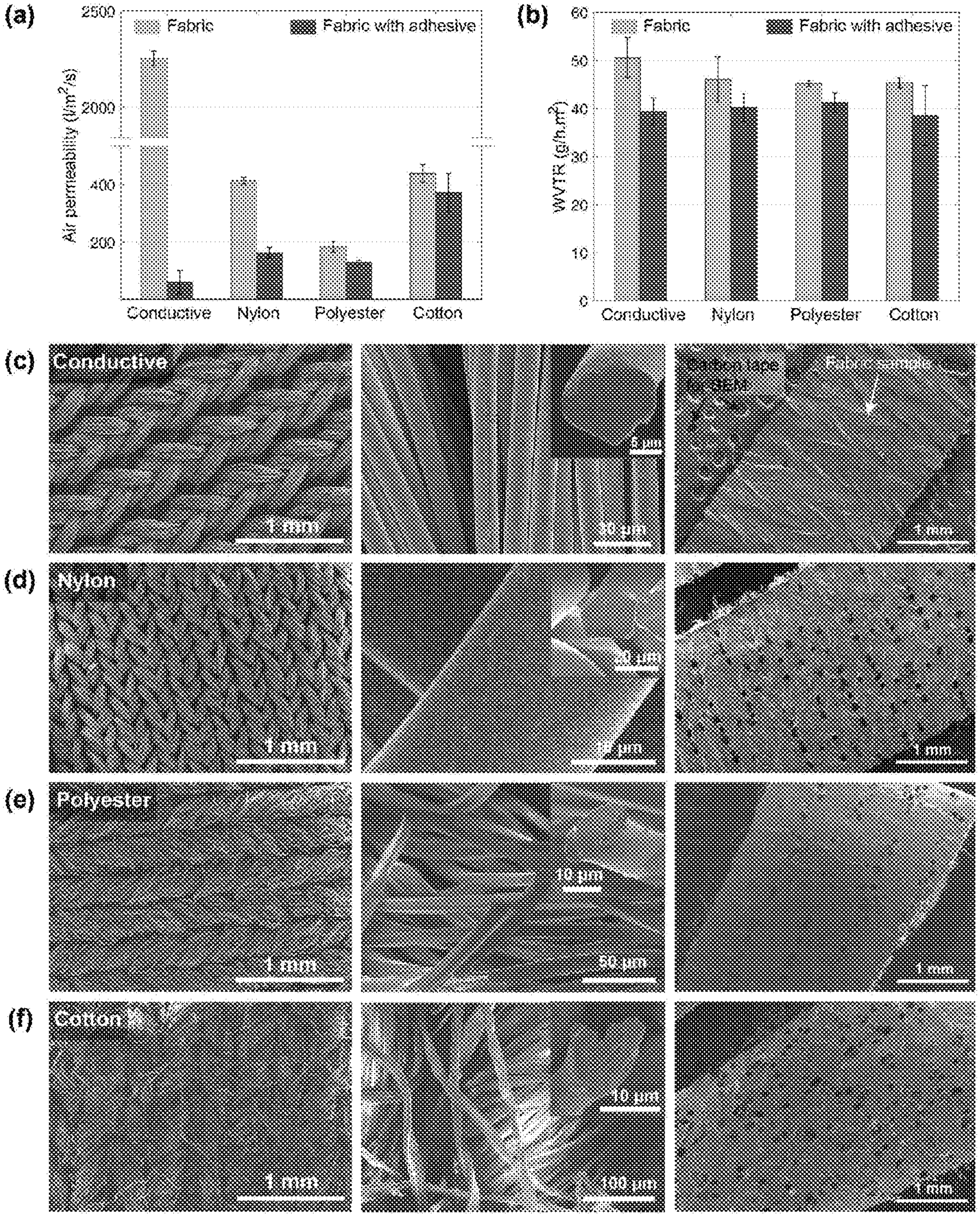

FIGS. 6A-6F depict sensor material breathability and morphology characteristics of various conductive fabrics in accordance with the present invention. FIGS. 6A and 6B depict air permeability and water vapor transmission rate of bare and laminated fabrics (i.e., fabrics coated with the adhesive). An average of three samples is shown for each. FIGS. 6C-6F depict SEM images of conductive nylon, nylon, polyester, and cotton fabrics and, from left to right, the front side of the bare fabrics, fiber morphologies, and laminated fabrics.

Figure 7:
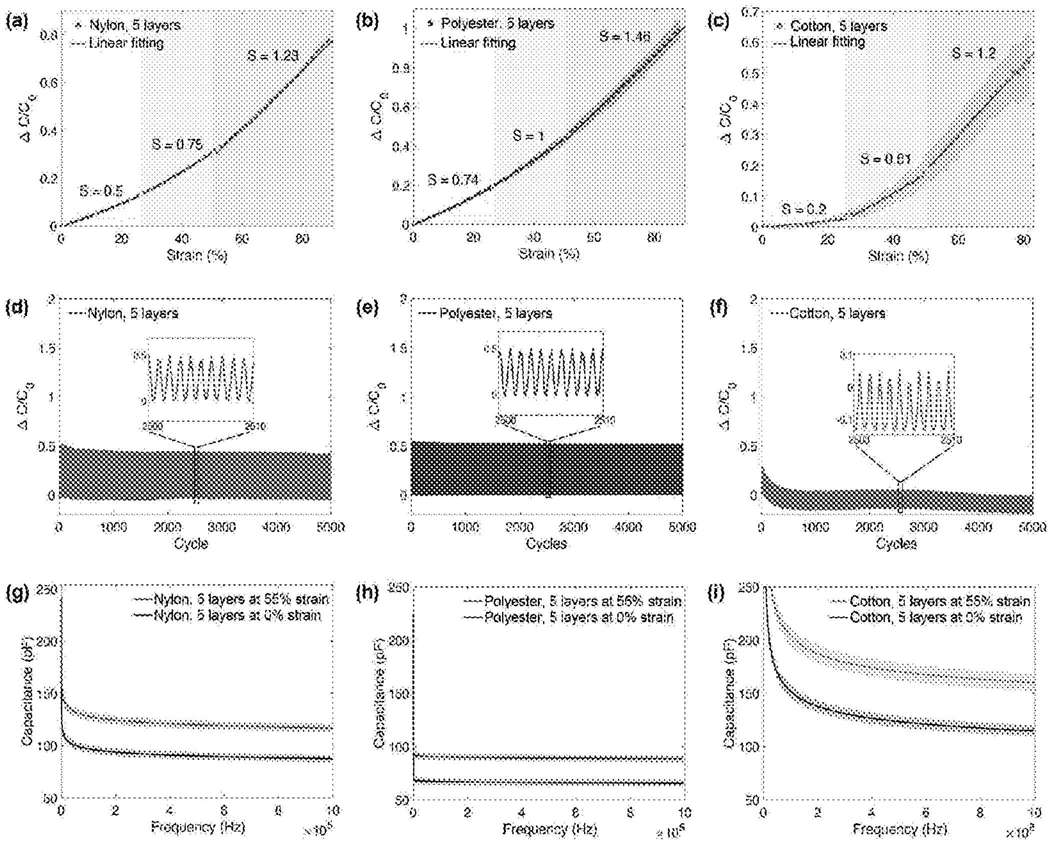

FIGS. 7A and 7B depict electromechanical characterizations of five-layer fabric sensors. FIG. 7A depicts the average relative change in capacitance as a function of strain for five sensors with dielectric nylon, polyester, and cotton, and three sensitivity regimes are shown. FIG. 7B depicts 5000 strain cycles to ≈60% for a representative sensor with dielectric for nylon, polyester, and cotton. FIG. 7C depicts the average change in capacitance as a function of frequency for five sensors with dielectric nylon, polyester, and cotton.

Figure 8:
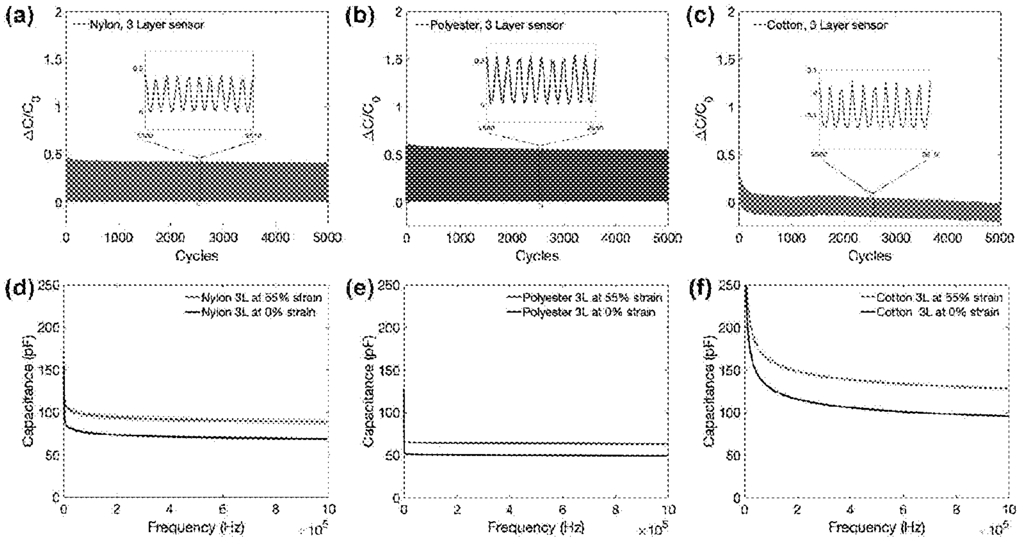

FIGS. 8A and 8B depict electromechanical characterizations of three-layer fabric sensors. FIG. 8A depicts the cyclic stability of a representative 3-layer sensor with dielectric nylon, polyester, and cotton. FIG. 8B depicts the average change in capacitance as a function of frequency for five 3-layer sensors with dielectric nylon, polyester, and cotton.

Figure 9:
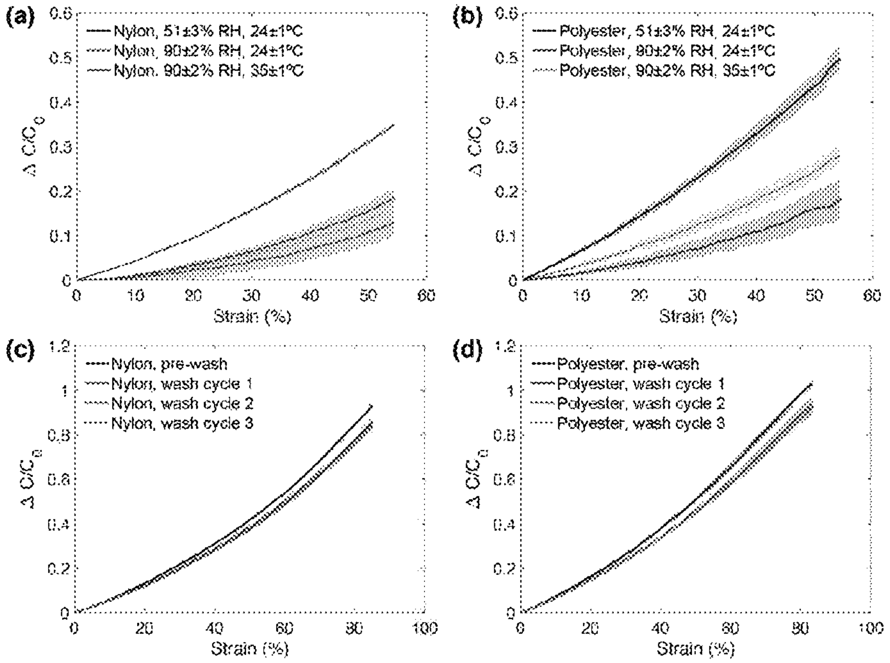

FIGS. 9A and 9B depict the effect of temperature, humidity, and washing on the electromechanical response of five-layer sensors. FIG. 9A depicts the average relative change in capacitance as a function of strain, under varying temperatures and humidities, for five-layer sensors with dielectric nylon and polyester. FIG. 9B depicts the effect of washing on the electromechanical response of five-layer sensors with dielectric nylon and polyester.

FIGS. 10A-10E depicts a sensory smart garment capable of monitoring the movement of body joints. FIG. 10A shows the sensor placement on the knees, elbows, and hips of the garments. FIGS. 10B-10E depict photographs and capacitance responses of the sensors during the following human motions: FIG. 10B squats (10 cycles), FIG. 10C sit-to-stand cycles (10 cycles), FIG. 10D step-ups (10 cycles), FIG. 10E retrieving an object from the floor (2 cycles).

Figures 10, 11:
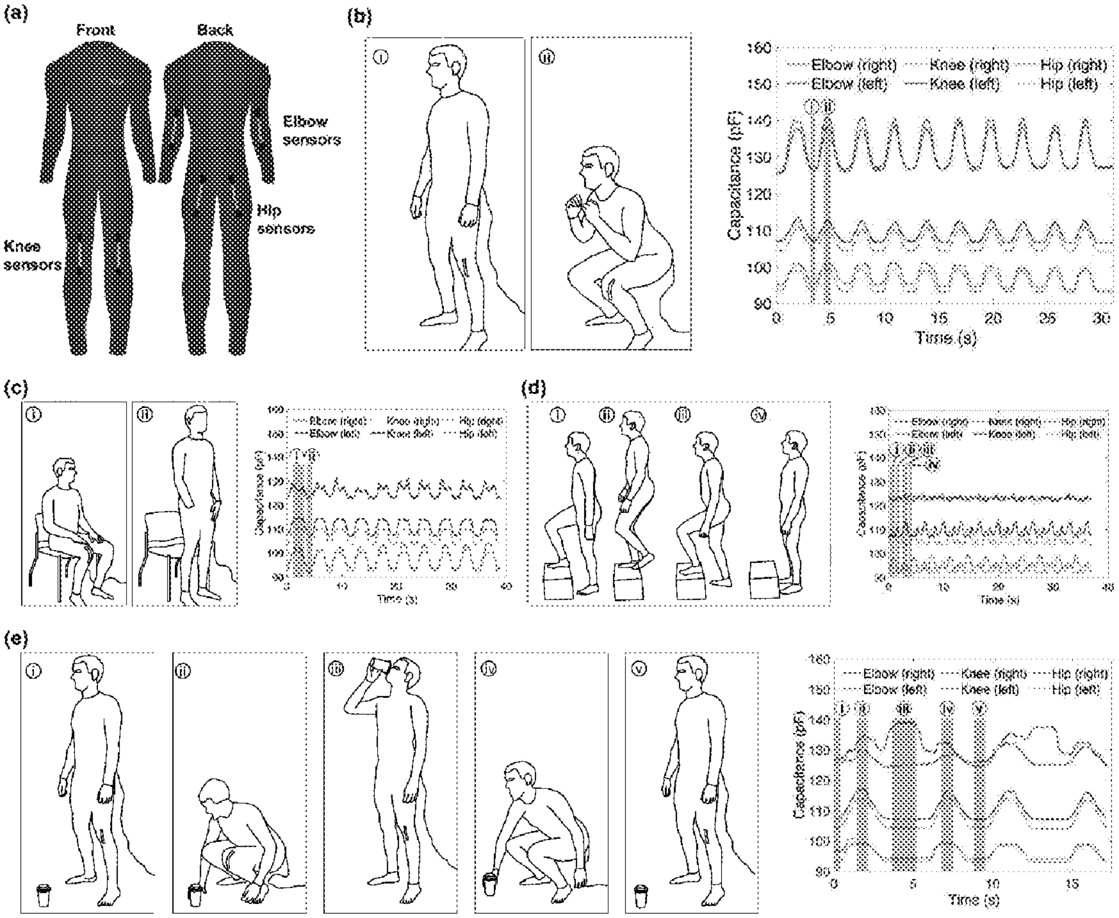

FIG. 11 is a table that includes data for the average thicknesses and normalized weights of each fabric, bare and laminated with adhesive film.

Figure 12:
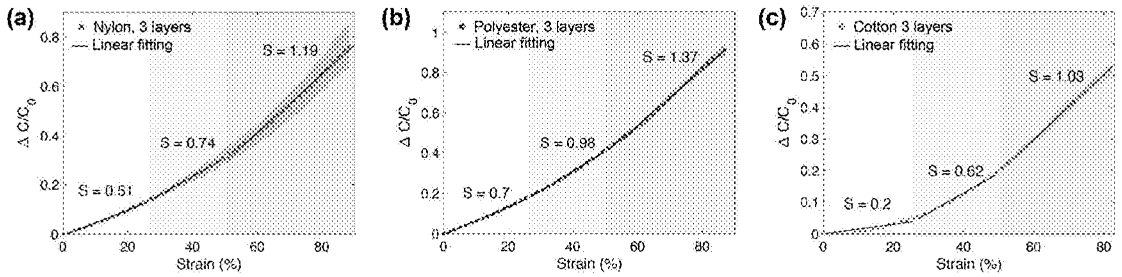

FIG. 12 depicts the relative change in capacitance and sensitivity as a function of strain for 3-layer sensors with dielectric nylon, polyester, and cotton. The average response of five sensors is shown in (a) and (b) and of three sensors in (c). The discrete points are showing the experimental measurements for the average capacitance plotted against strain, while the black solid lines are showing sensitivity results. The sensitivity values for 3-layer sensors within the strain regions are comparable to those obtained for the 5-layer sensors.

Figure 13:
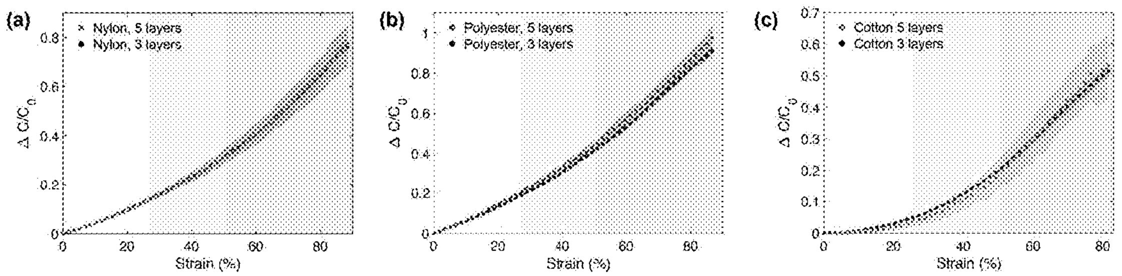

FIG. 13 depicts the relative change in capacitance as a function of strain for both 5-layer and 3-layer sensors with dielectric nylon, polyester, and cotton. The relative change in capacitance for 3-layer sensors within the strain regions are comparable to those obtained for the 5-layer sensors.

Figure 14:
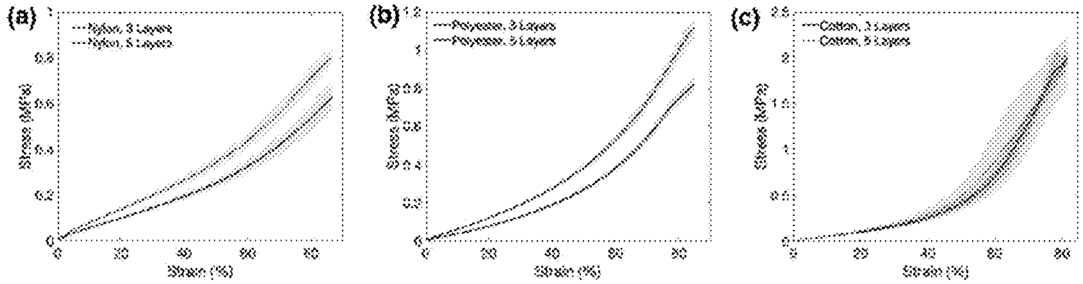

FIG. 14 depicts stress as a function of strain for 3- and 5-layer sensors with dielectric nylon, polyester, and cotton. The average response of five sensors is shown for each.

Figure 15:
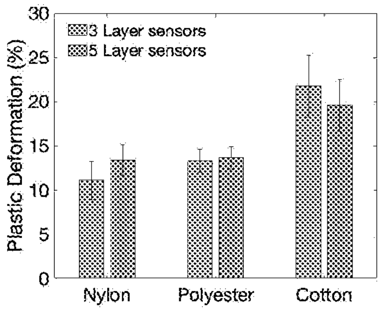

FIG. 15 depicts the average plastic deformation of five 3- and 5-layer nylon, polyester, and cotton sensors after the first 10 cycles of 100% strain.

Figure 16:
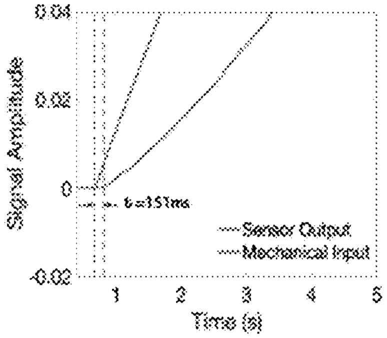

FIG. 16 depicts the response time of a representative 5-layer nylon sensor in response to a step-like strain with a rate of 5 mm/s. The average response time of five 5-layer nylon sensors was found to be 179 ms with a standard deviation of 46 ms.

Figure 17:
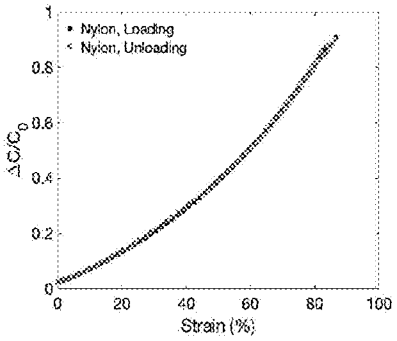

FIG. 17 depicts the average relative change in capacitance as a function of strain during 10 cycles of loading and unloading for five 5-layer nylon sensors. Data were taken in ambient lab conditions: temperature=23±1° C. and relative humidity=29±2%.

Figure 18:
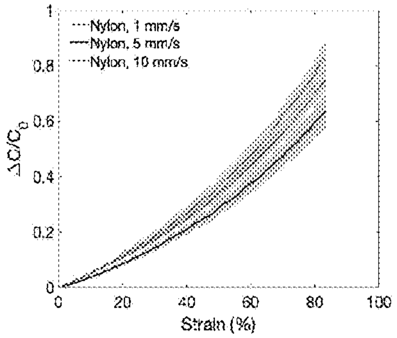

FIG. 18 depicts the average relative change in capacitance as a function of strain for five 5-layer nylon sensors at strain rates of 1 mm/s, 5 mm/s, and 10 mm/s. Data was taken in the ambient lab conditions: temperature=23±1° C. and relative humidity=29±2%. Data was collected from the same sensors in sequence of 5, 1, then 10 mm/s.

Figure 19:
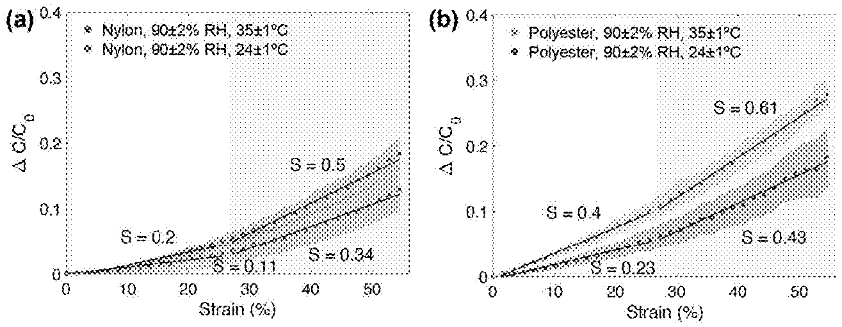

FIG. 19 depicts the effect of temperature and humidity on the electromechanical response of 5-layer sensors with dielectric nylon and polyester. The discrete points are showing the experimental measurements for the average capacitance of five sensors plotted against strain, while the solid lines are showing the gauge factor/sensitivity results.

Figure 20:
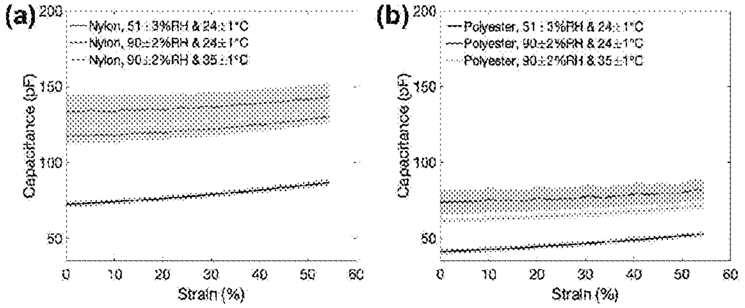

FIG. 20 depicts the effect of temperature and humidity on the electromechanical response of five 5-layer sensors with dielectric nylon and polyester.

Figure 21:
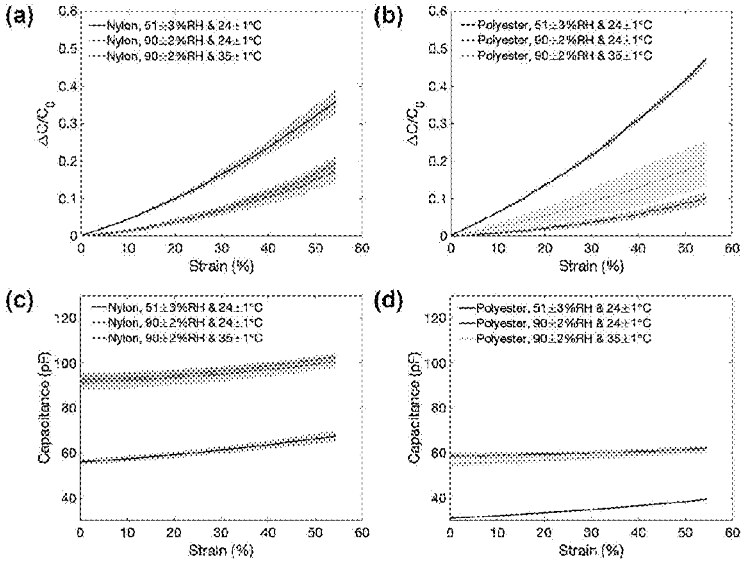

FIG. 21 depicts the effect of temperature and humidity on the electromechanical response of five 3-layer sensors with dielectric (nylon and polyester.

Figure 22:
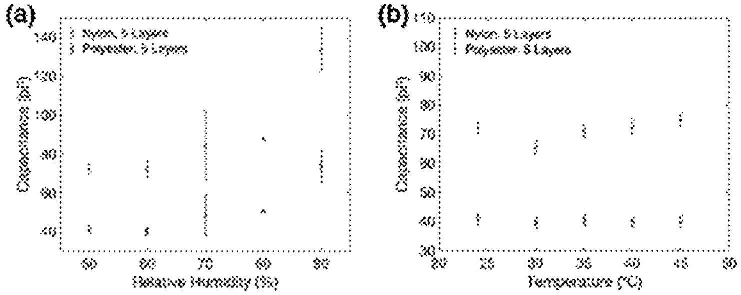

FIG. 22 depicts the effect of humidity and temperature on the average capacitance of five 5-layer sensors with dielectric nylon or polyester at 0% strain.

Figure 23:
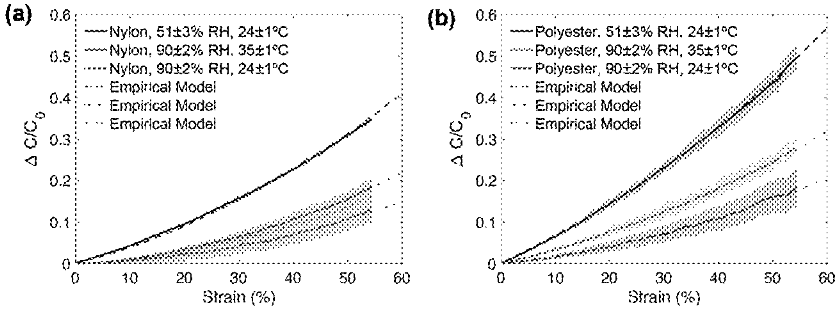

FIG. 23 depicts the effect of temperature and humidity on the electromechanical response of 5-layer sensors with dielectric nylon and polyester. Dashed lines are the fittings of the predicted capacitance based on Equation 19.

Figure 24:
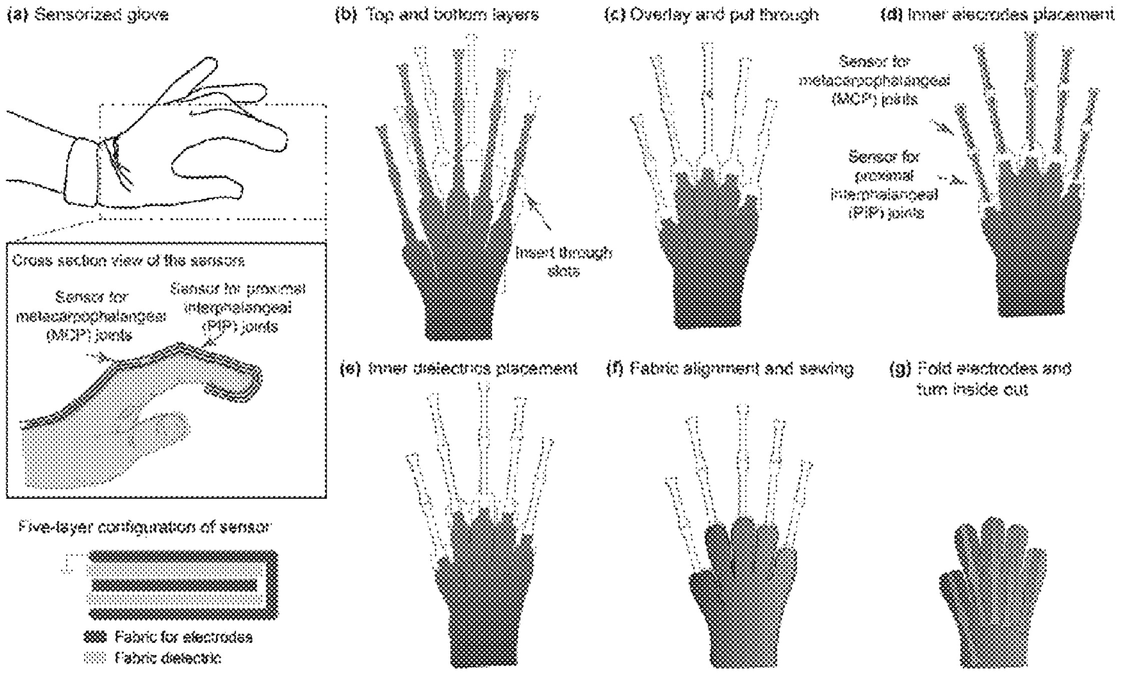

FIG. 24 depicts a photograph of a sensorized glove in accordance with one aspect of the present invention (a) with the capacitive sensors along the middle phalanges of each finger to capture the movement of the metacarpophalangeal and proximal interphalangeal joints and (b)-(g) detail fabrication steps of a sensorized glove in accordance with the present invention.

Figure 25:
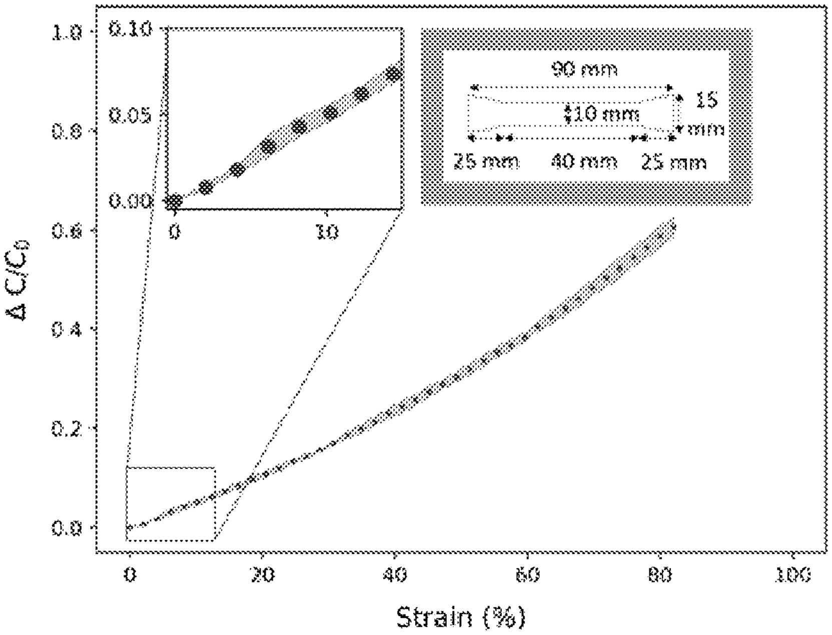

FIG. 25 depicts average normalized change in capacitance vs. strain for five fabric sensors of a sensorized glove. The capacitance of the sensors was recorded using the materials testing system (Instron® 3345) and an LCR meter (E4980AL, Keysight Technologies) at an excitation frequency of 1 kHz.

Figure 26:
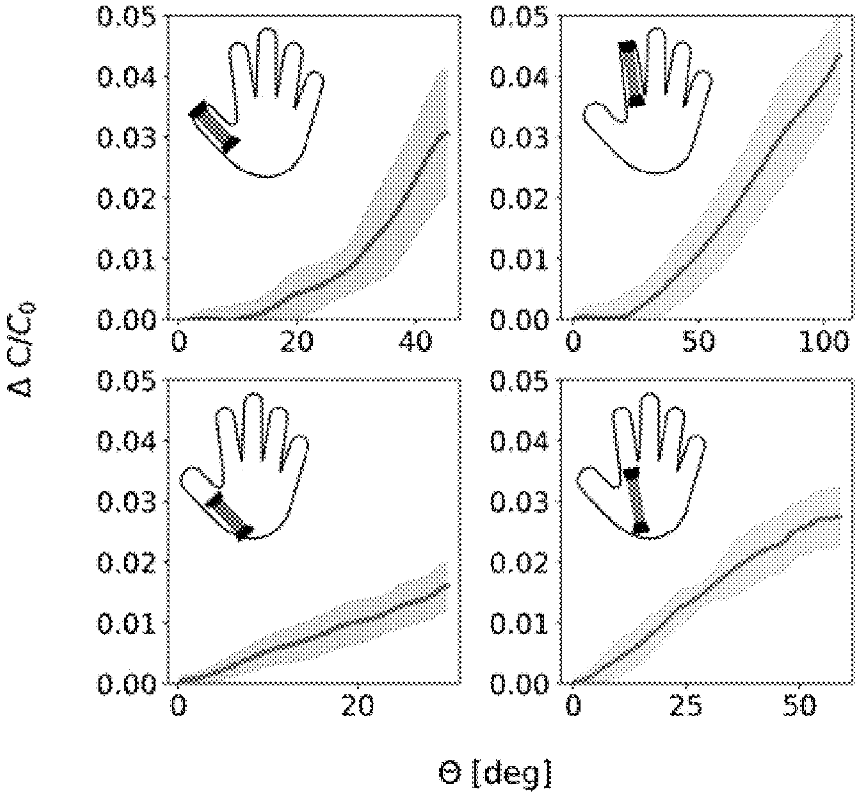

FIG. 26 depicts average normalized change in capacitance vs. bending angles of the PIP (top) and MCP joints (bottom) of the thumb and the pointer finger. Error cloud represents one standard deviation.

Figure 27:
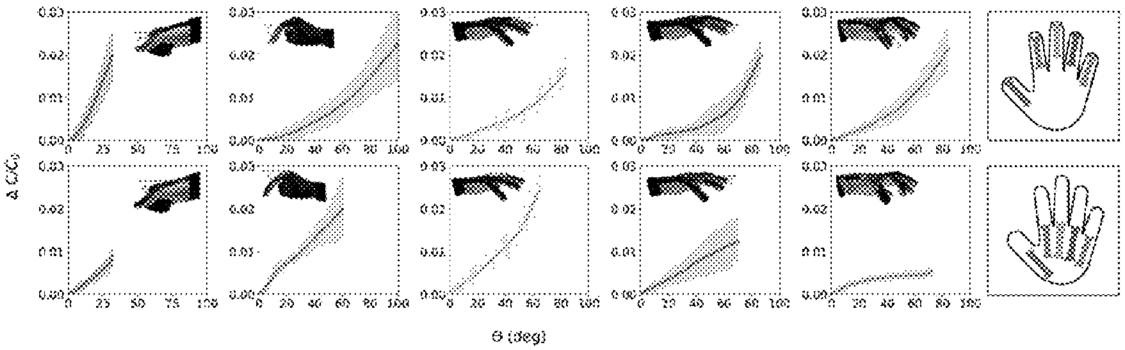

FIG. 27 depicts calibration of average relative change in capacitance vs. bending angles of the PIP (top row) and MCP joints (bottom row) of the thumb shown in red, index finger shown in blue, middle finger shown in yellow, ring finger shown in green, and pinky finger shown in pink. The insets depict the reference axis (zero-degree axis) defined for each joint bending angle to serve as ground truth.

FIGS. 28A-28D depict plots of ground truth and measured pose angles for (28A-28B) middle MCP joint, and (28C-28D) middle PIP joint.

Figure 29:
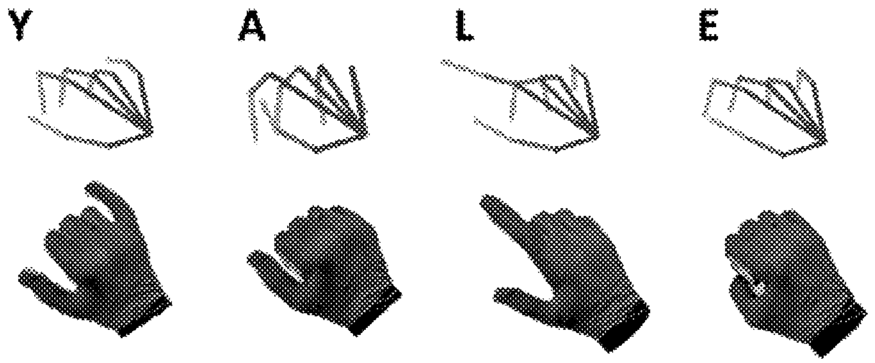

FIG. 29 depicts post reconstruction (top row) and corresponding photographs (bottom row) depicting the intended hand positions for the letters spelling the word “Yale” in American Sign Language.

Figure 30:
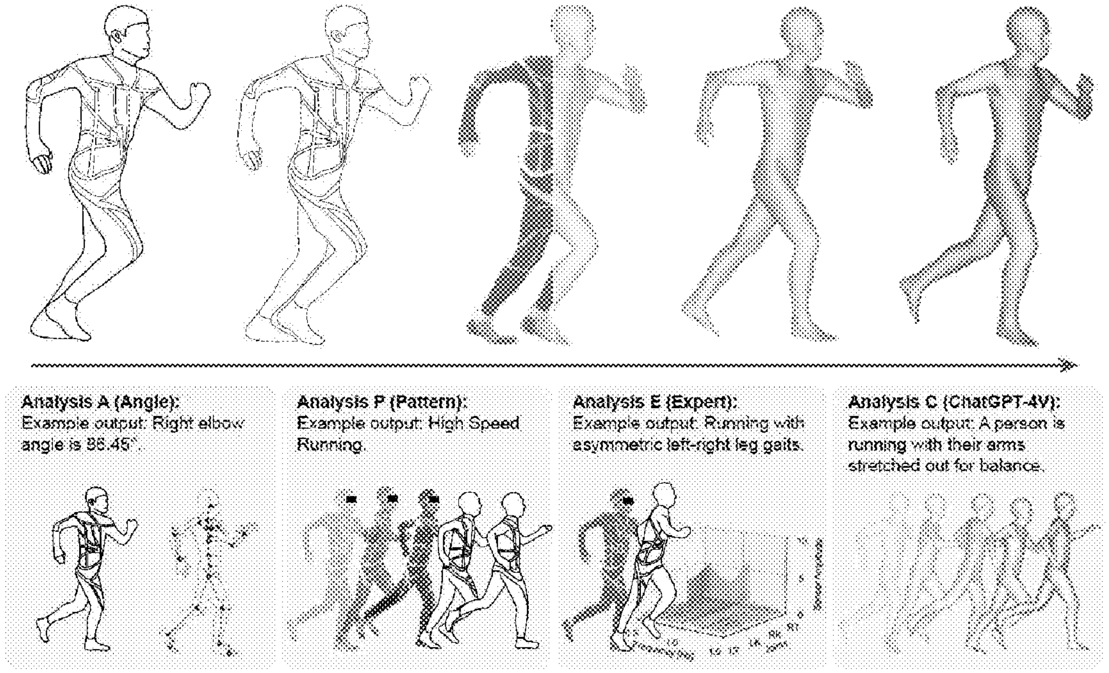

FIG. 30 depicts an overview of a user wherein a stretchable fabric garment encompassing a plurality of textile sensor units in accordance with one aspect of the present invention to capture their motion data.

Figure 31:
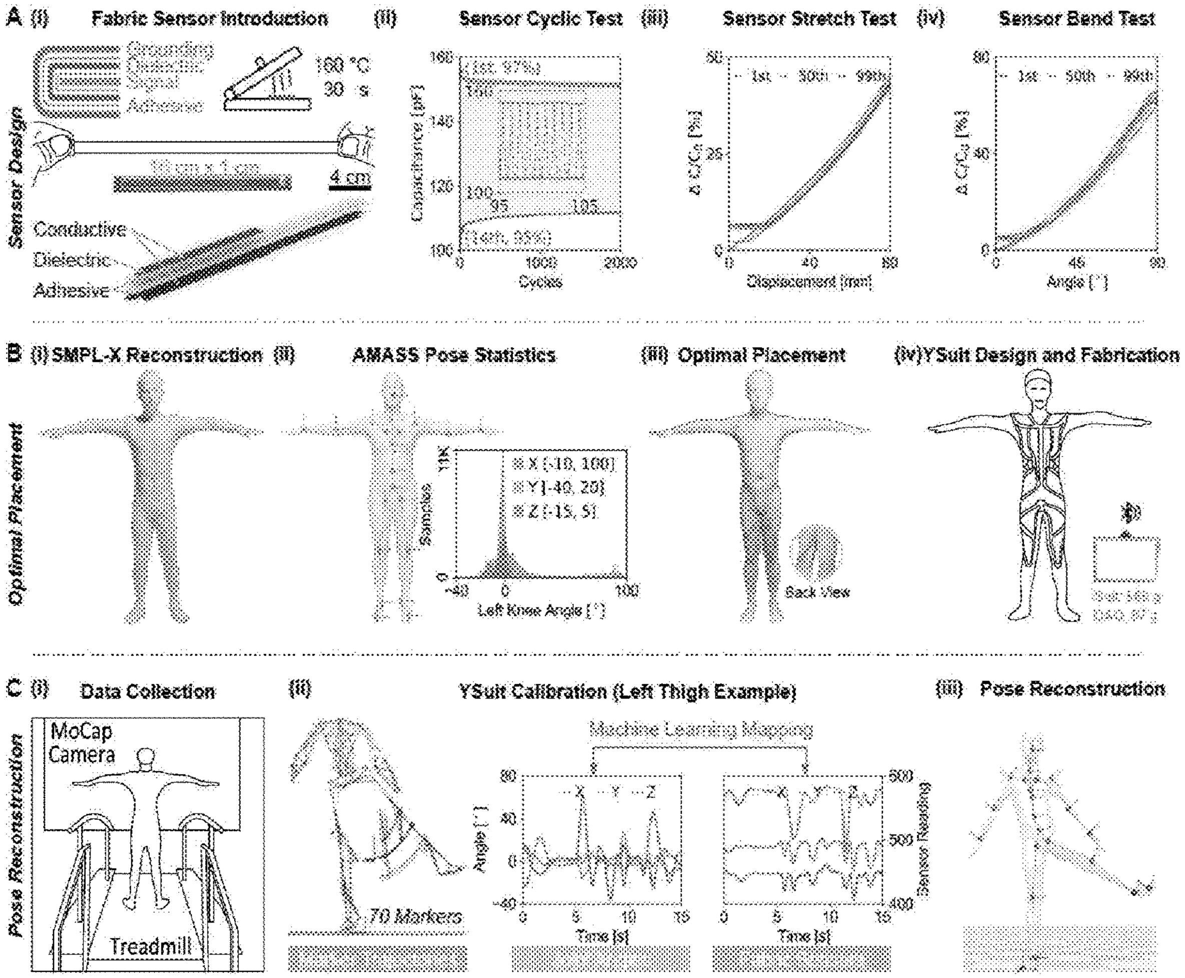

FIG. 31 depicts a system in accordance with one embodiment of the present invention which shows the working mechanisms of the textile sensor unit and data processing of a pose capturing setting.

Figure 32:
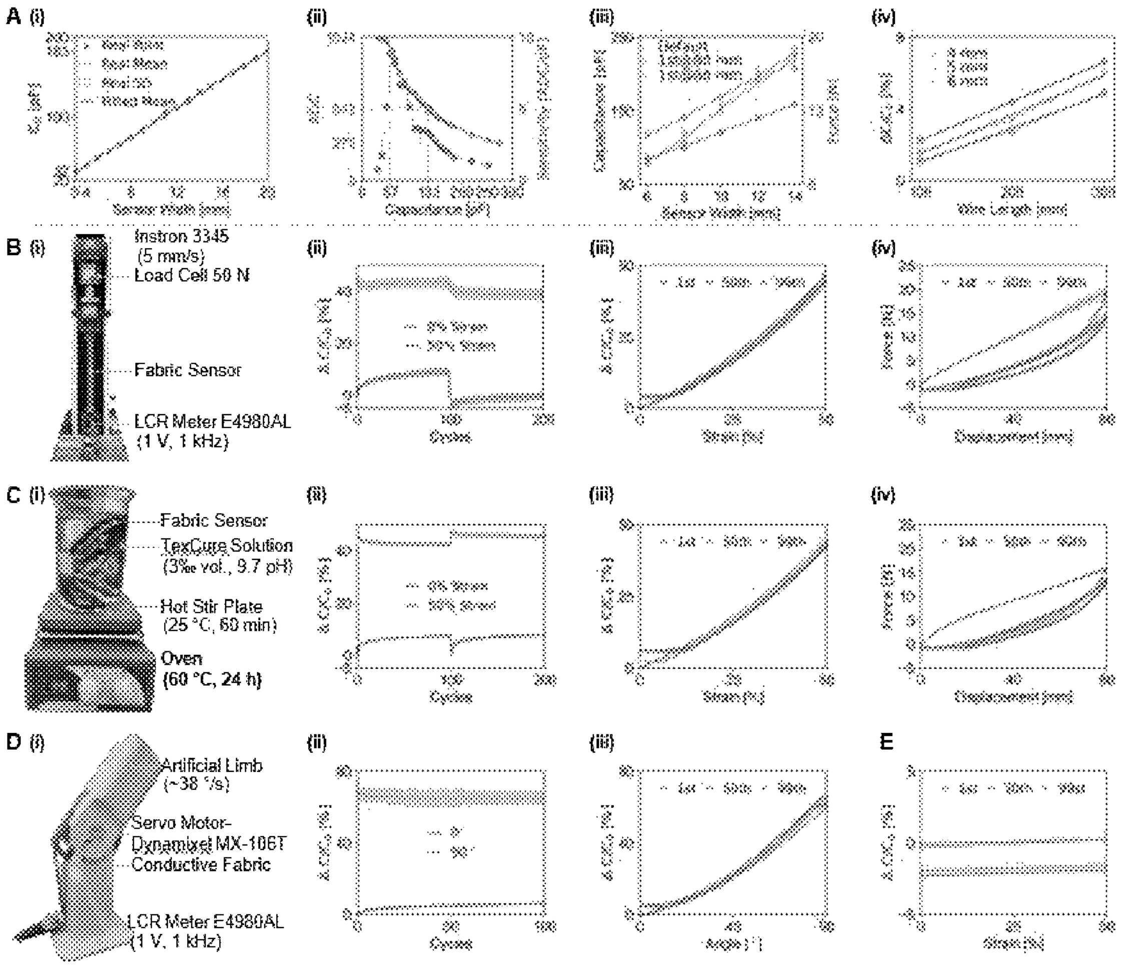

FIG. 32 depicts sensor unit characterization.

Figure 33A:
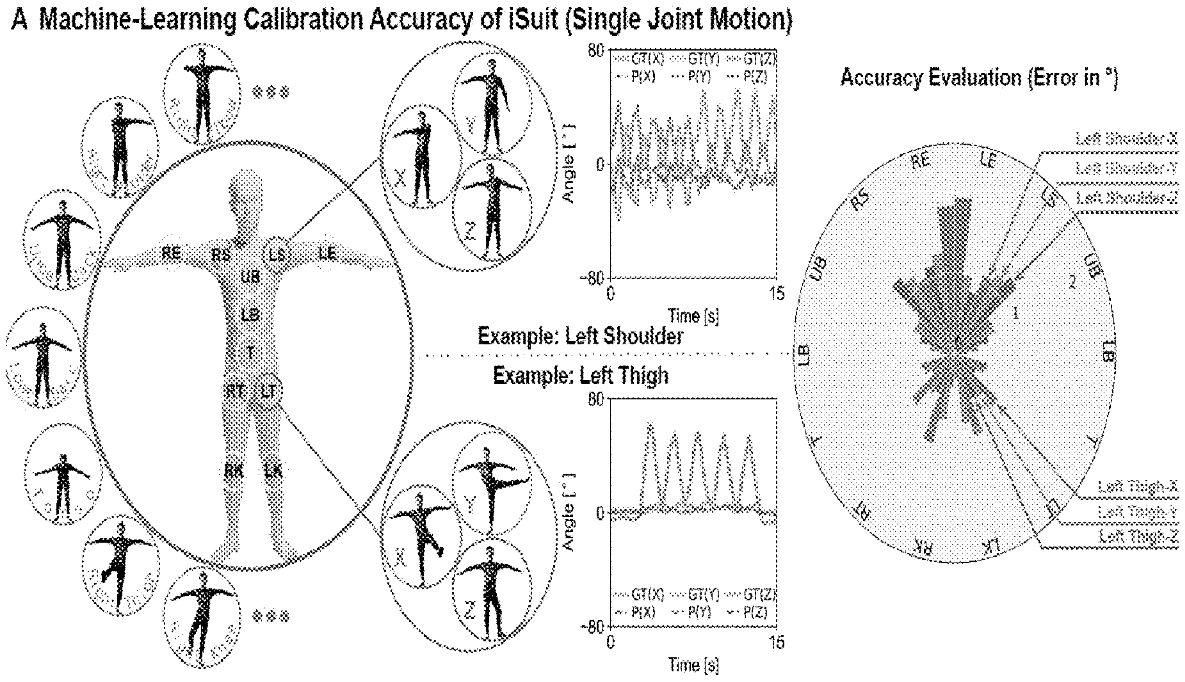
Figure 33B:
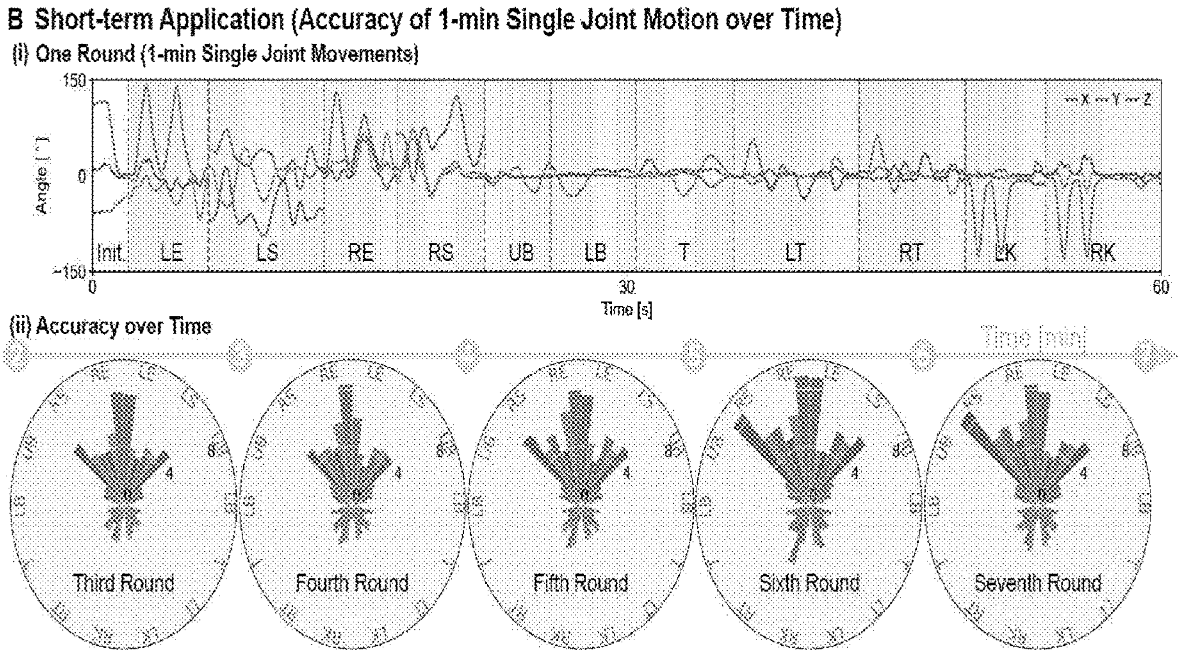
Figure 33C:
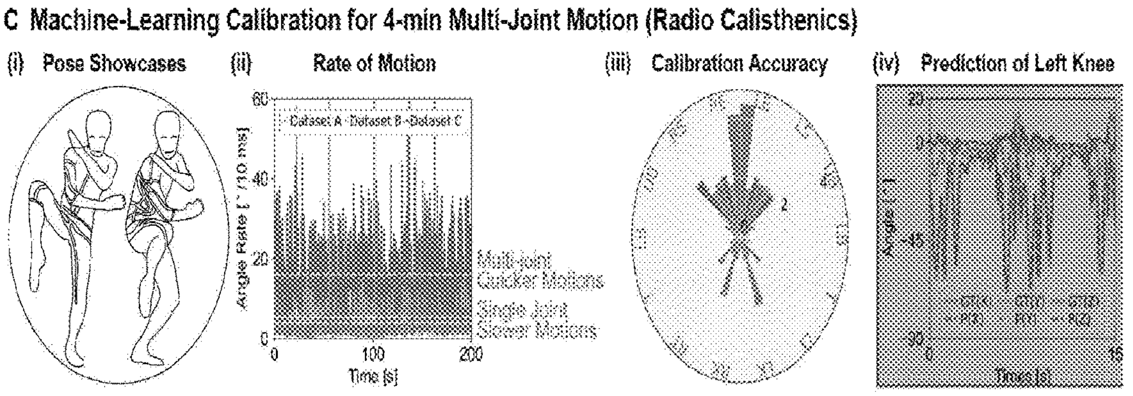
Figure 33D:
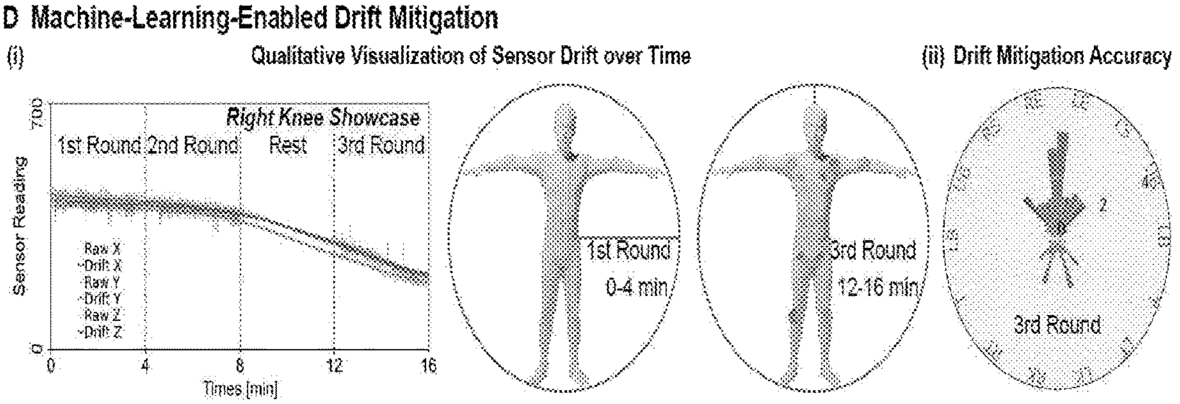

FIGS. 33A-33D depict an accuracy evaluation over time. FIG. 33A depicts a demonstration of single-joint human motion and machine-learning-driven calibrated angle prediction compared to ground truth (GT) in X, Y, Z directions of left shoulder (LS) and left thigh (LT). FIG. 33B depicts single-joint motion angle changes over one round of 1-min short-term single-joint movement and accuracy evaluation over time. FIG. 33C depicts multi-joint motion according to the angle change rate, quantitative evaluation on accuracy spatial distribution and showcases left knee accuracy over time. FIG. 33D depicts spatial accuracy distribution of over-time drift mitigation.

Figure 34:
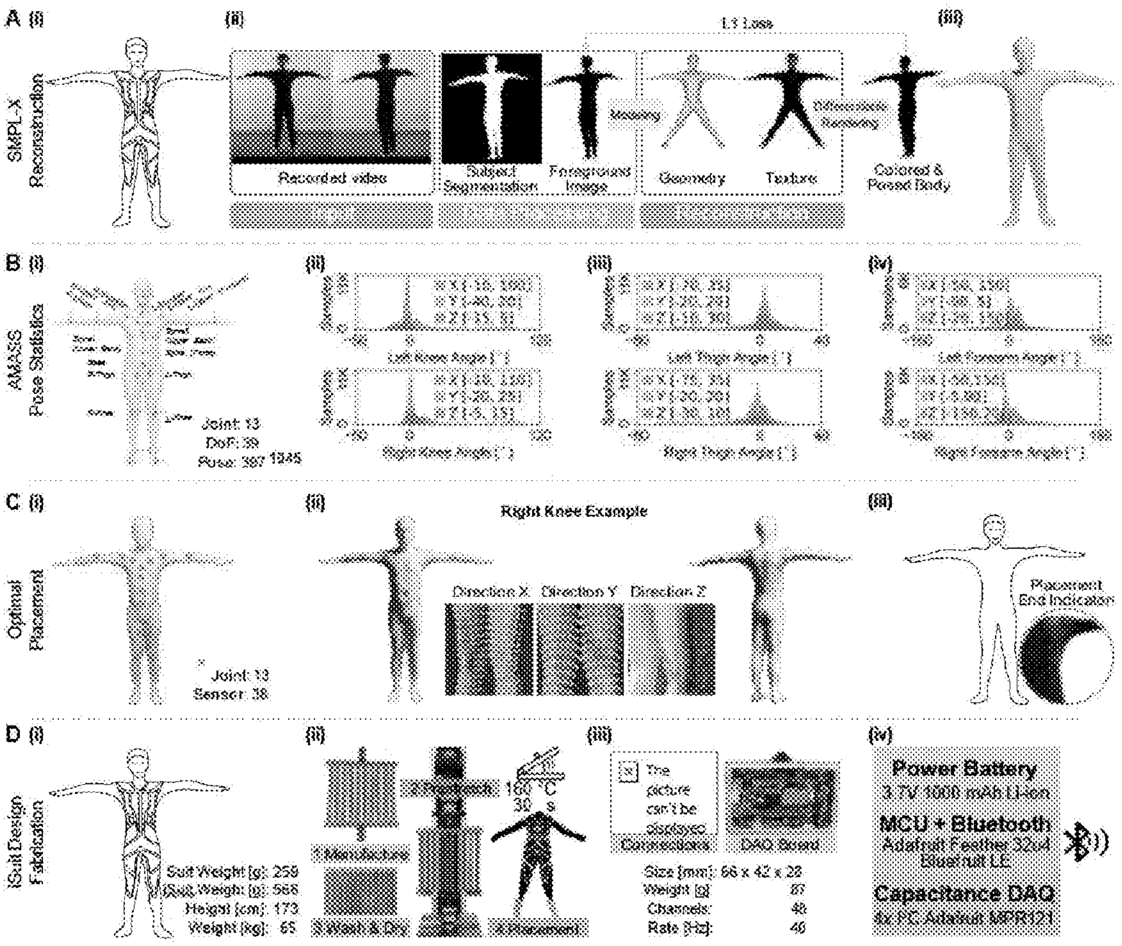

FIG. 34 depicts an example of a customization procedure for a flexible fabric garment.

Figure 35A:
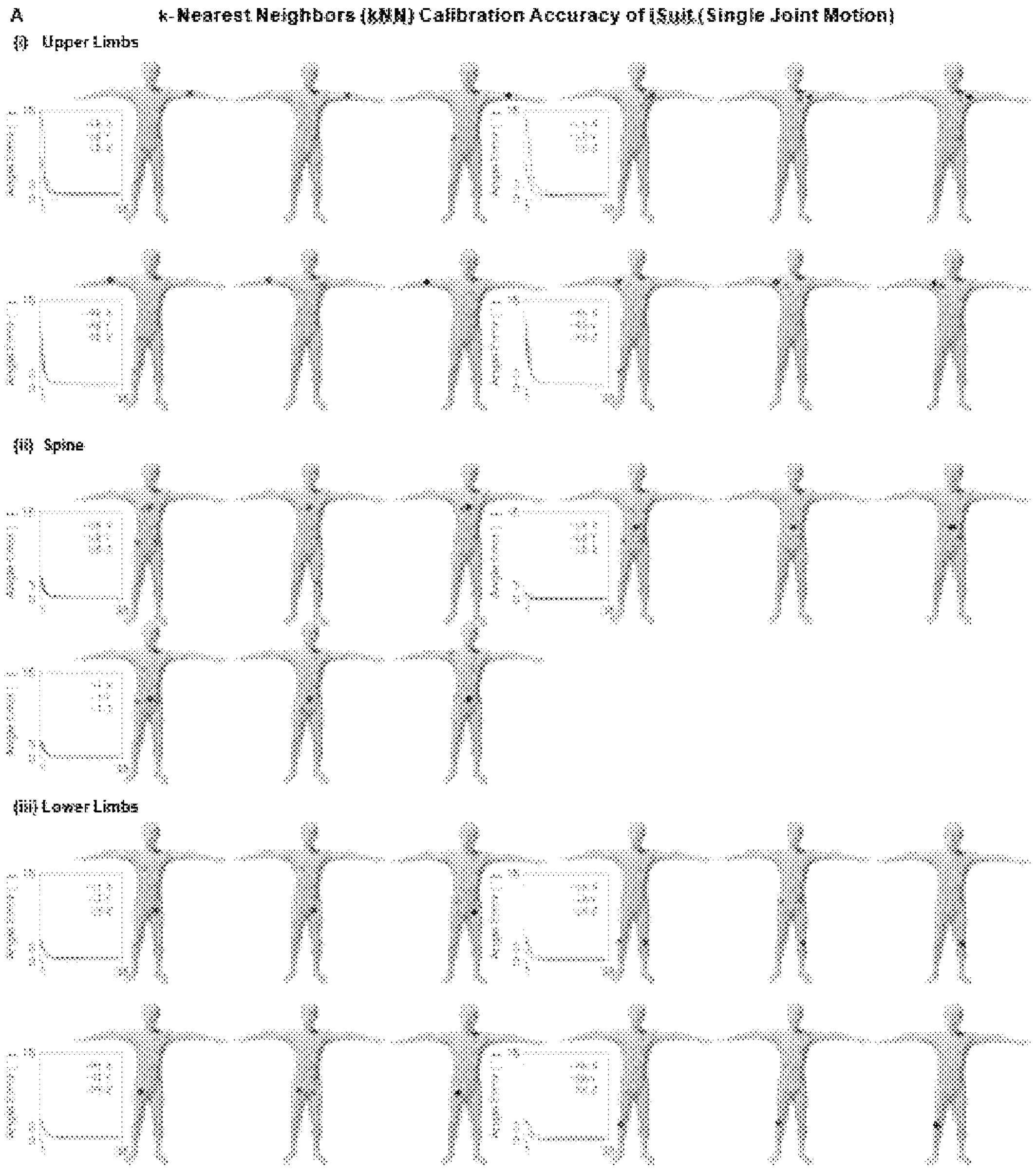
Figure 35B:
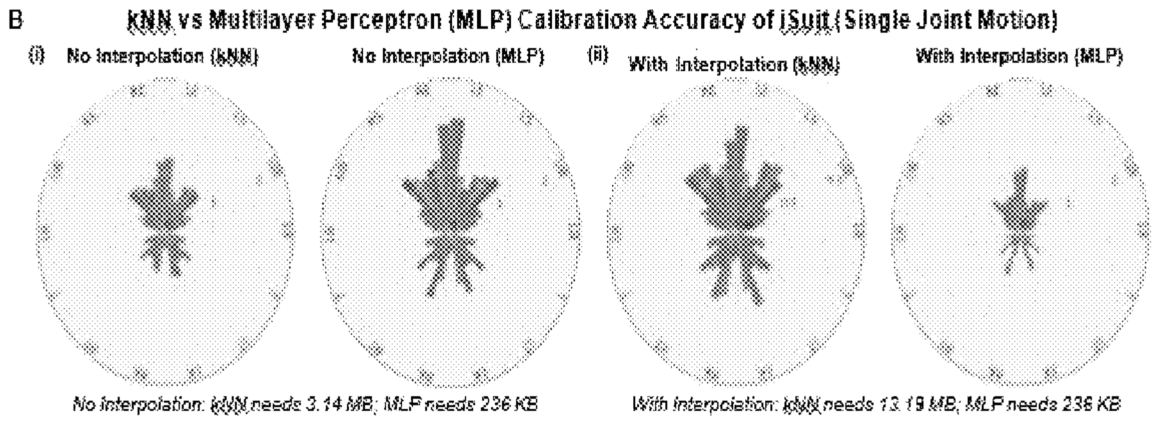

FIGS. 35A and 35B depict an ablation study for a flexible fabric garment in accordance with the invention. FIG. 35A depicts a sensing network formed by more sensors and FIG. 35B depicts a comparison of kNN and MLP performance on non-interpolated and interpolated datasets.

Figure 36:
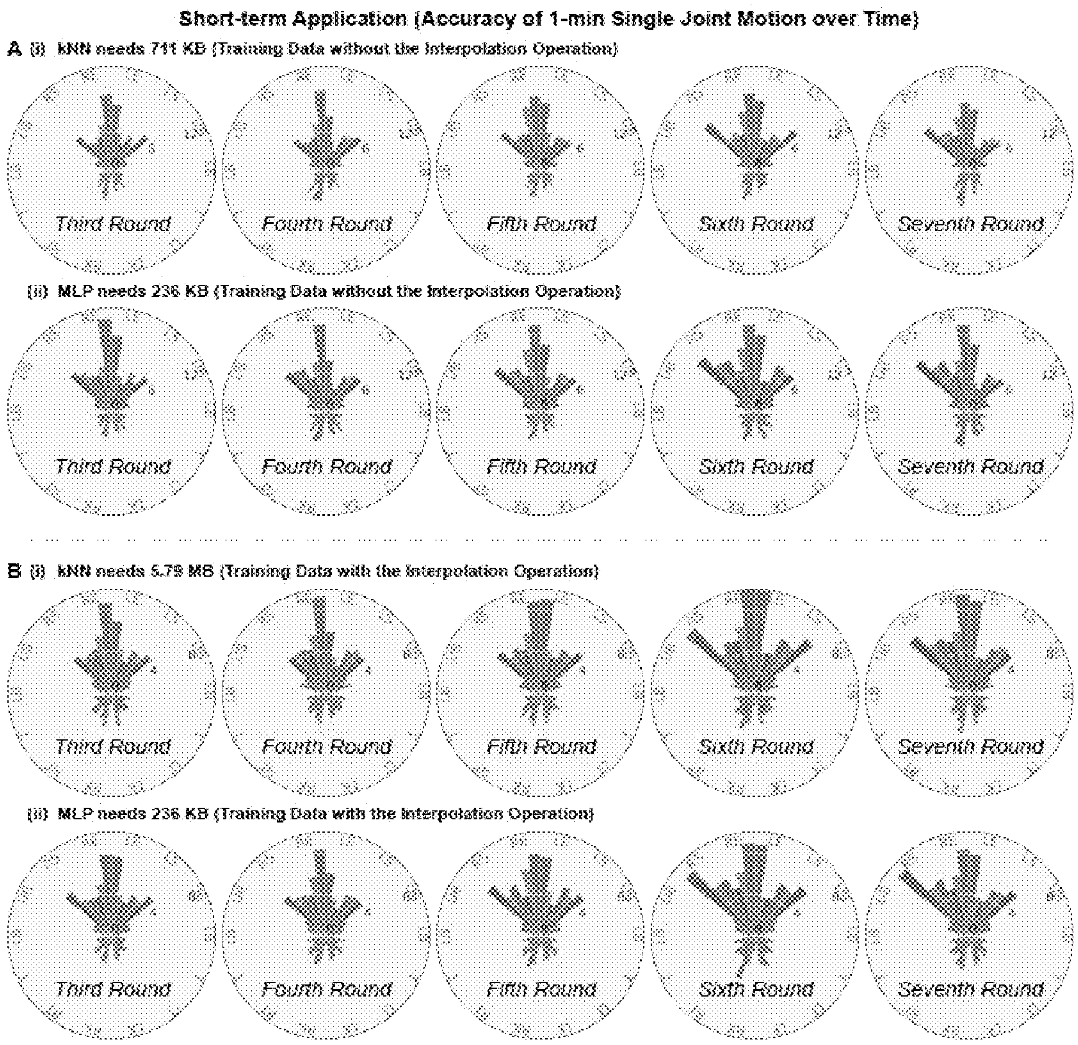

FIG. 36 depicts an ablation study for a short-term application.

Figure 37:
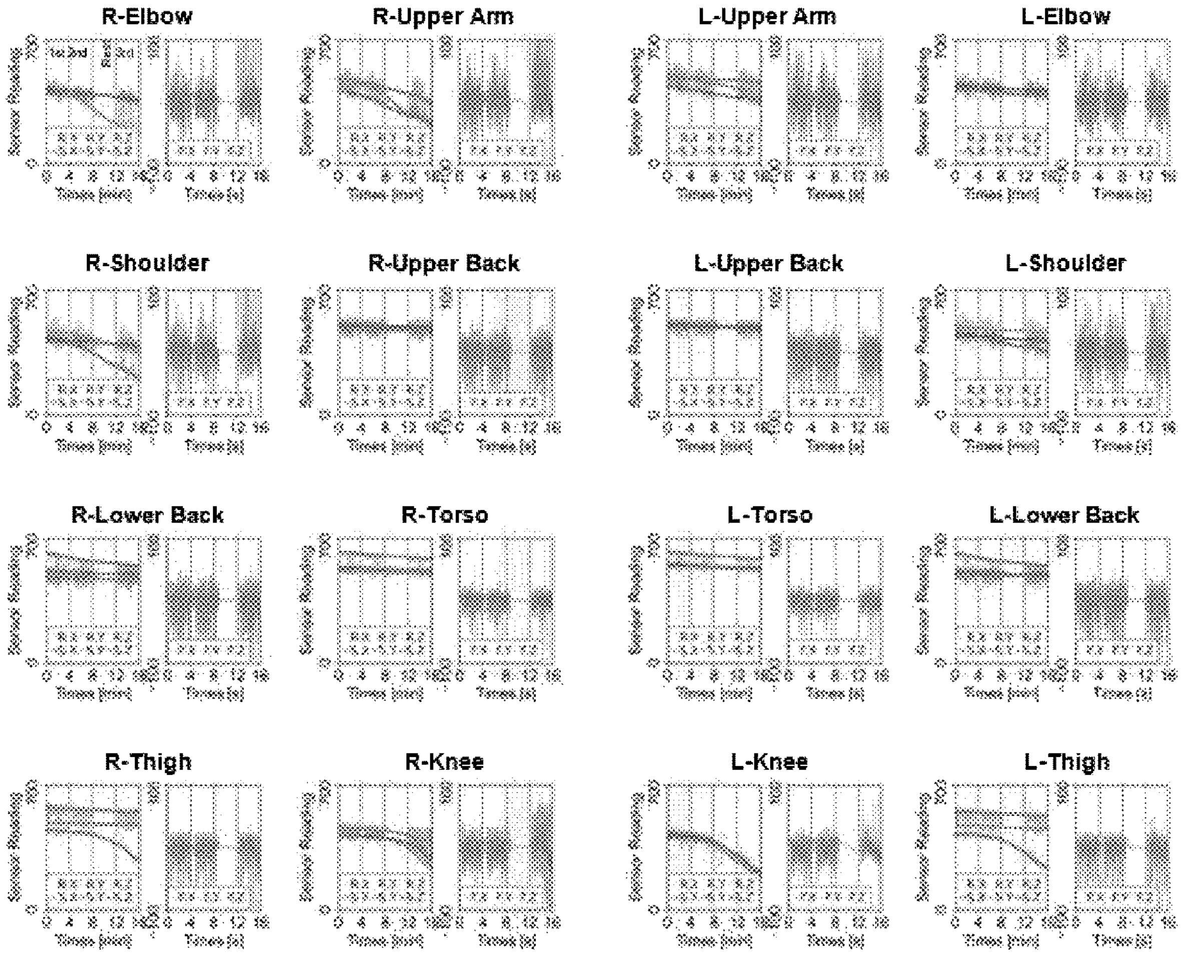

FIG. 37 depicts drift analysis over time for each joint.

Figure 38:
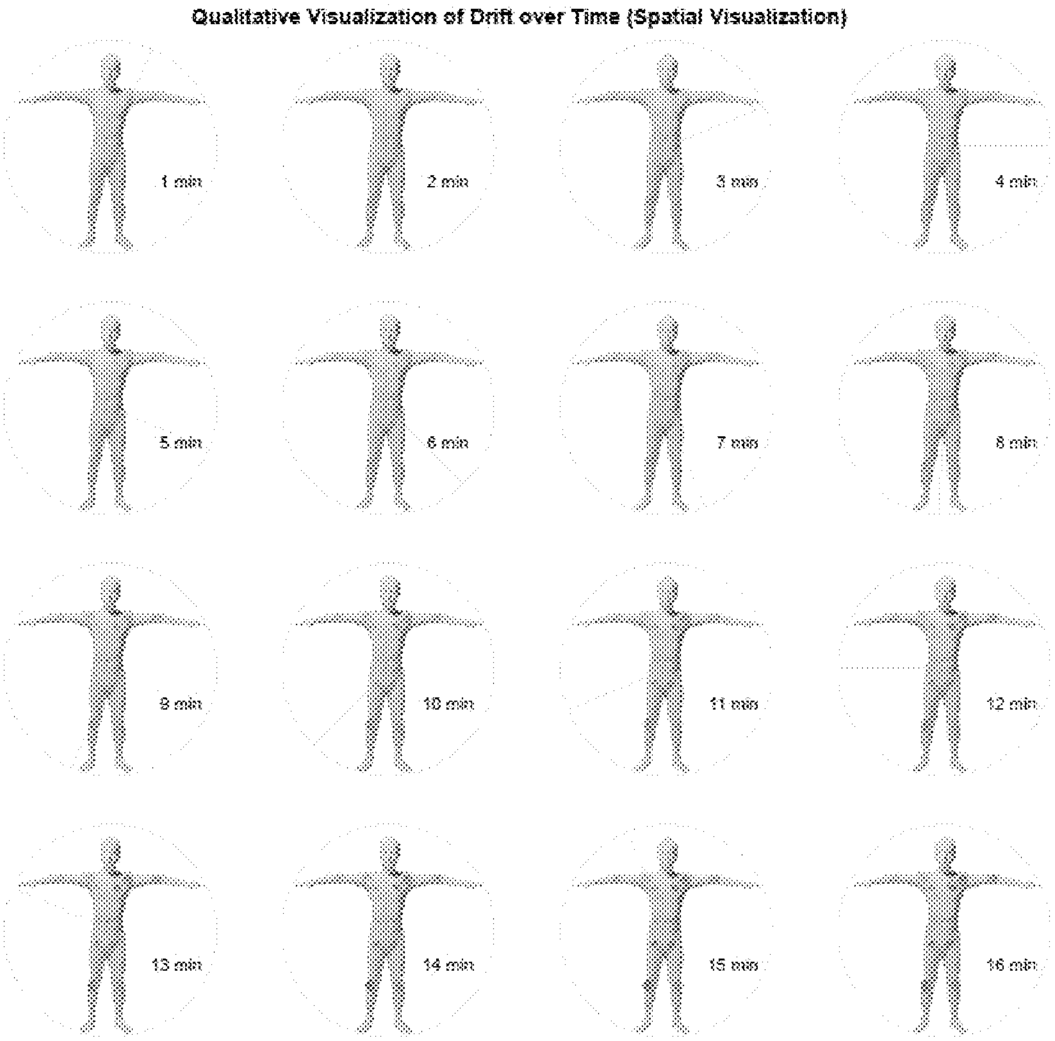

FIG. 38 depicts a spatial distribution of drift over time.

Figure 39A:
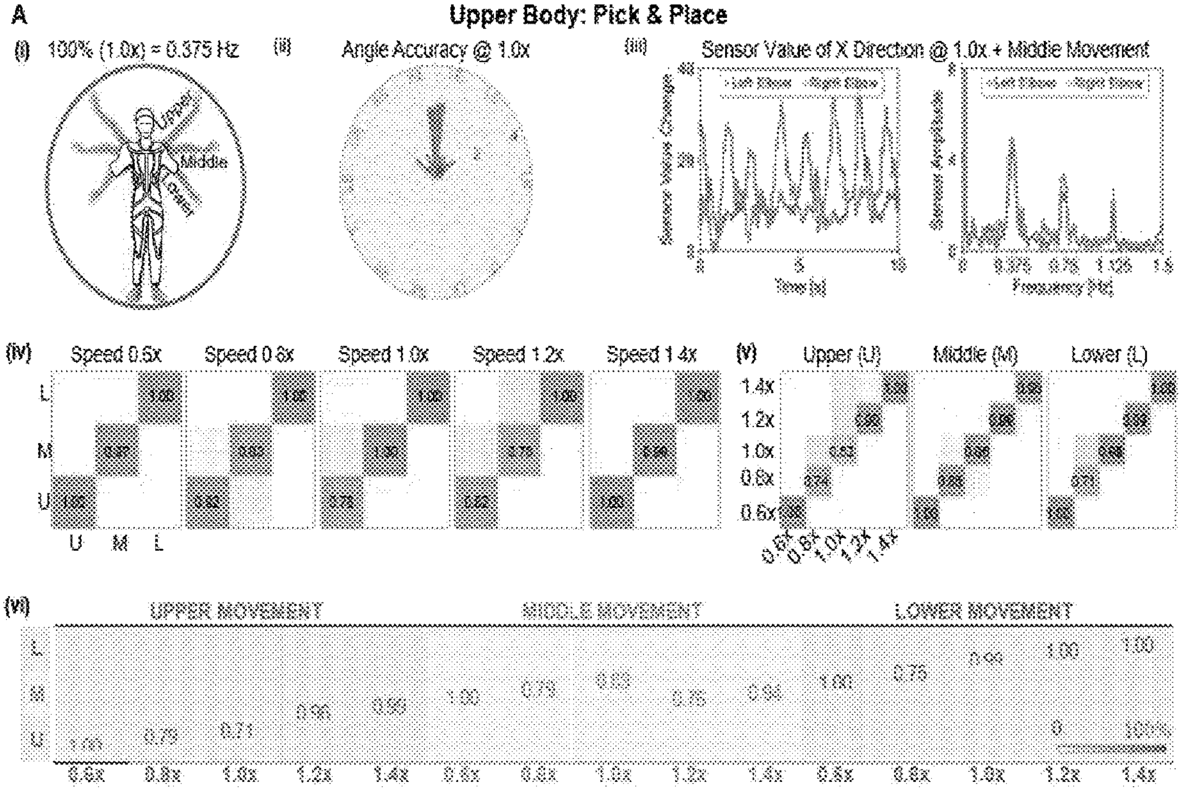
Figure 39B:
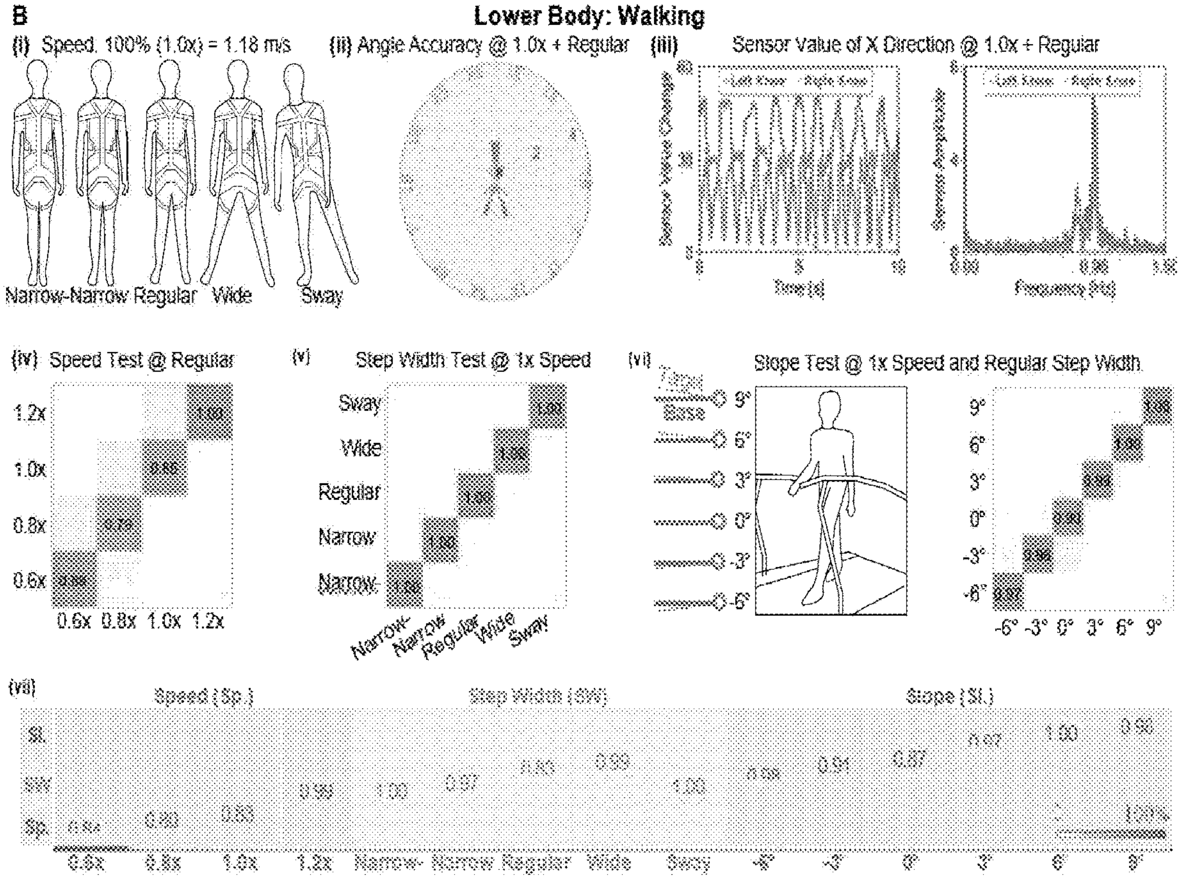

FIGS. 39A and 39B depict Pattern Recognition. FIG. 39A depicts pose angle accuracy of upper body pick & place tasks and FIG. 39B depicts pose angle accuracy of walking.

Figure 40A:
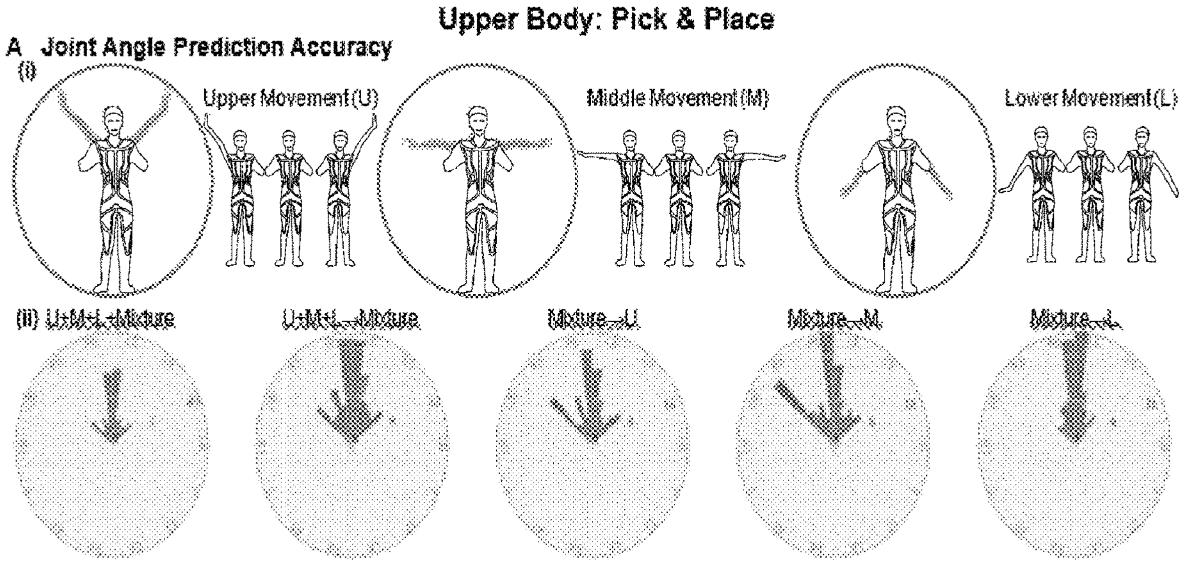
Figure 40B:
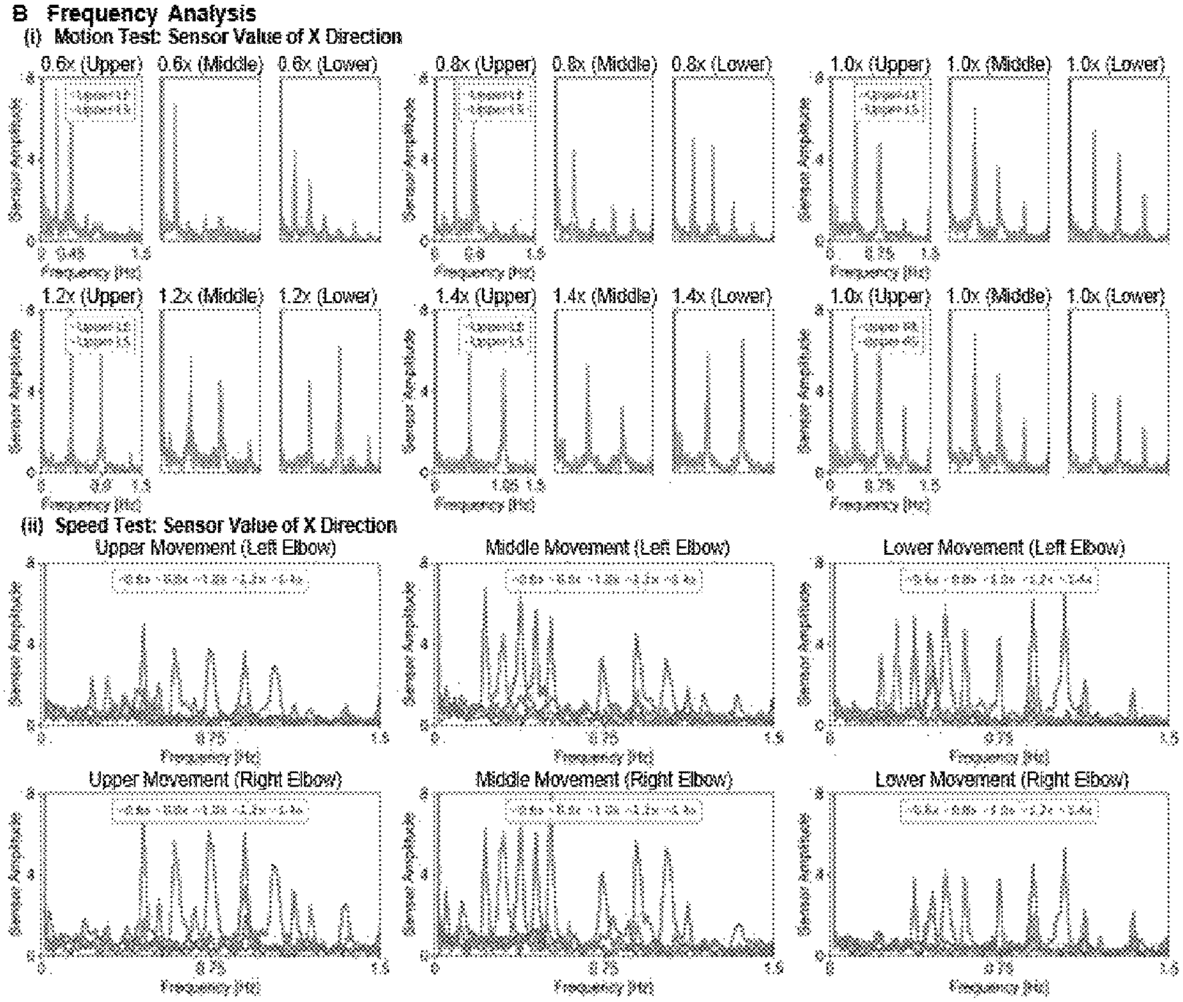

FIGS. 40A and 40B depict an upper body pick and place accuracy study and frequency analysis. FIG. 40A depicts an ablation study for the accuracy assessment and FIG. 40B depicts frequency analysis from the perspectives of motion height and motion speed.

Figure 41A:
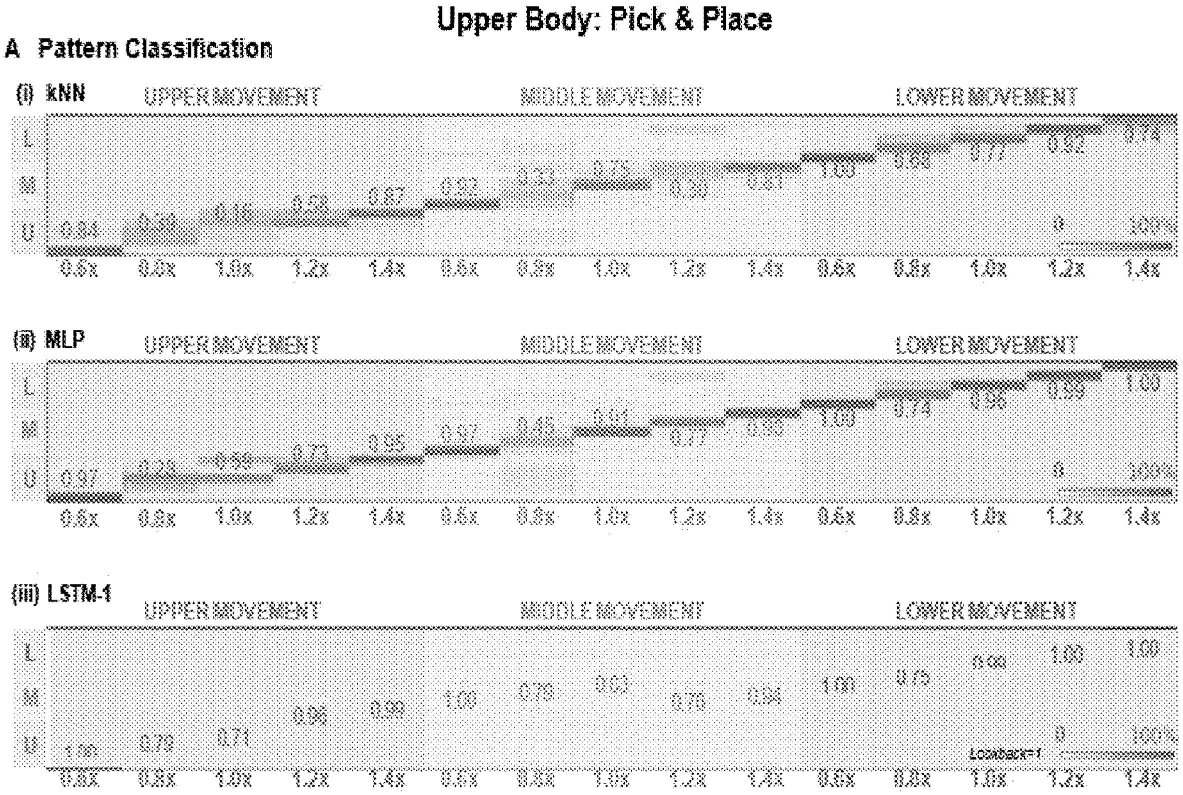
Figure 41B:
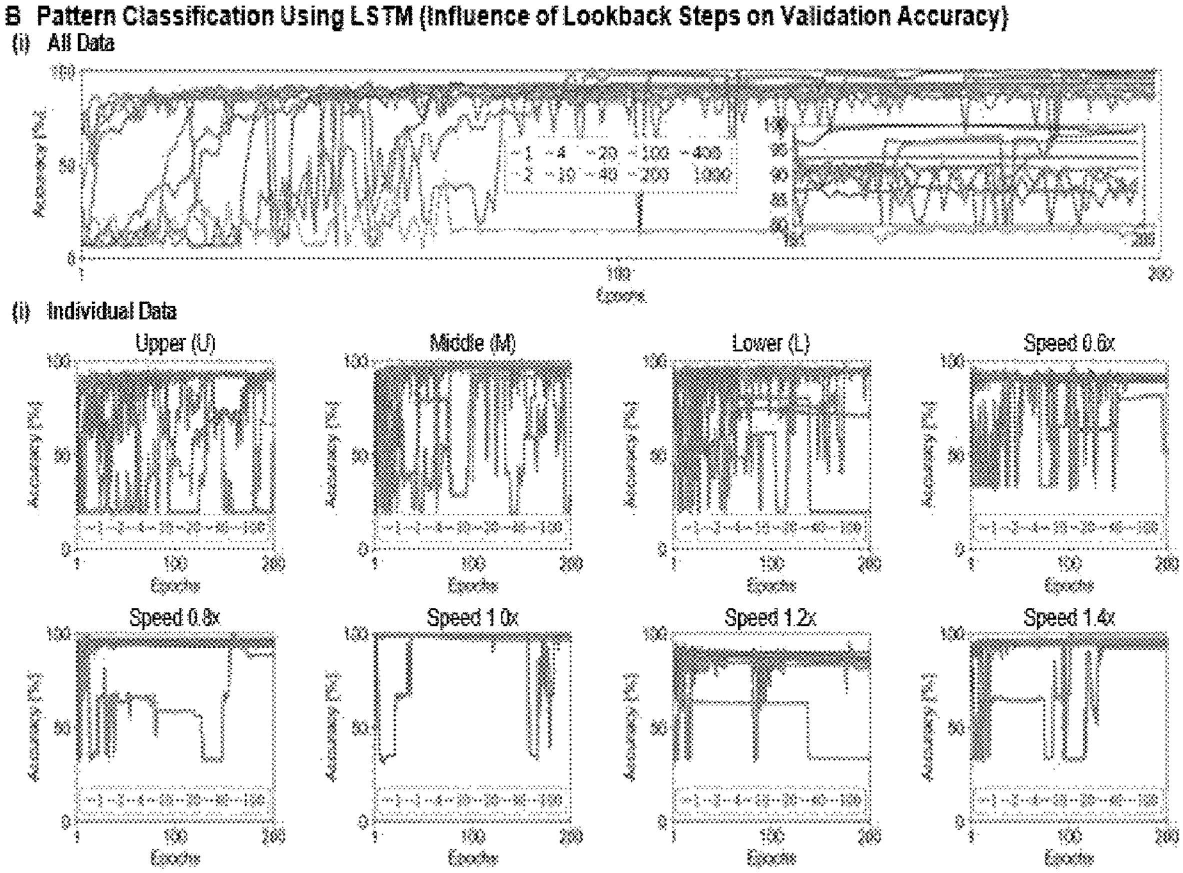

FIGS. 41A and 41B depict an ablation study for upper body motion recognition. FIG. 41A depicts a comparison of different pattern classification methods and FIG. 41B depicts the influence of lookback steps on validation accuracy for all motion data samples and separate motion data samples.

Figure 42A:
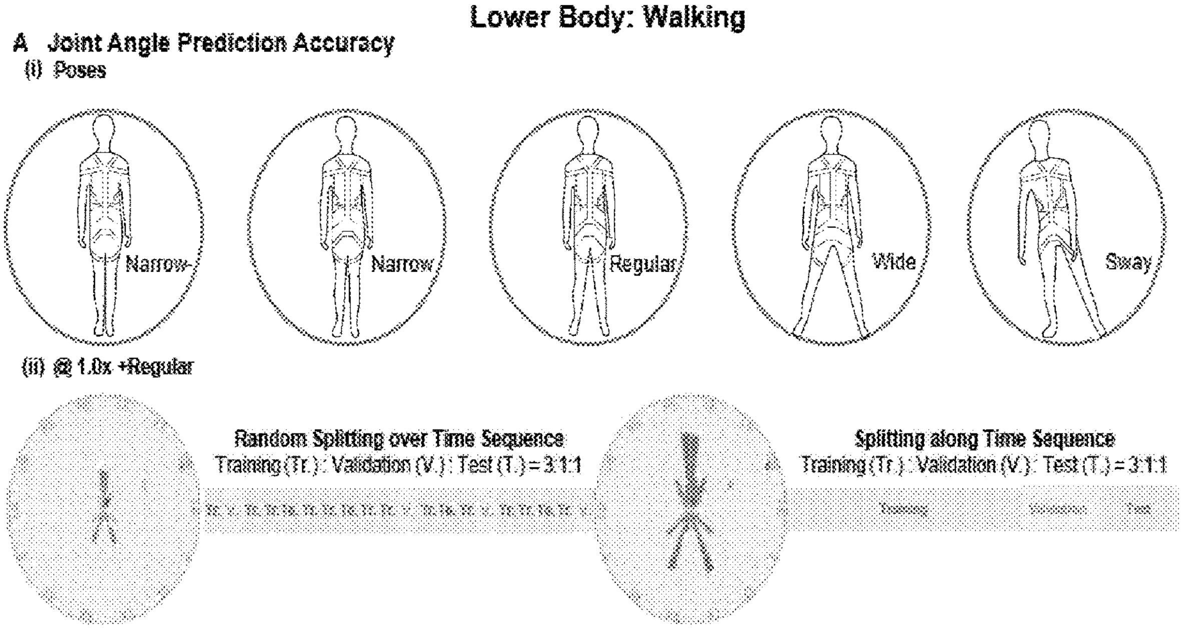
Figure 42B:
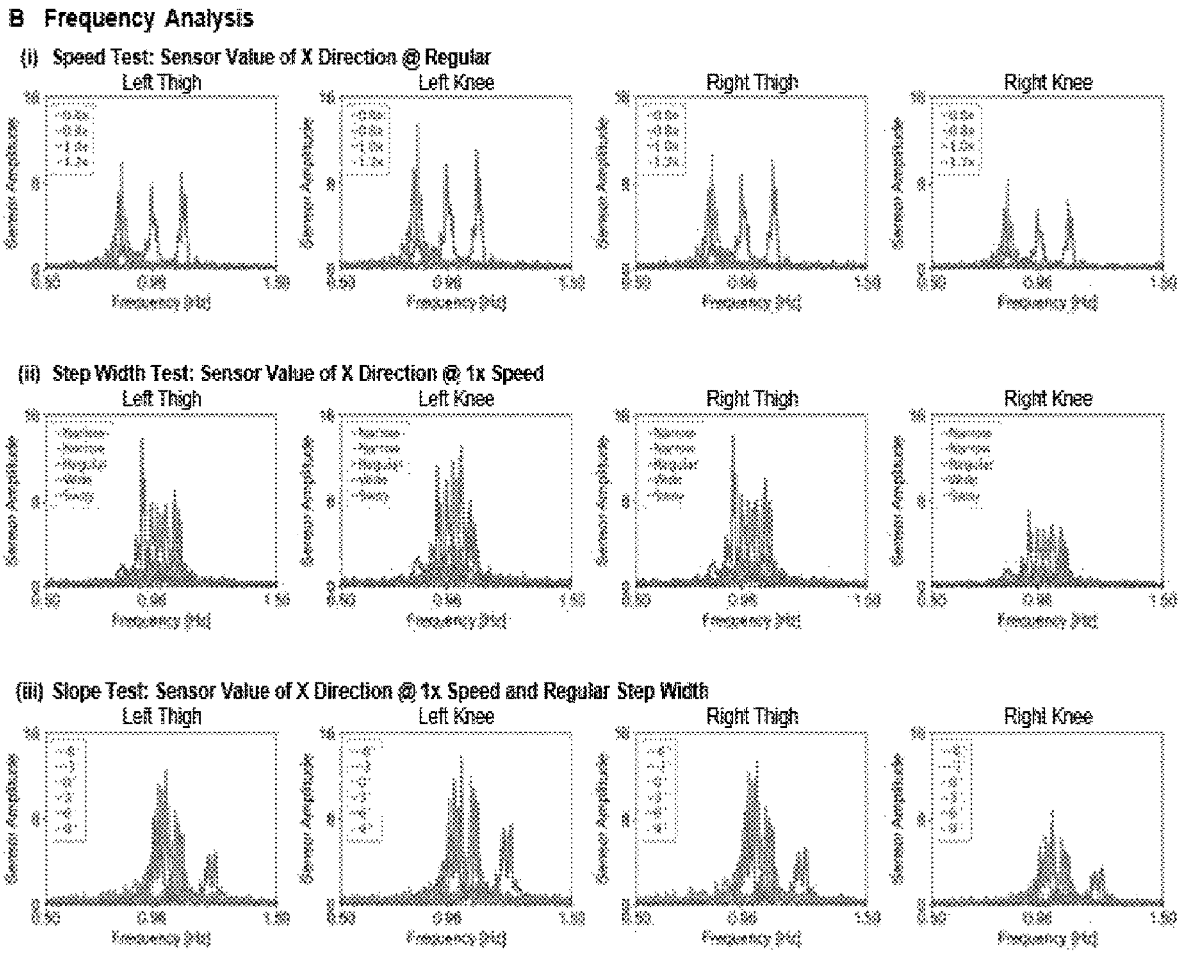

FIGS. 42A and 42B depict data related to lower body walking. FIG. 42A depicts different walking step widths and accuracy comparison between different data splitting methods and FIG. 42B depicts a frequency analysis from the perspective of walking speed, step width, and slope.

Figure 43A:
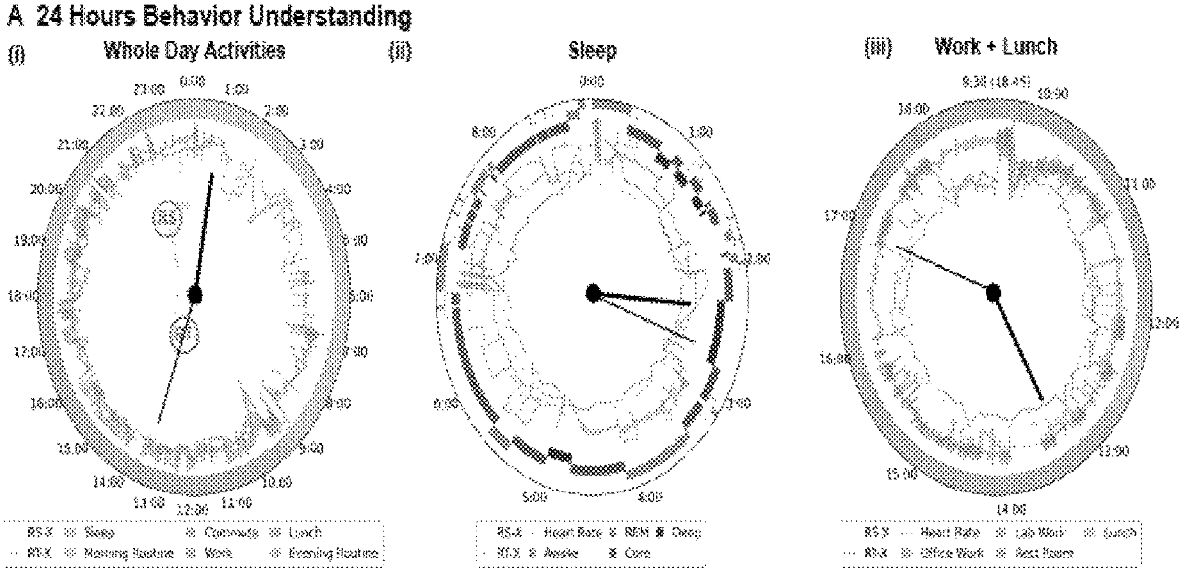
Figure 43B:
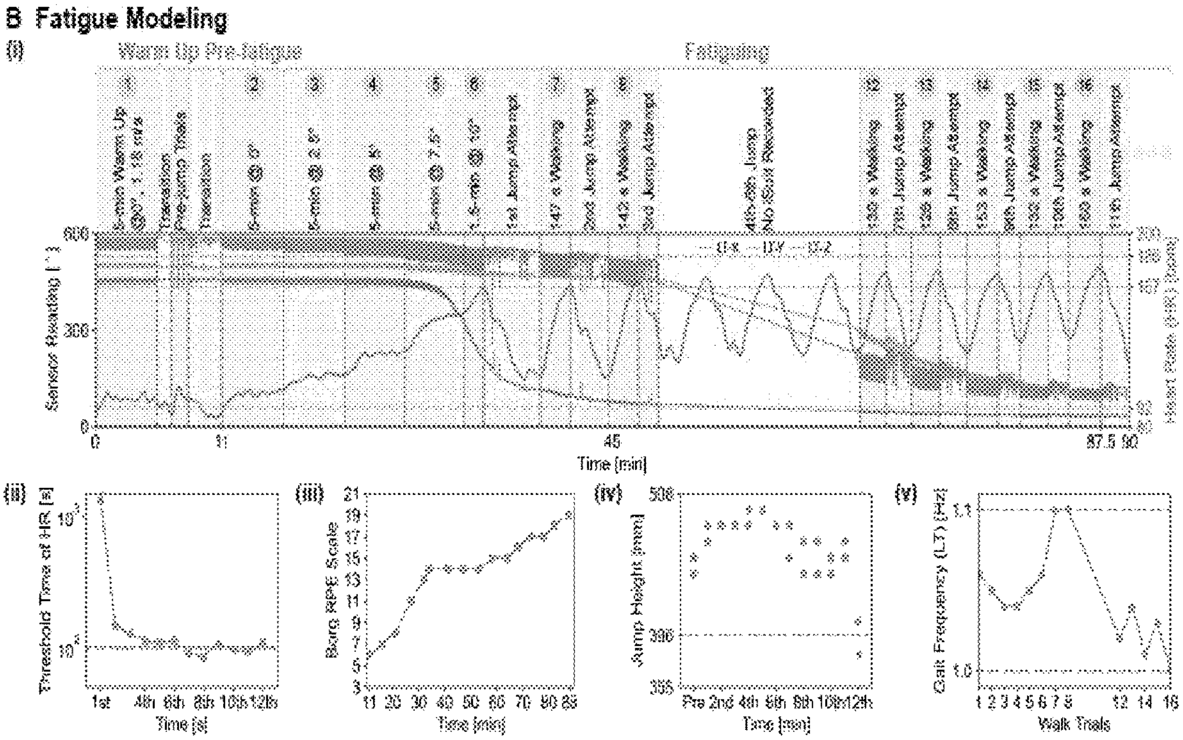
Figure 43C:
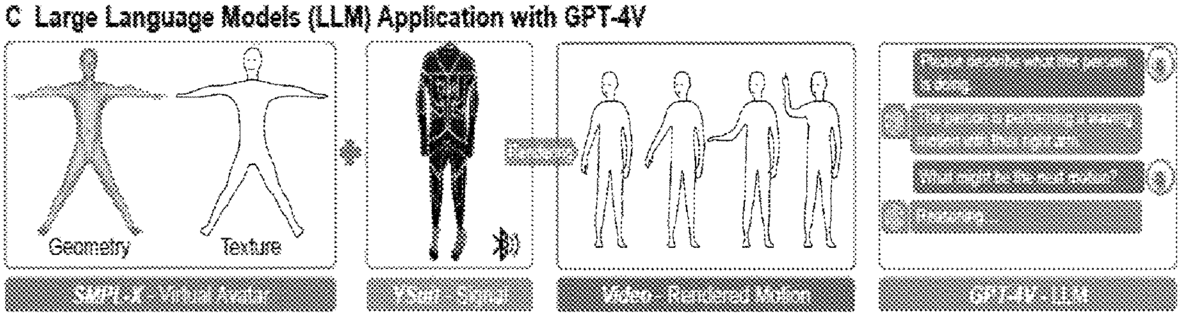

FIGS. 43A-43C depict behavior understanding overtime. FIG. 43A depicts 24-hour behavior for right shoulder (RS) and right thigh (RT) over time categorized by activities such as sleeping with different phases, work and lunch, etc. FIG. 43B depicts information related to the fatigue modeling procedure and monitoring of heart rate, subjective Borg RPE scale, jump height and changes in gait frequency. FIG. 43C depicts a procedure for building large motion models to analyze individual behavior.

Figure 44A:
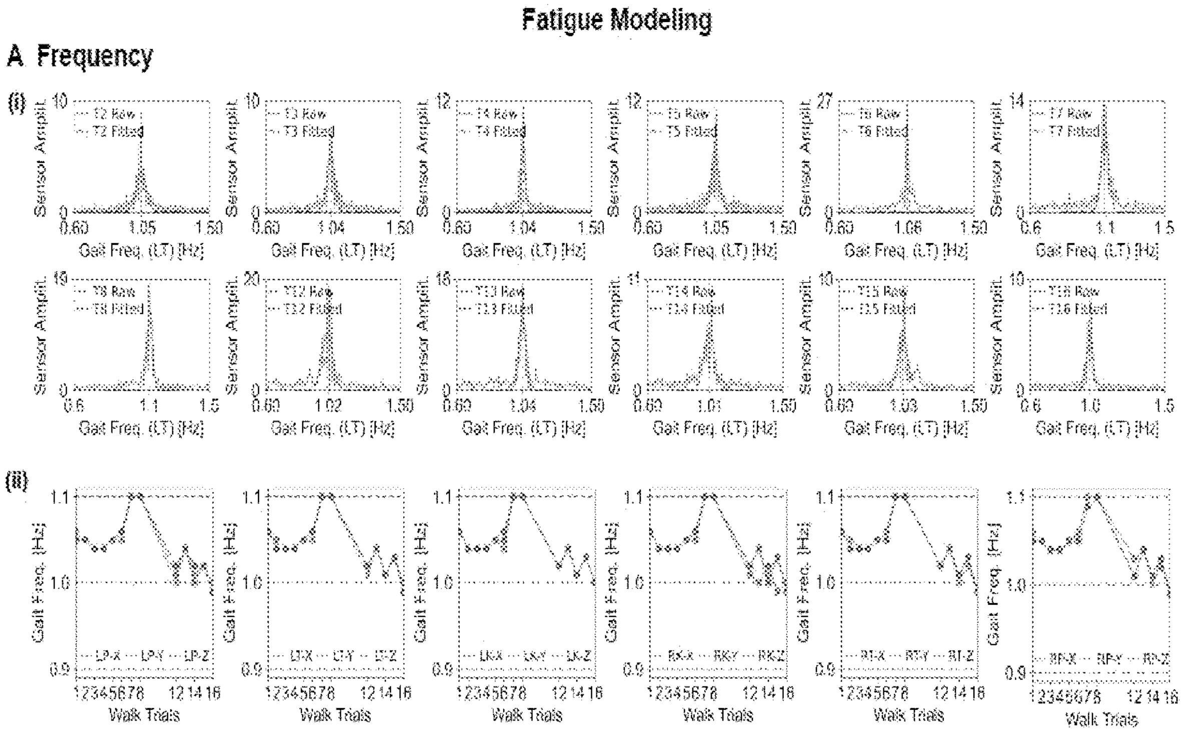
Figure 44B:
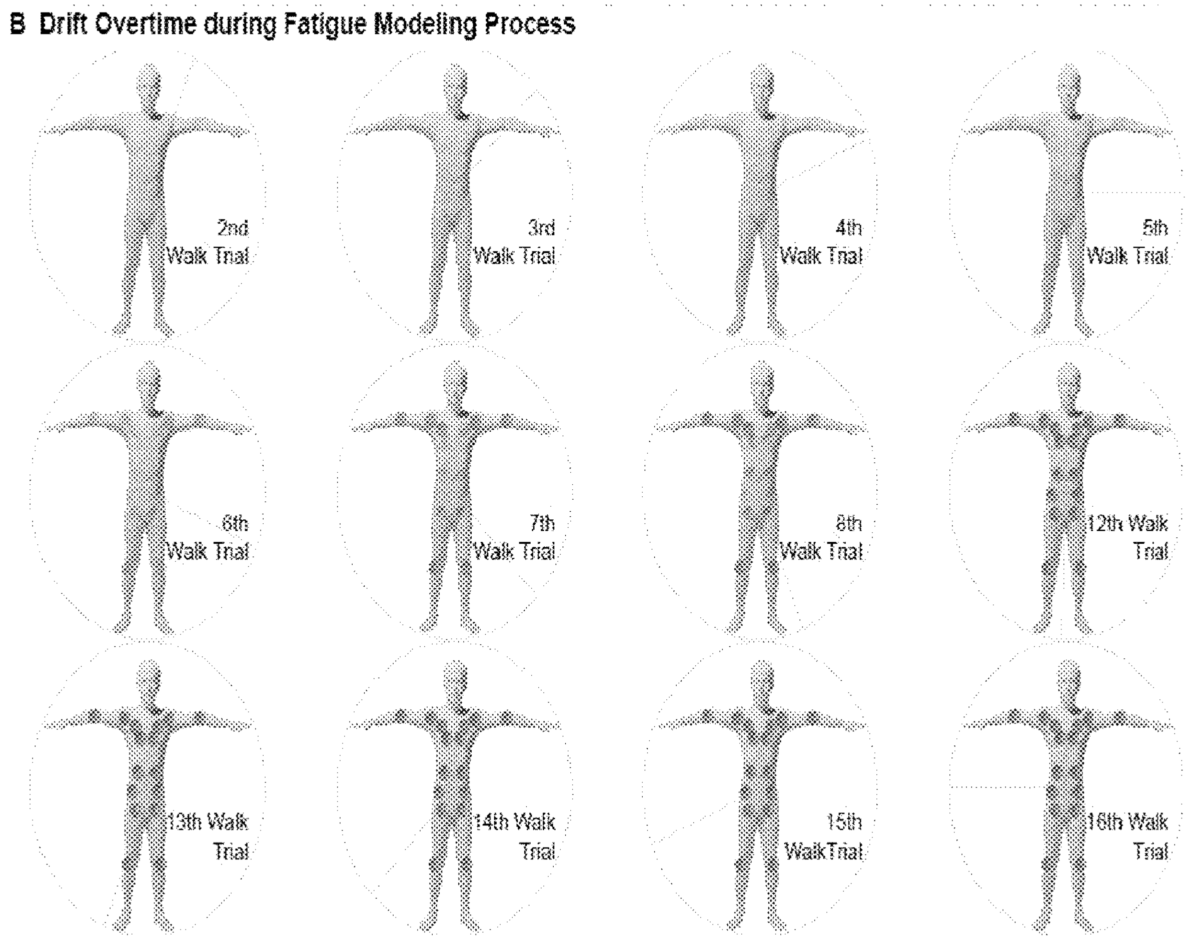

FIGS. 44A and 44B depict fatigue modeling. FIG. 44A depicts frequency analysis during the fatigue procedure and FIG. 44B depicts spatial distribution of the sensor over time.

Figure 45:
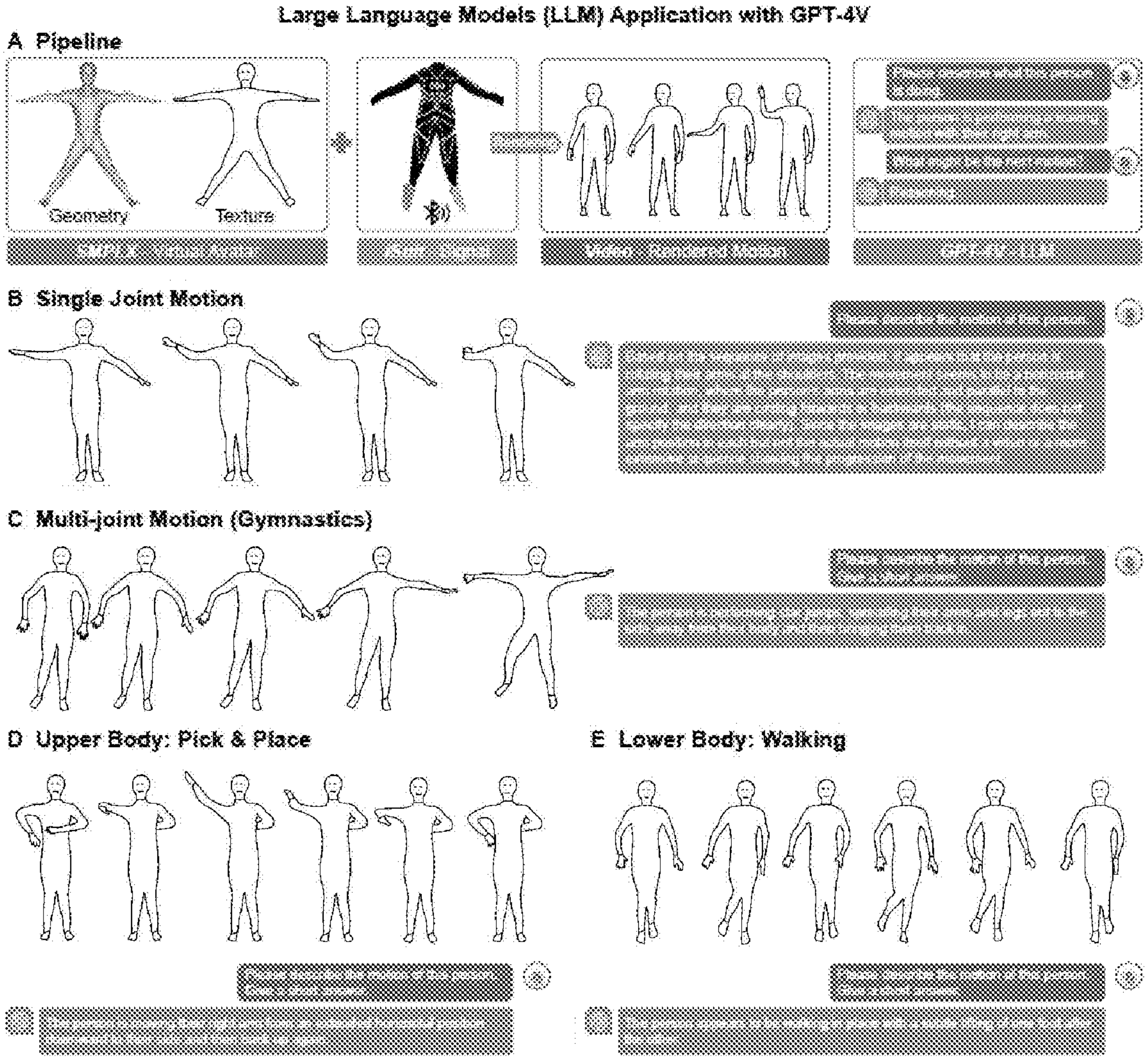

FIG. 45 depicts examples of motion descriptions using a large language model.

Figure 46:
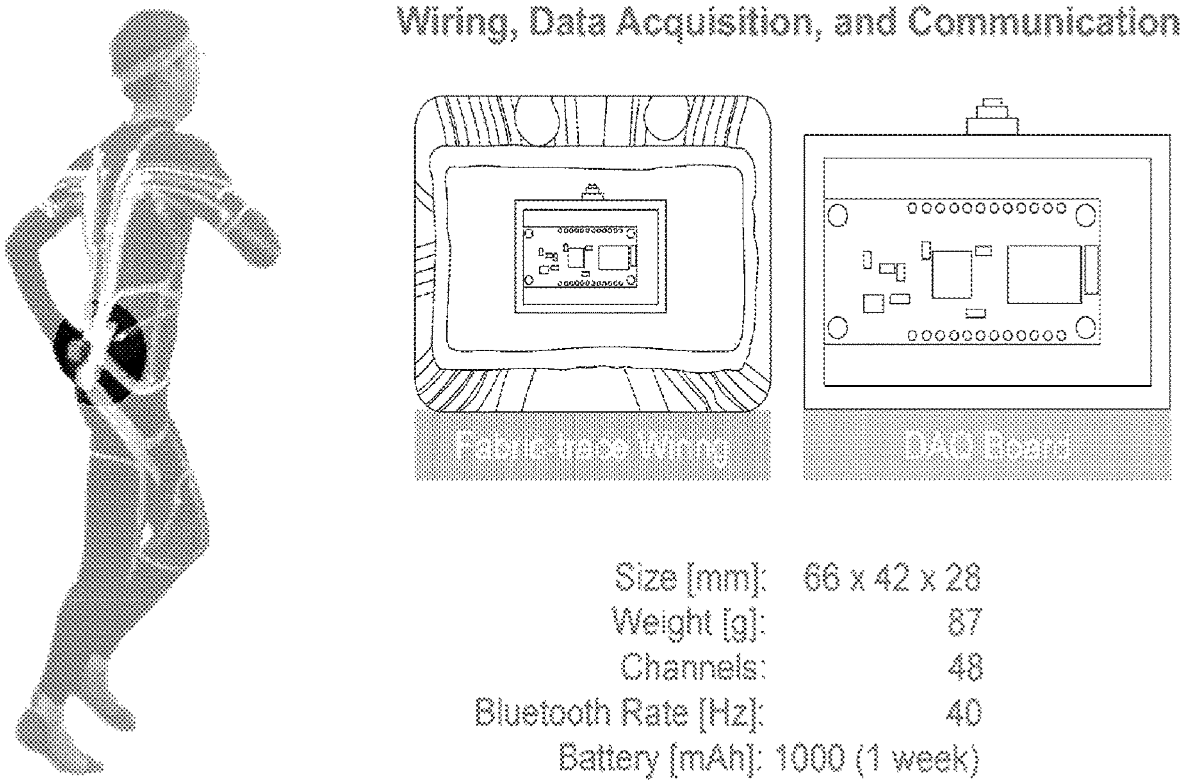

FIG. 46 depicts a view of the wiring, data acquisition and communication of the stretchable fabric garment in accordance with one aspect of the invention.

Like parts are marked throughout the specification and drawings with the same reference numerals, respectively.

DETAILED DESCRIPTION OF THE PREFERRED EMBODIMENTS

To maximize wearer comfort and safety, and encourage real-world usage, the inventors of the present invention sought to create a reliable strain sensor made of entirely conductive and non-conductive fabrics bound together with thin films of breathable thermoplastic fabric adhesive. The fabric sensor of the instant invention can be coupled to, integrated into, or otherwise directly embedded into commercial activewear, clothing, garments and/or and other wearable devices. In one embodiment, the fabric sensors can use the garment or wearable device itself as the dielectric layer of the sensors, thus overcoming existing challenges of bulky attachment modes and sensor detachment and/or slippage. In another embodiment, the fabric sensor is encompassed in a textile sensor unit that can be adhered to or coupled to a stretchable fabric garment at one or more locations where it is desired to measure motions of a wearer.

By using fabrics and porous layers that offer a unique combination of flexibility, stretchability, and breathability, sensor wearability and user tactile comfort (as measured by air permeability and water vapor transmission) are prioritized in a way that existing elastomer-based sensors do not.

Sensor performance was initially characterized using three common fabrics (i.e., cotton, polyester, and nylon) as the dielectric materials to demonstrate the respective advantages of each. In addition, the sensor's cyclic stability, frequency dependence, electromechanical response to temperature and humidity, and washability are evaluated. Along with its functional benefits, the fabric sensors are fabricated using a simple, highly reproducible, and low-cost stacked assembly method, which allows for their seamless integration into commercial clothing and other wearable devices to facilitate the collection of reliable human motion data.

As used herein, "a," "an," and "the" refer to both singular and plural referents unless the context clearly dictates otherwise.

As used herein, the term "about" refers to a measurable value such as a parameter, an amount, a temporal duration, and the like and is meant to include variations of +/−15% or less, preferably variations of +/−10% or less, more preferably variations of +/−5% or less, even more preferably variations of +/−1% or less, and still more preferably variations of +/−0.1% or less of and from the particularly recited value, in so far as such variations are appropriate to perform in the invention described herein. Furthermore, it is also to be understood that the value to which the modifier"about" refers is itself specifically disclosed herein.

As used herein, spatially relative terms, such as "beneath," "below," "lower," "above," "upper" and the like, are used for ease of description to describe one element or feature's relationship to another element(s) or feature(s) as illustrated in the figures. Spatially relative terms may be intended to encompass different orientations of the device in use or operation in addition to the orientation depicted in the figures.

It is further understood that the terms "front" and "back" are not intended to be limiting and are intended to be interchangeable where appropriate.

As used herein, the terms "comprises" and/or "comprising," specify the presence of stated features, integers, steps, operations, elements, and/or components, but do not preclude the presence or addition of one or more other features, integers, steps, operations, elements, components, and/or groups thereof.

As used herein the term "stretchable fabric garment" refers to a wearable device that may encompass a glove, a sock, a sleeve (e.g., arm or leg), a bodysuit, a modular knee sleeve, a modular ankle sleeve, a modular elbow sleeve, leggings, tights, a shirt, a unitard, a neck brace, and combinations of one or more of the foregoing in which one or more fabric capacitive strain sensors or textile sensor units as further described herein are adhered to, integrated in, or otherwise coupled with stretchable fabric garment.

As used herein, the term "bodysuit" refers to a stretchable fabric garment that covers the entirety of the torso, arms and legs of the wearer (i.e., the hands below the wrists, the feet below the ankles, and the head of the wearer remain uncovered).

As used herein, the terms "stretchable electronic sensor," "electronic sensor," "strain sensor," and "capacitive strain sensor" are used interchangeably and refer to a multilayer textile strain sensor that is integrated into the stretchable fabric garment and in which the stretchable fabric garment forms one of the layers of the stretchable electronic strain sensor.

As used herein, the term "textile sensor unit" refers to a standalone multilayer textile strain sensor that can be adhered or otherwise affixed to and/or coupled to the stretchable fabric garment.

In one embodiment, the present invention relates generally to a stretchable electronic sensor or textile sensor unit, wherein the stretchable electronic sensor or textile sensor unit comprises:

two or more stretchable fabric electrodes separated by at least one stretchable dielectric layer, wherein the two or more stretchable fabric electrodes are secured to the at least one dielectric layer with two or more adhesive layers, wherein the stretchable electronic sensor or textile sensor unit has an air permeability of greater than 50 $l/m^2$ s, preferably between 50 and 1,000 $l/m^2$ s, or a water vapor permeability greater than about 30 $g/m^2$ h, preferably between about 30 and about 150 $g/m^2$ h.

In another embodiment, the present invention also relates generally to a stretchable electronic sensor or textile sensor unit, wherein the stretchable electronic sensor or textile sensor unit comprises, in order:

a first outer stretchable conductive fabric layer;

a first inner stretchable dielectric layer;

an inner stretchable conductive fabric layer;

a second inner stretchable dielectric layer; and a second outer stretchable conductive fabric layer;

wherein an adhesive layer is sandwiched between each of the layers of the stretchable electronic sensor or textile sensor unit, wherein the adhesive layer comprises an adhesive film, wherein the adhesive film preserves porosity between adjacent layers, and wherein the layers of the stretchable electronic sensor or textile sensor unit are joined together to form the stretchable electronic sensor or textile sensor unit.

In one embodiment, the layers are joined together by laminating the layers using at least one of heat or pressure.

In another embodiment, the inner stretchable conductive fabric layer has a surface area that is less than the first inner stretchable dielectric layer or the second inner stretchable dielectric layer. The first outer stretchable conductive fabric layer, the second outer stretchable conductive fabric layer and the inner stretchable conductive fabric layer are knit fabric or woven fabrics.

In one embodiment, the present invention also relates generally to a wearable electronic device comprising one or more stretchable electronic sensors or textile sensor units as described herein, wherein the wearable electronic device comprises a stretchable garment, wherein the stretchable garment comprises an outer surface and an inner surface;

wherein the one or more stretchable electronic sensors are coupled to or integrated into the stretchable garment at a location where it is desirable to monitor motion of a user.

In one embodiment, the stretchable garment itself comprises one of the first inner stretchable dielectric layer or the second inner stretchable dielectric layer of the one or more stretchable electronic sensors; and one of the first outer stretchable conductive fabric layer and the second outer stretchable conductive layer is contactable with the user's skin. In one embodiment, the stretchable electronic sensor may comprises a ground wire connected to the first outer stretchable conductive fabric layer or the second outer stretchable conductive layer and a second wire or layer connected to the inner stretchable conductive fabric layer.

In addition, in one embodiment, the stretchable electronic sensor may also include a non-elastic tab at a first end and a second end of the stretchable electronic sensor or textile sensor unit, such that the surface area between the non-elastic tabs define the area of stretchability of the stretchable electronic sensor or textile sensor unit.

In another embodiment, the textile sensor unit is formed separately from the stretchable fabric garment and is adhered to or otherwise coupled with the stretchable fabric garment at one or more locations where it is desirable to measure motion of a wearer, such as one or more major joints of the body.

In addition, in one embodiment, each of the one or more stretchable electronic sensors or one or more textile sensor units is coupled to a DAQ to read each of the one or more stretchable electronic sensors or one or more textile sensor units and transmit the sensor readings to a controller, such as an external laptop or other computer that can receive signals from each stretchable electronic sensor or textile sensor unit and measure and monitor capacitive response resulting from the motion of the wearer.

In one embodiment, each of the stretchable electronic sensors or textile sensor units is electrically coupled to the DAQ using an interconnect, wherein each interconnect comprises a stretchable electronic material or a wire or other means of electrically connecting each of the one or more stretchable electronic sensors or one or more textile sensor units to the controller.

In one embodiment, each interconnect comprises a stretchable conductive fabric trace, which may constitute the same conductive fabric that is used in the textile sensor unit. The inventors of the present invention have found that the use of the stretchable interconnects instead of a ground wire and second wire provides greater comfort to the wearer, allowing for extended use of the stretchable fabric garment and contributes to more accurate sensor readings as further described herein. These stretchable interconnects are backed with an adhesive layer, which is preferably the same adhesive layer as used in the fabricating the textile sensor unit, and the adhesive layer is used to adhere the stretchable interconnects to the stretchable fabric garment. The stretchable interconnects connect each of the textile sensor units to the DAQ. In one embodiment, the terminal end of each stretchable interconnect is connected to a wire and the wires then connect to the DAQ.

As described herein, the present invention is directed to a fabric capacitive strain sensor or textile sensor unit that can be integrated into, adhered to, or otherwise coupled to wearable electronic devices, including stretchable fabric garments, that may include everyday clothing, to measure human motions. The sensor or textile sensor unit is made of thin layers of breathable fabrics and exhibits high strains (>90°/), excellent cyclic stability (>5000 cycles), and high water vapor transmission rates (>30 g/h $m^2$), the latter of which allows for sweat evaporation, an essential parameter of comfort. The sensor's functionality was analyzed under conditions similar to those experienced on the surface of the human body (35° C. and 90±2% relative humidity) and after washing with fabric detergent.

As described in detail herein, the stretchable electronic sensors or textile sensor units of the invention show stable capacitance at excitation frequencies up to 1 MHz, facilitating their low-cost implementation. With the prioritization of breathability (air permeability and water vapor transmission), the stretchable electronic sensor and textile sensor unit designs described herein pave the way for future comfortable, unobtrusive, and discrete sensory clothing and wearable devices that exhibit increased comfort.

As described herein, the stretchable fabric garment may encompass a glove, a sock, a sleeve (e.g., arm or leg), a bodysuit, a modular knee sleeve, a modular ankle sleeve, a modular elbow sleeve, leggings, tights, a shirt, a unitard, a neck brace, and combinations of one or more of the foregoing that encompasses one or more of the fabric capacitive strain sensors or textile sensor units described herein to capture body motion/range of motion at one or more joints.

For example, in one exemplary embodiment, the stretchable fabric garment comprises a bodysuit that weighs about 500-00 grams, including a lightweight base suit that weighs about 250-300 grams and a central DAQ unit that weighs about 50-100 grams) and incorporates one or more textile sensor units. In one embodiment, this stretchable fabric garment houses 38 textile sensor units or stretchable electronic sensors optimally positioned across the entire body to cover 13 body joints and 39 degrees of freedom (DoFs). These stretchable electronic sensors or textile sensor units are interconnected via conductive-fabric-based traces to the DAQ unit. While this description is provided with respect to a bodysuit, the present invention may encompass any portion thereof as further described herein.

The DAQ unit continuously transmits sensor readings from all of the sensors (i.e., 38 sensors for a bodysuit) (such as over Bluetooth or other technology) to a remote computer (at an average speed of i.e., 40 Hz), ensuring seamless data collection for a period of time, which may encompass one or more minutes, one or more hours, one or more days, or a week, depending on the desired amount of time for data collection.

The stretchable fabric garment described herein demonstrates remarkable accuracy when compared to an optical motion capture system. Through the development of supervised machine learning algorithms, sensor readings are effectively mapped to whole-body joint angles provided by the optical system, achieving an average calibration accuracy of one degree for simple single-joint motions and two degrees for complex multi-joint motions across one or more joints.

Beyond assessing joint angles frame by frame, the stretchable fabric garment is utilized to identify motion patterns, offering insight into wearer behavior. These patterns encompass sequential motions, such as reaching for objects at different heights or varying walking speeds and step widths on flat, inclined or declined paths.

Additionally, the stretchable fabric garment encompassing a bodysuit or a portion thereof in accordance with one aspect of the present invention that can record 24-hour wearer behavior data to analyze activity patterns and joint movement allocation throughout the day, highlighting potential fatigue-inducing activities. To further evaluate performance qualitatively, a fatiguing process can also be implemented. This comprehensive analysis serves various purposes including enhancing safety, optimizing performance, improving healthcare, boosting productivity, informing design practices, and refining athletic training. A procedure that integrates large language models to interpret data of the wearable electronic device may also be used to streamline data analysis, eliminate the need for manual data collection and labeling, and provide a means for developing large motion models capable of analyzing social interactions at scale.

In one embodiment, the knit fabrics and woven fabrics are selected from the group consisting of conductive polyester, conductive nylon, conductive natural fibers, including conductive cotton and cotton blends, conductive polypropylene, knit or woven fabrics coated with a conductive ink or other conductive layer or material, and combinations of any of the foregoing.

In one embodiment, the first outer stretchable conductive fabric layer, the second outer stretchable conductive fabric layer and the inner stretchable conductive fabric layer have a surface resistivity of less than 10 Ω/sq, more preferably less than 1 Ω/sq.

In one embodiment, the stretchable conductive fabric layers comprise a fabric material woven or knitted from fibers coated with conductive nanoparticles and/or nanofibers. In one embodiment the fibers comprise natural fibers or polymer fibers, wherein the polymer fibers comprise nylon, polyester, polyurethane (including Lycra® and spandex), and combinations of one or more of the foregoing, In one embodiment, the conductive nanoparticles and/or nanofibers are selected from the group consisting of silver, gold, copper, zinc oxide, aluminum, tin, nickel, carbon black, carbon nanofibers, carbon nanotubes, graphite, graphene, iron and iron compounds (including iron compounds and alloys such as carbonyl iron, $FeHO_2$, NdFeB, etc.), and combinations thereof.

The adhesive layer may be any adhesive layer that can be used to adhere the various fabric layers and provide the desired properties of porosity, breathability, air permeability and water vapor transmission rate. In one embodiment, the adhesive layer comprises a thermoplastic adhesive which may be broadly defined to be any polymer which softens and melts when heated. In one embodiment, the thermoplastic adhesive is a thermoplastic film or web. Suitable thermoplastic films and webs include hot melt adhesive films, including, but not limited to, ethylene-vinyl acetate, polyolefin-based hot melt adhesives, polyamides, thermoplastic polyurethane, epoxies, polyvinyl acetate, polyimides, polyacrylates and polyesters. One example of a suitable adhesive layer is a thermoplastic polyurethane fabric tape.

Typical air permeability values for clothing may range from 1 $l/m^2$ s in the case of garments with impermeable membranes up to 1,000 $l/m^2$ s for highly permeable garments such as unlined fleece garments. In one embodiment, the stretchable electronic sensor or textile sensor unit has an air permeability that is greater than 50 $l/m^2$ s or greater than 75 $l/m^2$ s or greater than 100 $l/m^2$ s. In another embodiment, the stretchable electronic sensor or textile sensor unit has an air permeability in the range of about 50 to about 1,000 $l/m^2$ s, more preferably about 100 to about 500 $l/m^2$ s.

In one embodiment, the stretchable electronic sensor or textile sensor unit has a water vapor permeability that is greater than about 30 $g/m^2$ h, or greater than about 35 $g/m^2$ h, preferably between about 30 and about 150 $g/m^2$ h, more preferably between about 35 to about 120 $g/m^2$ h or between about 35-45 $g/m^2$ h or between about 38-41 $g/m^2$ h.

In one embodiment, the stretchable electronic sensor or textile sensor unit described herein is coupled to or integrated into a wearable electronic device. The wearable electronic device comprises a stretchable fabric garment comprising an outer surface and an inner surface and at least one stretchable electronic sensor or textile sensor unit is coupled to, integrated into, or otherwise embedded into the wearable electronic device or stretchable fabric garment at one or more locations where it is desirable to monitor motion of a user. In one embodiment, the stretchable electronic sensor is coupled to or integrated into the stretchable fabric garment so that the stretchable fabric garment comprises one of the first inner stretchable dielectric layer or the second inner stretchable dielectric layer of the stretchable electronic sensor and one of the first outer stretchable conductive fabric layer and the second outer stretchable conductive layers is contactable with the user's skin.

In one embodiment, the stretchable fabric garment or other wearable electronic device is configured to apply compression to the stretchable electronic sensor or textile sensor unit so as to maintain contact between the stretchable electronic sensor and the user's skin. In one embodiment, the compression is provided by the stretchable garment.

The stretchable garment or wearable electronic device may encompass a glove, a sock, a sleeve (e.g., arm or leg), a bodysuit, a modular knee sleeve, a modular ankle sleeve, a modular elbow sleeve, leggings, tights, a shirt, a unitard, a neck brace, and combinations of one or more of the foregoing. Other stretchable garments and wearable electronic devices may also be usable in the present invention so long as they can be configured to provide compression to one or more stretchable electronic sensors or textile sensor units incorporated therein.

The stretchable fabric garment or other wearable electronic device may comprise one or more stretchable electronic sensors or textile sensor units, wherein each stretchable electronic sensor or textile sensor unit is integrated into or adhered to the stretchable fabric garment at a location where it is desired to monitor motion of a user. The stretchable electronic sensor or textile sensor unit also comprises a ground wire or layer connected to the first or second outer stretchable conductive fabric layer and a second wire or layer connected to the inner stretchable conductive fabric layer. The ground wire or layer and second wire or layer are coupled to a controller to receive signals from the stretchable electronic sensor and measure and monitor capacitive response resulting from the motion of the user. A described in detail above, stretchable interconnects may be used in place of the ground wire and second wire.

In one embodiment, the controller may comprise a stretchable circuit board such as described in U.S. Pat. Pub. No. 2021/0410283 to Bottiglio et al., the subject matter of which is herein incorporated by reference in its entirety.

In one embodiment, the textile sensor unit is a five-layer textile-based capacitive sensor, featuring one internal conductive signal layer wrapped by two conductive grounding outer layers, separated by two non-conductive dielectric layers, and bonded with thin films of breathable thermoplastic fabric adhesives as shown in FIGS. 3A-3B and 31. In one embodiment, the textile sensor unit has a form factor of 160×10×2.4 mm. The textile sensor unit can be manufactured by heat-pressing of all laser-cut materials simultaneously at a temperature and time sufficient to melt the adhesive without damaging the fabric layers, for example at a temperature of 160° C. for 30 seconds. This streamlined manufacturing method enables rapid scale-up and mass production.

Under 2000 loading cycles with applied strain ranging from 0% to 50%, a representative sensor shows increased capacitance at 0% (base capacitance, indicated by the red line) and decreased capacitance at 50% (maximum capacitance, indicated by the green line), as illustrated in FIG. 31. The base and maximum capacitances experience drifts of 10.6% and 3.1% over 2000 cycles, respectively, with the base capacitance drift stabilizing quickly to 7.5% after the 1st cycle and 5.0% after the 14th cycle. The sensor behavior demonstrates slight drift over a one-week period of letting it stand, which can be reset by washing, as depicted in FIG. 32. Following manufacturing and washing, both the stretch test (FIG. 31) and fix-end bend test (FIG. 32) show low hysteresis during loading/unloading, demonstrating a homogeneous one-to-one correspondence between capacitance and displacement/angle. In contrast, the force-displacement displays larger hysteresis (FIG. 32). The initial strain cycles induce plastic deformation in the sensor units, but stabilizing quickly, primarily due to breaks in the thermoplastic adhesives. It is believed that the stable performance, coupled with the sensor's washable nature for multiple uses, holds promise for real-world applications.

In one embodiment, the present invention also relates generally to a method of making a customized stretchable fabric garment for measuring a change in a magnitude of capacitance of one or more joints of a wearer, the method comprising the steps of:

a. determining direction and placement of one or more stretchable electronic sensors or textile sensors units on the stretchable fabric garment;
b. marking the placement of the one or more stretchable electronic sensors or textile sensor units determined in step a) on the stretchable fabric garment;
c. coupling the one or more stretchable electronic sensors or textile sensor units to the stretchable fabric garment; and
d. constructing wearer body position using sensor data obtained from the one or more textile sensor units or stretchable electronic sensors.

In one embodiment, the method further includes the steps of: (1) adhering stretchable interconnects such as stretchable conductive fabric traces to the garment to connect the one or more textile sensor units to a DAQ; and (2) positioning a DAQ on the stretchable fabric garment and connecting each stretchable interconnect to the DAQ.

Considering the variations in limb lengths and body shapes among individuals that may be observed, it is also contemplated that a fully customizable garment design may be created. As a first step, a 3D digital model of the user may be reconstructed, such as from an RGB video, as illustrated in FIG. 31 and FIG. 34. Leveraging a large dataset of human daily poses such as AMASS (Archive of Motion Capture as Surface Shapes), a statistical analysis can be conducted on the movement range of multiple joints with degrees of freedom (DoFs) throughout the entire body, as depicted in FIG. 31 and FIG. 34. Based on each joint's movement range, movements can be simulated with a digital human and use grid search to determine the direction and placement of the sensors on the stretchable fabric garment, as shown in FIG. 31 and FIG. 34.

In one embodiment, textile sensor units can be manufactured in batches to minimize sensor reading variances. For example, textile sensor units may be manufactured in batches of fifty, with a factory sensor reading variance as low as 2%. These sensors undergo a number of pre-cycles, for example at least 10 or at least 25 or at least 50 or at least 100 pre-cycles under 50% strain on an automatic testbed to eliminate plastic deformation, followed by washing and drying for assembly, as depicted, for example in FIG. 34. All sensors are then integrated into or adhered to the base suit at optimal locations. Interconnected via four-millimeter-wide conductive fabric traces, the same material as the sensors themselves, to a DAQ unit, these traces form parasitic capacitors that increase sensor capacitance under no strain (FIG. 32) and decrease under strain due to increased distance between traces (FIG. 32). In one embodiment, as an example, the DAQ unit has a form factor of 66×42×28 mm and weighs 87 grams. It can access 48 capacitive sensors in serial at 40 Hz and is powered by a 1000 mAh battery, allowing for over one week of data collection. Equipped with an onboard microprocessor (Adafruit Feather 32u4 Bluefruit LE), it transmits all sensor readings to a remote computer via Bluetooth. All materials used in the stretchable fabric garment described herein are fabric, elastic, and breathable, ensuring a comfortable user experience. The customized stretchable fabric garment provides lightweight, portable, facilitating long-term human motion tracking.

The capacitance of each textile sensor unit is proportional to the sensing area (length×width), as shown in FIG. 32, where a constant sensor length of 160 mm was maintained while varying the sensor width. The capacitance measures approximately 100 pF when the sensor dimensions are 160×10 mm. The Adafruit MPR121 was used as the data acquisition (DAQ) system to record the sensor capacitance, configuring the MPR121 registers with MPR121_CONFIG1 set to 0x10 (16 uA charge current) and MPR121_CONFIG2 set to 0x20 (0.5 uS encoding). As shown in FIG. 32, the DAQ system offers a resolution of 10 bits (1024), yet its readings are not linearly proportional to the capacitance.

To derive the sensitivity curve, the first derivative of the curve was calculated. The sensitivity peaks at 57 pF and diminishes gradually on either side. To make full usage of the DAQ's measurement range, it was decided that maintaining a sensor form factor 160-10 mm would be ideal. During the initial 50% strain (extending the sensor by 80 mm), both capacitance and pulling force increased linearly with sensor width, as demonstrated in FIG. 32.

In one embodiment, it was determined that adding the stretchable fabric traces to the textile sensor unit increased total capacitance, and both trace width and length contributed linearly to the increase, as shown in FIG. 32.

The stretchable fabric garment described herein is designed for multiple uses, necessitating careful consideration of its long-term application. A slight sensor drift (7%) was observed over a one-week period of inactivity, as shown in FIG. 32, where the behavior during the second 100 stretch cycles reflects the sensor's response after one week compared to the first 100 cycles. However, as shown in FIG. 34, it can be seen that the sensor's behavior can recover after washing and drying.

The stretchable fabric garment customization procedure described herein can be used to optimize the placement position for each joint orientation direction, determining the ideal location for each textile sensor unit corresponding to each direction. In addition to sensor noise within each unit, the stretchable interconnects connecting the sensors to the DAQ system also induce capacitance changes (FIG. 32), along with parasitic capacitance between nearby sensors and stretchable interconnects. Furthermore, human body skin stretch and bending occur across multiple planes, activating local textile sensor units. Consequently, each textile sensor unit is influenced by movements in other areas of the body. These combined factors impact the sensor readings specific to individual joint orientations.

Therefore, in one embodiment, the stretchable fabric garment described herein utilizes a plurality of textile sensor units to jointly predict individual joint rotation directions. For example, 38 textile sensor units may be used to jointly predict individual joint rotation directions of major body joints. The k-Nearest Neighbors (kNN) algorithm was used to select the most impactful sensors for predicting each joint angle, ranking their contribution to improving prediction accuracy. As depicted in FIG. 35, involving more sensors in the prediction leads to smaller errors, and even three sensors can significantly enhance accuracy. All angle errors for every joint are smaller than 1.5°. Moreover, by analyzing each sensor's contribution to specific joints, it is possible to identify correlations between joint movements. This is facilitated by the sensing network formed by multiple sensor units.

In one embodiment, the present invention also relates generally to a method of making a stretchable electronic sensor that is capable of being integrated into a wearable electronic device, the method comprising the steps of:

a) sandwiching an adhesive film between a first stretchable conductive fabric layer and a first stretchable dielectric layer and joining the first stretchable conductive fabric layer to the first stretchable dielectric layer; and b) sandwiching an adhesive film between the first stretchable dielectric layer and a second stretchable conductive fabric layer and joining the first stretchable dielectric layer to the second stretchable conductive fabric layer, wherein the adhesive film preserves porosity between adjacent layers.

In one embodiment, the method further comprises the steps of:

c) sandwiching an adhesive film between the second stretchable conductive fabric layer and a second stretchable dielectric layer and joining the first stretchable dielectric layer to the second stretchable conductive fabric layer; and d) sandwiching an adhesive film between the second stretchable dielectric layer and a third stretchable conductive fabric layer and joining the second stretchable dielectric layer to the third stretchable conductive fabric layer, wherein the adhesive film preserves porosity between adjacent layers.

In one embodiment, the layers are joined together by laminating the layers using at least one of heat or pressure. The temperature at which the layers will be joined together will depend in part on the melting point of the adhesive being used. In one embodiment, the melting point is at least slightly above the melting point of the particular adhesive.

In one embodiment, the second stretchable conductive fabric layer acts as an internal electrode layer, wherein the inner electrode layer is smaller in surface area than the first stretchable conductive fabric layer and/or the third stretchable conductive fabric layer.

In one embodiment, a ground wire or layer is connected to the first or third stretchable conductive fabric layer and a second wire or layer is connected to the second stretchable conductive fabric layer. Alternatively, stretchable interconnects such as stretchable conductive fabric traces can be used in place of the ground wire and second wire as further described herein.

The first, second and third stretchable conductive fabric layer comprise a conductive knit fabric or a conductive woven fabric that is breathable and washable.

In one embodiment, the present invention also relates generally to a method of making a stretchable fabric garment comprising one or more stretchable electronic sensors, the method comprising the steps of.

a) sandwiching an adhesive film between a first stretchable conductive fabric layer and a first stretchable dielectric layer and joining the first stretchable conductive fabric layer to the first stretchable dielectric layer; wherein the first stretchable dielectric layer extends across approximately 50% of the length of the first dielectric layer;

b) sandwiching an film between the first stretchable dielectric layer and a second stretchable conductive fabric layer and joining the first stretchable dielectric layer to the second stretchable fabric electrode, wherein the second stretchable conductive fabric layer electrode is smaller in surface area than the first stretchable dielectric layer;

c) sandwiching an adhesive film between an inner layer of the stretchable garment and the first stretchable conductive fabric layer and joining the first stretchable conductive fabric layer to the inner layer of the stretchable fabric garment; and d) sandwiching an adhesive film between the outer layer of the stretchable fabric garment and the second conductive fabric layer and joining the second conductive fabric layer to the outer surface of the stretchable fabric garment;

wherein the stretchable electronic sensor is integrated into the stretchable fabric garment.

An example of a textile sensor unit that comprises a capacitive strain sensor in accordance with the invention is illustrated in FIGS. 1(*a*) and 1(*b*). The capacitive strain sensor comprises conductive fabric electrodes separated by dielectric fabric layers. Each layer is stacked and affixed with breathable adhesive film. In one embodiment, flexible wires are used to interface the sensors with external data acquisition electronics. In another embodiment, as shown in FIG. 46, stretchable interconnects are used to connect the textile sensor units to the DAQ as described above.

The external data acquisition electronics may include, a "plug and play system," for example, an open source software and hardware system such as an Arduino Pro mini and MPR121 Adafruit breakout circuit.

FIG. 1(*a*) illustrates a three-layer sensor configuration while FIG. 1(*b*) illustrates a five-layer sensor configuration.

In the five-layer configuration, the external electrode is connected to ground, which reduces parasitic capacitance and shields the sensor, therefore making the device more suitable for contact with human skin. The characteristics of the constituent sensor materials and the straightforward fabrication process allow seamless sensor integration into existing knitted garments by the method described herein. The result of this integration is a sensory garment capable of monitoring the movement of body joints as shown in FIG. 1(*c*).

Comfort is one of the most critical components of modern wearable devices. However, this feature is often overlooked in the development of new wearable sensors. For fabrics, tactile and thermophysiological comfort is related to the breathability of the material. Thus, to evaluate the breathability of the sensor, the air permeability and water vapor transmission rate (WVTR) of the sensor's constituent fabrics were tested, both with and without thermoplastic adhesive as shown in FIGS. 6A and 6B.

To demonstrate aspects of the invention, textile sensor units were constructed using knit fabrics, including a medical-grade conductive nylon for the electrodes, and various fabrics for the dielectric layers including, for example, nylon, polyester, and cotton. Air permeability was measured according to the ASTM 737-18 procedure, which determines the volume rate of air flow per unit area of fabric. Both the conductive fabric (shown in FIG. 6C) and the dielectric nylon fabric (shown in FIG. 6D) exhibited a warp-knit tricot structure as shown in FIGS. 4A-4B, with air permeability values of 2253.3 and 414 $l/m^2$ s, respectively.

Although both the conductive and the dielectric nylon fabrics have the same knit structure, the dielectric nylon fabric exhibits a tighter knit (and thus a lower air permeability) relative to the more open structure of the conductive fabric. In contrast, the polyester (shown in FIG. 6E) and cotton (shown in FIG. 6F) dielectric fabrics exhibit a weft-knit jersey structure as shown in FIGS. 4A-4B with air permeability values of 183 and 439 $l/m^2$ s, respectively. Because polyester is the heaviest and thickest of the fabrics tested, it exhibited the lowest air permeability, as shown in FIG. 6A. Additional fabric characteristics such as fiber hydrophilicity, yarn count, weave or knit structure, fabric thickness, and fabric porosity have also been shown to affect air permeability and water vapor transmission. FIG. 11 provides data for the average thicknesses and normalized weight for each fabric (i.e., conductive nylon and various fabrics for the dielectric layer bare and laminated with adhesive film. Five samples of 1 inch×1 inch were used for each category.

Fabrics coated with the thin film adhesive (a thermoplastic polyurethane fabric tape; morphology as shown in FIG. 5) are referred to herein as "laminated fabrics." Once adhered to the fabrics, the adhesive visually presents as a porous membrane as shown in the third column of FIGS. 6C-6F. As a result, the air permeability of the laminated fabrics is reduced compared to their bare fabric counterparts as shown in FIG. 6A. On average, the air permeability of laminated nylon and polyester is 163 and 129 $l/m^2$ s, respectively. These values constitute a respective reduction by ≈60% and ≈30% relative to the bare samples. Laminated cotton exhibited a reduction in permeability of only ≈15%. In contrast, laminated conductive nylon exhibited a reduced permeability of ≈97.2%, which is attributed to the reduced porosity shown in FIG. 6C.

Although the air permeability of the laminated fabrics was reduced relative to the bare fabrics, the laminated dielectric fabrics all showed air permeabilities greater than 100 $l/m^2$ s, which falls within the range of normal clothing breathability. On average, the laminated conductive fabric showed an air permeability slightly less than this value (62 $l/m^2$ s). However, the order of attachment of the adhesive to the fabric likely plays a role in the porosity of the fabric-bonded adhesive and air permeability of the overall composite. Thus, it has been found that attaching the adhesive to the dielectric fabric first enables the air permeability of composite layers to be greater than 100 $l/m^2$ s.

Water-vapor permeability is another key physical property of fabrics affecting breathability since the loss of water vapor is crucial for the wearer's thermal equilibrium and physiological comfort. Measurements show high WVTRs for all the bare fabrics with average values between 45 and 51 g/h $m^2$. All of the laminated fabrics exhibited similarly high WVTR, with average values between 38 and 41 g/h $m^2$ as shown FIG. 6B. The laminated fabrics behave as porous membranes with WVTRs higher than the rate of transepidermal water loss (TEWL) of adult skin under normal conditions (5-10 g/h $m^2$) and within the range of TEWL during sweating (6-66 g/h $m^2$). The samples described herein also have WVTRs higher than those of non-porous 8 μm films and highly porous (45%) 40 μm films of poly dimethylsiloxane (5-6 and 20.3 g/h $m^2$, respectively), which are elastomers commonly used in wearable devices. Therefore, it can be seen that fabric laminated with the adhesive film has a minimal blocking effect on moisture permeability.

Although the three-layer configuration for capacitive sensors is the most widely used in electrical and robotic applications, it is believed that the five-layer configuration is most suitable for wearable applications in contact with the human skin. In the five-layer configuration, the external electrode acts as an active shield when connected to ground, mitigating parasitic and environmental interference factors and resulting in a high fidelity signal. On the other hand, in the three-layer configuration, while operational in wearable applications, direct skin contact with the signal electrode may lead to shorting and losses in the electrical signal.

Capacitive strain sensors correlate changes in a capacitor's geometry with a uni-axial strain value. The capacitance of an ideal capacitor, composed of a dielectric material sandwiched between two parallel electrodes, is defined by:

$$C = \epsilon\epsilon_0 \frac{A}{d} \tag{1}$$

where C is the capacitance, A is the area of the active region of the sensor (i.e., A=xy), d is the thickness of the dielectric layer, as shown in FIG. 3B, $\epsilon$ is the relative permittivity, and $\epsilon_0$ is the permittivity of the free space. In this equation, all the parameters except for $\epsilon_0$, a constant, can change by deformation. Under uni-axial deformation, the changes in the sensor's dimensions are related by the Poisson's ratio:

$$\nu = -\frac{\varepsilon_y}{\varepsilon_x} = -\frac{dy/y}{dx/x} \tag{2}$$

If $\nu=\nu(x)$ (i.e., Poisson's ratio is strain-dependent), we obtain:

$$\frac{dy}{y} = -\nu(x)\frac{dx}{x} \tag{3}$$

Where $\nu(x)$ is the linear approximation of Poisson's function:

$$\nu(x) = \nu_0 + \alpha\frac{x - x_0}{x} = \nu_0 + \alpha\varepsilon_x \tag{4}$$

and $\alpha$ is the rate of change of the Poisson's ratio of the sensors as a function of strain.

By substituting Equation 4 into Equation 3, we obtain:

$$\frac{dy}{y} = -\left(\nu_0 + \alpha\frac{x - x_0}{x}\right)\frac{dx}{x} = -(\nu_0 - \alpha)\frac{dx}{x} - \frac{\alpha}{x_0}dx \tag{5}$$

Integrating from initial conditions $x_0$, $y_0$ to final conditions x, y:

$$\int_{y_0}^{y}\frac{dy}{y} = -(\nu_0 - \alpha)\int_{x_0}^{x}\frac{dx}{x} - \frac{\alpha}{x_0}\int_{x_0}^{x}dx \tag{6}$$

$$\ln\frac{y}{y_0} = -(\nu_0 - \alpha)\ln\frac{x}{x_0} - \alpha\frac{x - x_0}{x} = -(\nu_0 - \alpha)\ln(1 + \varepsilon_x) - \alpha\varepsilon_x \tag{7}$$

Rearranging and solving for y:

$$y = y_0(1 + \varepsilon_x)^{-(\nu 0 - \alpha)}e^{-\alpha\varepsilon x} \tag{8}$$

and, $$x = x_0(1 + \varepsilon_x) \tag{9}$$

As A is the area of the active region of the sensor, given as:

$$A(x, y) = xy \tag{10}$$

substituting Equations 8 and 9 into Equation 10, we obtain:

$$A(x, y) = x0y0(1 + \varepsilon x)(1 + \varepsilon x) - (\nu 0 - \alpha)e - \alpha\varepsilon x \tag{11}$$

If $A_0=x_0y_0$, then:

$$\frac{A}{A_0} = (1 + \varepsilon_x)(1 + \varepsilon_x)^{-(\nu_0 - \alpha)}e^{-\alpha\varepsilon_x} \tag{12}$$

Assuming the volume of the specimen remains constant, then:

$$Ad = A_0d_0 \tag{13}$$

Rearranging we obtain:

$$\frac{A}{A_0} = \frac{d_0}{d} \tag{14}$$

Using Equation 1:

$$\frac{C - C_0}{C_0} = \frac{C}{C_0} - 1 = \frac{A}{A_0}\frac{d_0}{d} - 1$$

By substituting Equation 14 into Equation 15, we obtain:

$$\frac{C - C_0}{C_0} = \frac{A^2}{A_0} - 1 \tag{16}$$

By substituting Equations 12 into Equation 16, we obtain:

$$\frac{C - C_0}{C_0} = (1 + \varepsilon_x)(1 + \varepsilon_x)^{-(\nu_0 - \alpha)}e^{-\alpha\varepsilon_x})^2 - \tag{17}$$

$$\frac{C - C_0}{C_0} = (1 + \varepsilon_x)(1 + \varepsilon_x)\left((1 + \varepsilon_x)^{-(\nu_0 - \alpha)}e^{-\alpha\varepsilon_x}\right)^2 - 1 \tag{18}$$

The results and analysis suggest that changes in the dielectric constant are not completely eliminated by the normalization of the capacitance, as the fabric sensors are affected by the environment's moisture and therefore can be seen as an air-fiber-moisture system. The rate of change of the dielectric properties of the sensors as a function of strain can be represented with a parameter "z" integrated into Equation 18:

$$\frac{C - C_0}{C_0} = (1 + z\varepsilon_x)(1 + \varepsilon_x)\left((1 + \varepsilon_x)^{-(\nu_0 - \alpha)}e^{-\alpha\varepsilon_x}\right)^2 - 1 \tag{19}$$

The $\alpha$ and z parameter values are estimated by empirically fitting Equation 19 to the experimental data listed in Table 1 below for nylon and polyester 5-layer sensors under different environmental conditions. The parameter $\alpha$ is the rate of change of the Poisson's ratio of the sensors as a function of strain and the parameter z represents the rate of change of the dielectric properties of the sensors as a function of strain. This model has potentially broad capabilities for predicting the capacitance vs strain response of sensors with different dielectric materials and under various environmental conditions. However, further analysis is required to assess the model's generalizability.

TABLE 1

| Fabric | Relative Humidity (%) | Temperature (° C.) | Poisson ratio | Parameter "a" | Parameter "z" |
|---|---|---|---|---|---|
| Nylon | 51 ± 3 | 24 ± 1 | 0.5 | −0.625 | 0.3336 |
| | 90 ± 2 | 35 ± 1 | 0.4985 | −0.6461 | 0.04504 |
| | 90 ± 2 | 24 ± 1 | 0.5 | −0.5059 | 0.01167 |
| Polyester | 51 ± 3 | 24 ± 1 | 0.4971 | −0.5316 | 0.6026 |
| | 90 ± 2 | 35 ± 1 | 0.49 | −0.43 | 0.28 |
| | 90 ± 2 | 24 ± 1 | 0.53 | −0.43 | 0.18 |

The strain sensing performance of both three- and five-layer sensors was evaluated with nylon, polyester, or cotton dielectric layers by monitoring the relative change in capacitance, $\Delta C/C_0$, during uniaxial tensile strain, $\in$. While the relation between capacitance and strain monotonically increases in all cases, a degree of non-linearity in the measured curves was observed as seen in FIG. 7A for five-layer sensors and 8A for three-layer sensors. It is important to note that the relative change in the capacitance response to strain for both three- and five-layer sensors are comparable as shown in the overlapping curves in FIGS. 12 and 13, which demonstrate that increasing the area of one electrode in the five-layer configuration seems not to affect the sensor response to deformation. The nonlinearity in the relative capacitance of the sensors can be explained by changes in the mesostructure of the fabric dielectric layer under strain, such as reduction of the porosity, partial alignment of the fibers, and compressive deformation. For the purpose of analysis, three linear strain regions are defined: $\in<25\%$, $25\%<\in<50\%$, $\in>50\%$.

The sensitivity, S, in each strain region is defined by the linear fit slope:

$$\frac{\delta(\Delta C/C0)}{\delta\varepsilon}$$

Similar segmented linearity analyses have been used in nonlinear capacitance responses to deformation in pressure sensors with highly structured dielectric layers. FIG. 7A shows that all three sensor types increase in sensitivity with increasing strain. The polyester sensors exhibited the highest sensitivity (S=0.74 for $\in<25\%$, S=1 for 25% $\in<50\%$, S=1.46 for $\in>50\%$). The nylon sensors exhibited a similar, though slightly lessened, sensitivity (S=0.5 for $\in<25\%$, S=0.75 for $25\%<\in<50\%$, S=1.23 for $\in>50\%$). The cotton sensors exhibit the lowest sensitivity (S=0.2 for $\in<25\%$, S=0.61 for $25\%<\in<50\%$, S=1.2 for $\in>50\%$). Both the nylon and polyester sensors exhibit sensitivity values that are comparable to prior fabric inclusive capacitive sensors.

The suppressed sensitivity of the cotton sensors can be explained by several factors. Cotton is the least elastic of the dielectric fabrics, with a spandex percentage of only 5%, compared to 20% for nylon and polyester fabrics. Although the thicknesses of the cotton and nylon dielectric fabrics are comparable, the weight of the cotton fabric is the lowest among the dielectric fabrics, with fewer courses and wales per inch as shown in FIG. 11. Thus, the reduced sensitivity of the cotton sensors is likely a combined result of the fiber content, fabric thickness, and the dielectric properties of the cotton fibers. While dielectric properties of fabrics are mainly defined by the fiber's polymer composition (i.e., nylon, polyester, and cotton), secondary parameters, such as yarn structure and fabric construction, have also shown substantial effects on the fabric's dielectric behavior.

Segmented linearity is one approach to modeling the overall non-linear capacitance response to deformation. However, continuous non-linear models may also predict sensor performance for a wide range of sensor designs. Poisson's ratio measure the deformation of a material in a direction perpendicular to the direction of the applied force and is a measure of the Poisson effect, the deformation of a material in directions perpendicular to the specific direction of loading. The value of Poisson's ratio is the negative of the ratio of transverse strain to axial strain. As it is known that the Poisson's ratio of elastic and porous systems is dependent on strain, it is believed that there further exists a dependence between the dielectric properties of the sensors to strain, as the fabric's microstructure undergoes compression during stretch inducing changes in the effective dielectric constant. Similar results have been observed in microstructure capacitive pressure sensors where the effective dielectric constant changes with the displaced air in the dielectric layer upon compression. By introducing these two strain-dependent parameters, Poisson's ratio and effective dielectric constant, a non-linear empirical model is provided as described below and is shown in FIG. 23. The nonlinear model predictions are in agreement with experimental data for nylon and polyester sensors, thereby validating the changes in capacitance for porous dielectric materials such as fabrics, even under different environmental conditions.

The stress-strain behavior of the three- and five-layer sensors with nylon, polyester, or cotton dielectric layers is shown in FIG. 14. The five-layer nylon and polyester sensors showed maximum stresses of 0.80 and 1.11 MPa at 85% and 87% strain, respectively, while both the three- and five-layer cotton sensors exhibited stresses of ≈2 MPa at 82% strain. The observed mechanical responses are comparable to those of elastomeric strain sensors and their constituent materials.

The cyclic stability of the sensors was assessed via 5000 loading cycles with applied strain between 5% and 60%. All sensor types completed the test without failure as shown in FIG. 7B for five-layer sensors and FIG. 8A for three-layer sensors. The insets in FIG. 7B provide a detailed view of the capacitance changes of representative sensors during tensile stretching for ten consecutive cycles (from the 2500th to the 2510th cycles). Repeatability and reliability can be observed for the polyester sensor, which shows a stable relative change in capacitance of $\Delta C/C_0 \approx 0.43\%$ at ≈60% s train as shown in FIG. 7B. The nylon sensor exhibited a small drift during the cyclic test with $\Delta C/C_0 \approx 0.51\%$ at ≈60% strain during the first cycle and $\Delta C/C_0 \approx 0.45\%$ at ≈60% strain for the 5000th cycle as shown in FIG. 7B. The cotton sensor had a short transient regime during the cyclical testing, reaching a stable absolute value of ≈0.2% for $\Delta C/C_0$ after several hundred loading cycles. This observed settling may be related to the slower gradual rearrangement of the cotton fabric network during the beginning cycles. The spandex percentage in the cotton fabric is only 5%, compared to 20% for nylon and polyester fabrics, resulting in more plastic deformation in the cotton sensors as shown in FIG. 15. Additionally, the highly hygroscopic nature of cotton may further affect its mechanical and dielectric properties, as fiber rearrangement and deformation induce changes in exposed surface area during cyclic testing.

The dependence between capacitance and excitation frequency of the manufactured sensors was investigated in the frequency range from 20 Hz to 1 MHz at room temperature as shown in FIG. 7C. The measured capacitance of both unstrained (0%) and strained (55%) sensors rapidly decreases at low frequency values, which can be explained by the dielectric dispersion of the fabrics. In polar polymers such as cotton, nylon, and polyester, at high frequencies of the applied electric field, the electric dipoles do not have time to align before the field changes direction, leading to a decrease in permittivity and, therefore, capacitance. As the applied frequency increases, the capacitance response for nylon and polyester sensors becomes almost independent of frequency, while for cotton sensors a monotonic decrease of the capacitance as a function of frequency was observed. At the same relative humidity (RH) conditions, cotton will have a higher moisture content than nylon and polyester fabrics due to its hygroscopicity. The higher content of bound water in cotton may further affect dielectric permittivity, resulting in a more monotonic frequency sweep curve.

The effects of temperature and humidity on the electromechanical response of nylon and polyester five-layer sensors in accordance with the present invention were investigated using a materials testing system (Instron® 3345) outfitted with an environmental chamber (ETS, Model 5500-8485). The nylon and polyester sensors were chosen for further characterization over the cotton sensors due to their higher sensitivity, greater cyclic stability, and reduced frequency dependence. The stretchable fabric sensors were tested in three conditions:

1) ambient humidity (51±3% Relative Humidity (RH)) and room temperature (RT) (24±1° C.);
2) high humidity (90±2% RH) and RT; and
3) high humidity (90±2% RH) and high temperature (35±1° C.).

After conditioning the sensors in each temperature and humidity setting for at least 3 hours, the sensors were manually pre-stretched to remove any Mullins effect. Sensors were then strained to 55% of their new gauge length after the manual pre-stretch. Both sensor types showed a monotonically increasing relative capacitance with strain in all conditions as shown in FIGS. 9A and 9B. Thus, it was found that the sensors remain functional in high moisture settings without requiring additional silicone encapsulation that would increase their weight, hinder their integration into clothing, and result in the loss of breathability and fabric feel.

Electromechanical characterization of the sensors relative to response change is depicted in FIGS. 16-18. FIG. 16 depicts the response time of a representative 5-layer nylon sensor in response to a step-like strain with a rate of 5 mm/s. The average response time of five 5-layer nylon sensors was found to be 179 ms with a standard deviation of 46 ms. FIG. 17 depicts the average relative change in capacitance as a function of strain during 10 cycles of loading and unloading for five 5-layer nylon sensors. Data were taken in ambient lab conditions: temperature=23±1° C. and relative humidity=29±2%. FIG. 18 depicts the average relative change in capacitance as a function of strain for five 5-layer nylon sensors at strain rates of 1 mm/s, 5 mm/s, and 10 mm/s. Data were taken in the ambient lab conditions: temperature=23±1° C. and relative humidity=29±2%. Data were collected from the same sensors in sequence of 5, 1, then 10 mm/s.

While retaining function, the sensitivity of the sensors was impacted by the environmental conditions as shown in FIG. 19. The hydrophobic and hygroscopic properties of the fabrics used as dielectric layers in the sensors resulted in different electrical responses with changing humidity. At higher relative humidities, fibers will absorb moisture from the environment and have higher moisture contents, filling air voids within the fibers and in the porous fabric structure. In this process, the relative permittivity of the fabric increases because the permittivity of water ($\epsilon_r$=78 at 2.45 GHz and 25° C.) is much higher than that of air ($\epsilon_r$≈1). This effect is seen in the overall increase in sensor capacitances at higher humidity levels as shown in FIGS. 20 and 21. At 0% strain, the increase in sensor capacitance of the five-layer nylon sensors at higher humidity (≈50 pF) is greater than that of the five-layer polyester sensors (≈24 pF), reflecting the greater hydrophobicity and lower moisture uptake of polyester relative to nylon.

Within the tested strain range, it is also evident that the magnitude of capacitance change (ΔC) is greatest in ambient humidity for both nylon and polyester sensors, further contributing to the reduced sensitivity of the sensors at high humidity as shown in FIG. 20. Sensor capacitance showed more susceptibility to humidity than temperature as shown in FIG. 22. However, an increase in sensor sensitivity at higher temperatures was also observed. This increased sensitivity was attributed to increased drying of the sensors at higher temperatures, which would reduce their water uptake and partially counteract the effects of higher humidity. Further investigation is needed to decouple the effects of these variables from strain to enable robust and reliable motion tracking.

The sensors were also washed with fabric detergent, then dried and tested three times in room conditions (24±1° C. and 51±3%). The electromechanical response of both the nylon and polyester five-layer sensors showed a slight decrease in sensitivity after the initial wash cycle, but no noticeable changes after repeated wash cycles as shown in FIG. 9B. Previous studies have used SEM imaging to verify that washing silver nanoparticle-coated knitted fabrics reduces the concentration of conductive nanoparticles on fiber surfaces, resulting in decreased conductivity. Thus, the mechanical and frictional forces involved in the first wash cycle may have led to a decrease in the conductivity of the electrode fabric and a subsequent drop in the sensitivity of the sensors. During the washing process, the fibers in the fabric layers also experienced axial and transverse swelling. During drying, the contact network between fibers may have changed, affecting the tightness of the knit structures and the permittivity properties of the dielectric fabrics. Nevertheless, the repeatability of sensor performance with repeated washes supports the hygienic reusability of the sensor.

As described herein, the stretchable electronic sensor or textile sensor unit can be incorporated into various stretchable garments including, but not limited to a glove, a sock, a sleeve (e.g., arm or leg), a bodysuit, a modular knee sleeve, a modular ankle sleeve, a modular elbow sleeve, leggings, tights, a shirt, a unitard, a neck brace, and combinations of one or more of the foregoing In one embodiment, and as further described herein, the stretchable electronic sensor or textile sensor unit can be incorporated into a glove.

For example, and as shown in FIG. 24, ten capacitive fabric sensors can be used to capture the motion of the metacarpophalangeal (MCP) and proximal interphalangeal (PIP) joints of each finger. The distal interphalangeal (DIP) joint is excluded since its motion is coupled to the motion of the PIP joint and it possesses a limited range of motion. In one embodiment, each sensor is directly integrated into the garment rather than sewn into a commercially available glove. The entire top layer of the glove acts as a common electrical ground for all of the sensors, and the bottom layer serves as one of the two dielectric layers within each sensor, as shown in FIG. 24(*a*). The sensors reside on the underside of the glove's top layer, which, when worn, allows each sensor to rest directly on top of the finger. By fabricating the sensors as a part of the garment itself rather than attaching them onto the garment, the amount of material added is minimized, improving comfort and reducing any mechanical restriction of finger motion.

Alternatively, in another embodiment, the sensors are embodied in a textile sensor unit and each textile sensor unit is adhered to or otherwise coupled to an outer surface of the stretchable fabric garment (i.e., glove) in the desired layout to capture the desired motion of each finger.

The layout of the sensors with respect to a single finger is shown in FIG. 24(*a*). The sensors were sized to each finger joint in order to accurately capture its motion. To fabricate the glove, the top outer electrode layer and bottom dielectric layers were laser cut first, then the top layer of the glove was looped through the bottom patterned layer of the glove to act as the common ground and first dielectric layer of each sensor as shown in FIGS. 24(*b*) and (*c*). Next, the remaining inner electrode and dielectric layers of each sensor were added to the existing base ground and dielectric as shown in FIGS. 24(*d*) and (*e*). The breathable adhesive and a heat press were used to adhere all the layers together at 160° C.

The glove was then sewn together and the sensors were folded over and adhered to complete the five layer configuration as shown in FIGS. 24(*f*) and (*g*). Wire leads were attached to each electrode within the glove, and one more was connected to the base of the top layer, which is the common ground. These leads were sewn to the base of the glove closest to the wrist so as to not interfere with motion. Following the fabrication of the glove, a cuff was sewn onto the wrist of the glove with a Velcro fastener as shown in FIG. 24(*a*). This cuff acts as a stabilization mechanism to prevent shifting and slipping of the glove during motion. Capacitive sensor values were digitized using an MPR121 connected to an Arduino Uno.

EXAMPLES

Monitoring human activity is a key component of advancing the promising fields of human-machine interactions (HMI) and personal healthcare.

Materials:

Medical grade conductive fabric (76% Nylon and 24% elastic fiber, Cat. #A321) was purchased from Less EMF Inc. Nylon 4-way stretch fabric (80% Nylon and 20% Spandex) and stretch cotton jersey fabric (95% Cotton and 5% Spandex) were purchased from Amazon. Polyester-Lycra Spandex fabric (710LY) was purchased from PayLess fabrics. The thermoplastic polyurethane-based adhesive film was produced by Bemis Associates Inc. (3410 Sewfree Tape). Sensor Fabrication:

The sensor electrodes were cut in a dogbone shape using the dimensions shown in FIG. 2A from the knit conductive fabric using a laser (VLS 3.50, Universal Laser Systems Inc) at 70% intensity and 50% speed. For polyester and nylon dielectric layers, the laser settings were also set at 70% intensity and 50% speed for 2 passes. Cotton was cut with 1 pass with the laser settings at 100% intensity and at 100% speed. The thermoplastic adhesive films used for lamination were laser cut with the adhesive facing up at 90% intensity and 100% speed using 1 pass.

Sensors were produced using a stacked assembly method. The three-layer capacitive sensor consists of a pair of conductive electrodes separated by a dielectric layer. First, the dielectric material was laminated with thermoplastic adhesive film on either side (3410 Sewfree Tape), followed by the application of the fabric electrodes on each side of the dielectric. One of the electrodes has a smaller width to prevent shorting of the electrodes. Similarly, for the five-layer sensor, the internal stacked structure consists of one small electrode and two dielectric layers. This assembly was then encased by one big external electrode forming two more layers in the stacked structure as shown in FIGS. 2B and 2C, with the external electrode connected to ground.

All lamination sequences were performed at 160° C. using a heat-press machine for 30 seconds. The sensors were then interfaced with an LCR meter (E4980AL, Keysight Technologies) using a flexible silicone-sheathed wire (30 AWG) attached to the electrode fabrics as shown in FIG. 1. Strain-limiting custom-built tabs made of adhesive laminated woven fabric were attached at each end of the sensor's dogbone shape to facilitate wire interfacing and clamping during the electromechanical tests.

Electromechanical Characterization:

Each tested specimen was cyclically pre-stretched 10 times to 100% strain (original stretchable gauge length, $L_0$=106±2 mm) to remove the Mullins effect and achieve a fixed level of plastic deformation. After the pre-stretching cycles, the new stretchable length of the specimens was registered as the new gauge length. Sensors were then stretched to their original stretchable length (106±2 mm), which was approximately 82%-88% strain of the new registered $L_0$, at a rate of 5 mm/s using the materials testing system (Instron 3345).

The capacitance of the sensors was recorded with an LCR meter (E4980AL, Keysight Technologies) at an excitation frequency of 1 kHz. The measured capacitance was adjusted to represent only the capacitance of the stretchable area by subtracting the capacitance of the stationary tab areas from the LCR measurements. The capacitance of the tab areas was calculated as a percentage of the initial capacitance $C_0$ using the relative size of the tab areas reported in FIG. 2A.

Excluding the three-layer cotton sensors, the averaged response of five sensors was shown for each dielectric material and sensor configuration (three- or five-layer). For the three-layer cotton sensors, the averaged response of three sensors was shown due to sensor shorting during testing. The bands shown represent the standard deviations of the averaged responses from all the tested sensors. Unless otherwise noted, all electromechanical characterizations of the sensors were performed at a temperature of 24±1° C. and relative humidity of 51±3%.

Dynamic electromechanical characterization of the sensors was carried out through 5000 cycles of straining up to 60% using a cyclic tester, (e.g., an Instron® Universal Testing System). For cyclic testing, representative data from one sensor was selected for each dielectric material and sensor configuration.

Sensor frequency sweep testing was performed using the frequency sweep function of an LCR meter (Keysight E4980A/AL). The excitation frequency ranged from 20 Hz to 1 MHz. Measurements were performed while the sensor was stationary at 0% and 55% strain and averaged for five sensors.

Humidity and temperature dependence of the sensors' electromechanical properties were investigated with a materials testing system (e.g., Instron® 3345) equipped with a custom-built environmental chamber (Model 5500-8485, ETS). For humidity tests, the sensors were left inside the environmental chamber for at least 3 hours prior to testing and an average response of five sensors of each type was shown. Subsequent testing was performed at 90±2% RH, and two different temperatures, 35 and 25° C., to simulate sweating conditions.

Materials Characterization:

The morphology of the fabrics was investigated using a scanning electron microscope Hitachi SU8230 UHR cold field emission. Air permeability of the bare and laminated fabric samples was measured according to the standard test method for fabrics (ASTM D737), using an air permeability tester (SDL Atlas MO21A) with a test area of 20 $cm^2$ and at a constant pressure drop of 200 Pa. Laminated fabric samples were tested with the adhesive film against the bottom plate. The water vapor transmission rate (WVTR) was determined according to the standard test (ASTM E 96), using a WVTR Analyzer (Mocon AQUATRAN 3) with a cup diameter of 2.5 inches. Samples undergoing air permeability and WVTR tests were pre-conditioned at a temperature of 21±1° C. and a relative humidity of 65±2% according to the standard described in ASTM D1776. The thickness of fabric samples was measured using a parallel presser digital caliper. Photographic images of the fabrics were captured using a handheld USB digital microscope with LED illumination (pluggable UTP200X020MP). All measurements were repeated three times.

Washability:

The washing test of the sensors was conducted at room temperature by diluting 3 mL of a commercial neutral detergent (TexCare, #A289-L) into 1000 mL of deionized (DI) water at a pH 6, and the subsequent continuous stirring for 30 minutes. After this, the fabric sensors were rinsed with DI water and dried overnight in an oven at 60° C. followed by a conditioning step at a temperature of 24±1° C. and relative humidity of 51±3%. The washing procedure was conducted three times. The electromechanical properties of the washed sensors were monitored after each washing-drying cycle. For each dielectric material, the electromechanical response was reported as an average of five sensors.

Manufacturing of Conformable Sensory Bodysuit and Data Acquisition: A sensory bodysuit was manufactured to characterize integration and performance at the human-sensor interface. Commercial form-fitting garments were utilized to manufacture the sensory bodysuit consisting of a men's compression long-sleeve T-shirt (Under Armour) and a pair of men's leggings (Willit Sports) used in Example 1. Six sensors with the same dogbone shape were heat pressed into the garments, with the garment's fabric serving as one of the dielectric layers of the five-layer sensor structure as shown in FIG. 2C.

With the exception of the garment fabric, all other layers of the sensors were cut using the same laser settings. First, fabric electrodes were interfaced with flexible silicone-sheathed wire (30 AWG) before the sensor construction. The garment was then laminated with thermoplastic adhesive (3410 Sewfree Tape), followed by the application of the inner fabric electrode. Then, a second dielectric layer was stacked and attached with the same thermoplastic adhesive. After this, a small slit was cut in the garment to wrap the larger external electrode around the sensor, forming the last two layers in the five-layer sensor as shown in FIG. 2C. Finally, strain-limiting custom-built tabs made of adhesive laminated woven fabric were attached at each end of the sensor's dogbone shape to facilitate wire interfacing and to cover the slit made in the garment in the previous step.

All manufacturing sequences were performed at 160° C. using a heat-press machine for 30 seconds. The sensors were positioned at the major joints, i.e., elbows, knees, and hips, to detect the motion of the upper and lower limbs. No additional calibration process or manufacturing adjustments were required to achieve the sensor responses shown in these demonstrations. The agreements between each pair of sensors on the same type of joint were achieved on the first attempt of sensor integration and testing. The change in capacitance versus time was measured using a commercial capacitive sensor breakout board (e.g., (MPR121, Adafruit) and an Arduino Pro mini using the CoolTerm application for data acquisition).

The stretchability, signal fidelity, and permeability of the capacitive strain sensors to allow for monitoring of large-range human motions was evaluated by placing six sensors, one on each of the main human joints—elbows, hips, and knees. The six sensors were seamlessly integrated into a commercial, nylon-based compression garment using the same breathable adhesive used in the sensor construction. The garment itself served as one of the dielectric layers in the five-layer sensor structure, with the second dielectric layer made of an additional layer of nylon as shown in FIG. 10A.

Example 1

The volunteer wearing the sensory garment was asked to perform different compound body movements such as squats, sit-to-stand, and step-ups. The distinct motions of the joints were unambiguously reflected in the capacitance changes of all six sensors. The measurements were also reproducible, without any obvious loss of the capacitive signal during repeated movements. For instance, when the volunteer performed a set of 10 squats, the capacitive response of the sensors exhibited several peaks and valleys as shown in FIG. 10B in the plot corresponding to the bending motions of the six joints under monitoring. The capacitive response of all body-mounted sensors increased when the wearer was gradually squatting down, and remained nearly constant as long as the joints remained.

Another validation experiment involved tracking the volunteer's movement while sitting in a chair (as shown in FIG. 10C). As the participant was sitting and leaning back on the chair's backrest, a postural modification of the arms—a swaying motion—was noticeable in every cycle of the test. These observations are reflected in the data acquired by the sensors located on the elbow joints. During these actions, the elbows' flexion and swaying motions resulted in a characteristic double peak in the capacitive signal. Similarly, as the participant leaned forward to stand up, the arms' extension resulted in valley-shaped signals. It was also observed that the double peak signals were different in every cycle and the intensity of the signal increased as the motion range increased. Moreover, the sensor's signals for the lower body (i.e., hips and knees) display peak-and-valley signals that can be correlated to the bending of the joints observed during the squat motion.

The capacitive strain sensors were used to differentiate ranges of human motions during a step-up exercise as shown in FIG. 10D. During the step-up movement, the volunteer was asked to place his right foot onto the black box and then bring his left foot up until he was standing on the box with both feet. He was then asked to step down first with the right foot, and then with the left foot so both feet were on the floor. The asynchronous movement of the legs during the step-up movement was distinct in the data acquired by the sensors located in the hips and knees joints. The produced capacitive signal during flexion and extension movements exhibited a multi-peak pattern that was repeatedly observed during all the cycles of the movement. In addition, the elbow joint-mounted sensors exhibited small but noticeable capacitive responses that reflected the different, subtle swaying motions of the elbow joints during each cycle.

Characterization of common human motions (e.g., picking up objects from the floor or holding a cup while drinking water) may provide useful information for the treatment of some movement disorders. As a demonstration of applicability to these applications, the volunteer was tasked with picking up a paper cup, drinking from it, and finally returning the cup to the floor as shown in FIG. 10E).

The signals from knee- and hip-mounted sensors displayed a repetitive increase and decrease in capacitance resulting from the successive flexion and extension of the joints during the squat-like movement involved in picking up and returning the object from and to the floor. The elbow joint-mounted sensors also exhibited varying responses matching the different motions of the elbow joints. Overall, the capacitive signal increased with the bending degree of the elbow and returned to its initial value when the arm recovered its initial extended position. Thus, when the left arm is slightly bent during the pick-up movement, the left elbow sensor outputs an increased signal. This increase in capacitance was then followed by a drop to its initial value when the volunteer returned to the standing position and finally, by another slight increase as the volunteer returned the object to the floor. Simultaneously, the right elbow sensor exhibits a three-peak signal, with a first peak corresponding to the arm bending during the pick-up movement. This increase in capacitance, however, is more intense compared to the left elbow because the right arm flexes to a greater degree. The second peak corresponds to the arm flexion during the drinking movement and the third peak results from the slight bending movement of the right arm as the volunteer returns the object to the floor.

Example 2

Fabrication of Textile Sensor Unit and Integration into Stretchable Fabric Garment:

The textile sensor unit used in this example was a five-layer textile-based capacitive sensor, featuring one internal conductive signal layer (silver plated 76% Nylon and 24% elastic fiber, purchased from FilterEMF) wrapped by two conductive grounding outer layers, separated by two non-conductive dielectric layers (80% Nylon and 20% Spandex, purchased from Amazon), and bonded with thin films of breathable thermoplastic fabric adhesives (3410 Sewfree Tape, purchased from Bemis Associates Inc.).

The textile sensor unit has a form factor of 160×10×2.4 mm designed in Solidworks 2020. All fabric materials were laser cut into the geometries using a Universal laser cutter (Universal Laser Cutter VLS2.30DT, purchased from Universal Laser Systems, Inc.). The laser cutter settings were 50%, 50%, 100% of full speed intensity, and 70%, 50 90% of full power intensity for conductive fabric, non-conductive fabric, and adhesive film, respectively. The final textile sensor unit was manufactured by heat-pressing (Tusy Heat Press Machine, purchased from Amazon) all stacked laser-cut materials simultaneously at 160° C. for 30 seconds.

Textile sensor units were manufactured in a batch of fifty (geometry design→materials preparation→laser cutting materials→heat press). These sensors underwent 100 pre-cycles under 50% strain on an automatic testbed (Instron at a rate of 5 mm/s) to eliminate plastic deformation, followed by washing (3‰ TexCure Solution in DI water with a pH 9.7, 60 min stirring), post-washing (DI water with a pH 6.1, 60 min stirring), and drying (24 h in an oven at 60° C.), as depicted in FIG. 34. All sensors were then heat-pressed (160° C., 30 s) onto the base suit at optimal locations. Laser-cut four-millimeter-wide conductive fabric traces were heat-pressed on the base suit with the thermoplastic adhesive film in between to connect the sensors to a DAQ unit. The DAQ unit has a form factor of 66×42×28 mm and weighs 87 grams. It includes an onboard microprocessor (Adafruit Feather 32u4 Bluefruit LE, purchased from Adafruit) that communicates with four 12-channel capacitive touch sensor breakout boards (Adafruit MPR121, purchased from Adafruit) via $I^2C$ communication protocol. It is powered by a 1000 mAh battery and transmits 38 capacitive sensor readings in serial to a remote laptop (Apple MacBook Pro M2) via Bluetooth communication protocol at 40 Hz (FIG. 34).

Characterization of Textile Sensor Unit and Fabric Trace

An LCR meter (E4980AL, purchased from Keysight Technologies) was used to measure capacitances (Cs) of the textile sensor units with a measurement setting of 1 V exciting voltage and 1 kHz exciting frequency. A material stretch-testing system (Instron 3345 with a 50 N load cell as shown in FIG. 32, purchased from Illinois Tool Works Inc.) was used to quantify sensor units' force-displacement-capacitance correlation with a rate of 5 mm/s and a maximum displacement of 80 mm equaling to 50% of 160 mm.

A customized material bend-testing system was built as shown in FIG. 32 (one servo motor-Dynamixel Mx-106T purchased from Robotis, Inc., two artificial limb parts 3D-printed by Original Prusa i3 MK3S+) to quantify sensor units' angle-capacitance correlation with a rotation speed of 38°/s and a maximum angle of 90°. Each data point in all plots has one mean value and one standard deviation value evaluated on five textile sensor unit samples. The characterization of the fabric traces was conducted using the stretch-testing system at 50% strain. The washing test of the sensor units was conducted at 25° C. by diluting 3 mL of a commercial neutral detergent (TexCare #A289-L, purchased from FilterEMF) into 1000 mL of deionized (DI) water (PURELAB® Flex 3 System, purchased from Evoqua Water Technologies LLC) at a pH 9.7, and subsequent continuous stirring for 60 min as shown in FIG. 32. After this, the sensor units were stirred in pure DI water at a pH 6.1 for 60 min and dried 24 h in an oven at 60° C.

For the simplified sweat test, textile sensor units were soaked in a simplified solution comprising 9 g sodium chloride (S9888, purchased from Sigma-Aldrich) and 1000 mL DI Water for 60 min, and subsequent dried 24 h in an oven at 60° C.

Customization Procedure:

A customization procedure may be utilized to render a digital registration of the wearer from a video of the wearer to a digital 3D avatar (FIG. 34). Based on an analysis of joint movement range, virtual sensors can be placed on the digital 3D avatar to simulate the stretching movement of these sensors.

In a further variation, a grid search can be conducted for possible sensor placement positions to determine optimal locations.

Data Processing Procedure:

The stretchable fabric garment with the textile sensor units affixed thereto can then be used to physically measure local skin stretch induced by joint movements. This can be distinguished from optical, EM, and IMU systems that rely on global coordinates (i.e., stationary cameras, base transmitters, and gravity).

To assess the stretchable fabric garment's accuracy in capturing whole joint angles, it was compared to an optic motion capture system (O-MoCap). In addition to data of the stretchable fabric garment, kinematics data was simultaneously collected using an eight-camera video system (100 Hz, Motion Analysis Corporation, Santa Rosa, CA, USA), with 70 reflective markers attached to the user's whole body (FIG. 31). Labeling markers for sequential motions is labor-intensive due to unavoidable visual occlusion and pseudo recognized markers from the surroundings, necessitating post-processing of marker kinematics to extract joint angles using a visual 3D software (C-Motion Inc., Germantown, MD, USA), as shown in FIG. 31. This process includes data filtering with a 4th order Butterworth low-pass filter (cutoff frequency of 10 Hz) to eliminate marker vibration caused by inertia effects. Supervised machine learning algorithms were developed to regress sensor data of the stretchable fabric garment to the joint angles from the O-MoCap, as shown in FIG. 31). Ultimately, the human pose was visualized and reconstructed based on the regressed joint angles from sensor data of the stretchable fabric garment, as depicted in FIG. 31.

Human activities and motions vary widely, from slow single-joint movements to fast multi-joint actions. The accuracy of the stretchable fabric garment system across this diversity of motion was assessed as described in more detail below.

In one embodiment, the stretchable fabric garment is used in combination with a machine-learning approach, using a trained model to predict angles of 11 joints with 33 degrees of freedom (DoFs) based on raw measurements from 38 textile sensors. Both the stretchable fabric garment and the O-MoCap systems collected data while the wearer performs various motions. The collected data was randomly split into training, validation, and test datasets with a ratio of 3:1:1. During runtime, a multilayer perceptron (MLP) structured machine-learning model (five layers with 100 units each), trained on the training dataset and fine-tuned using the validation dataset, maps raw textile sensor values of the stretchable fabric garment to joint angles. For evaluation, the predicted joint angles were compared with those obtained from O-MoCap in the test dataset.

Evaluation of Joint Accuracy:

Stretchable fabric garment data and 3D kinematics was simultaneously collected using an eight-camera video system (100 Hz, Motion Analysis Corporation, Santa Rosa, CA, USA), with 70 reflective markers attached to the user's whole body (FIG. 31).

(a) Single Joint Movement:

Single joint movement was evaluated by instructing the wearer to execute a sequence of motions, rotating 11 body joints individually (following the joint order of left elbow (LE), left shoulder (LS), right elbow (RE), right shoulder (RS), upper back (UB), lower back (LB), torso (T), left thigh (LT), right thigh (RT), left knee (LK), and right knee (RK)), as depicted in FIG. 33A. Due to the proximity of the shoulder and collar joints, rotations were performed along 11 body joints instead of 13. Additionally, maintaining absolute stationarity of other joints while executing single-joint movements was found to be challenging. Therefore, the wearer primarily focused on repeating rotations of each joint in the X, Y, and Z directions five times, with no restrictions on other joint movements.

The middle part of FIG. 33A showcases the prediction of left shoulder (LS) and left thigh (LT) in dashed lines, that closely matches the O-MoCap angle measurements in solid lines. Quantitative evaluations of the prediction are summarized on the right, where it can be seen that most of the mean joint angle errors are within one degree. However, higher errors were observed for the left elbow (LE), right elbow (RE), left knee (LK), and right knee (RK), which is believed to be due to long interconnecting wires between sensor and DAQ. Furthermore, upper limb movements exhibit higher errors compared lower limbs, likely due to their greater range of motion and movement across three dimensions. It was also observed that the sensor network, consisting of 38 sensors, outperforms the single-sensor-to-single-joint mapping method, as illustrated in FIG. 35. Incorporating more sensors to predict a single joint enhances accuracy, as joint movements are always coupled, and the increased number of sensors helped mitigate data ambiguity and noise. The calibration model demonstrated accuracy, indicating that the machine learning model can generalize knowledge to the data within its distribution.

For the single joint motion calibration depicted in FIG. 33A, the performance of MLP was compared with a kNN (two neighbors) method. kNN operates by storing all training data in memory, akin to a lookup table, and computes the averaged value of the closest samples in the stored data for the new data sample. As shown in FIG. 35, kNN demonstrates slightly superior performance compared to MLP, but requires much more storage space (3.14 MB versus 236 KB). The performance of both models can be enhanced with additional data points, as shown in FIG. 35. However, this necessitates additional storage space for the kNN model, which is not the case for MLP. Consequently, MLP was utilized to process the interpolated sensor data for the accuracy studies. Further comparisons are summarized in FIG. 36, and all the aforementioned conclusions remain consistent: the performance of MLP improved with more data but necessitates the same storage space.

Next, the short-term accuracy of the stretchable fabric garment was evaluated for practical applications. The wearer was instructed to perform 1-minute single-joint movements for all joints in three directions, repeated seven times (FIG. 33B). The pose motions resemble those in FIG. 33A with minor deviations in angles and speed. Using the first two rounds for training a MLP model, angles for the subsequent five rounds were predicted. Quantitative results (FIG. 33B) revealed a fourfold increase in error compared to previous assessments. Lower limb accuracy surpasses that of upper limbs, with elbows exhibiting the most significant discrepancies due to extended wire connections and potential O-MoCap inaccuracies. Moreover, a slight increase in error over time suggested possible sensor alignment drift on the body skin.

For the accuracy study in FIG. 33B, the wearer was instructed to rotate single joint only once along X, Y, and Z directions in serial, following the same joint order. This took around one minute, which is defined as one round of 1-min single joint movement. The wearer was instructed to implement seven rounds in series with no break.

(b) Multi-Joint Movement:

For the accuracy study in FIG. 33C, the wearer was instructed to implement a 4-min radio calisthenics motion. The user was instructed to perform a four-minute multi-joint radio calisthenics motion. Quantitative analysis (FIG. 33C) compares the all-summed-angle change rate between single-joint slower motion (FIG. 33A: 3.9°/10 ms, FIG. 33B: 5.9°/10 ms) and multi-joint quicker motions (FIG. 33C: 15.9°/10 ms); all are mean values. The trained calibration model exhibited a two-fold error compared to the single-joint motion model with all other observations remaining consistent. Thus, it can be shown that the stretchable fabric garment described herein can capture human motions very accurately, with accuracy only being affected twofold even as the activity becomes fourfold more complex.

For the accuracy study in FIG. 33D, the wearer was instructed to repeat the 4-min radio calisthenics twice with a 4-min break in between.

For the qualitative sensor drift analysis in FIGS. 33D, 37, and 38, the effects of movement on sensor responses was mitigated using the savgol_filter function, applying it twice with a time window of 18,000 and a mode of nearest. All sensor readings for each joint over a 16-minute period are depicted in FIG. 37. Each sub-figure comprises a left plot showing raw sensor readings with fitted smoothed solid curves, and a right plot illustrating drift-filtered sensor readings. This represents a qualitative separation of the drift effect from the movements. Across various joints, distinct drift trends emerge over time: sensors near the upper arms, shoulders, thigh, and knees exhibit more significant drift than others, with the lower back following; additionally, the right side displays more pronounced drift compared to the left. FIG. 38 illustrates the temporal evolution of drift across space.

The single joint motion dataset in FIG. 33A had 38700 samples (387 seconds) in total; the multi-joint motion dataset in FIG. 33C had 20200 samples (202 seconds) in total; the drift mitigation dataset in FIG. 33D had 19850 samples (198.5 seconds) in total. All these datasets were randomly split in to training, validation, and test sub-datasets with a ratio of 3:1:1, respectively. The seven rounds of 1-min single joint movement dataset in FIG. 33B had 40000 samples (400 seconds) in total with the first 10200 samples (two rounds) as training dataset and following 26900 samples (five rounds) as test dataset. A standard multilayer perceptron (MLP) with five fully connected hidden layers was used, each comprising 100 rectified linear units. Training involved mean-squared error loss, Adam optimizer (learning rate: $1\times10^{-3}$; epsilon: $10^{-4}$), and batch size of 64 in 10,000 iterations. For the qualitative sensor drift analysis in FIG. 33D, FIG. 37, and FIG. 38, the sensor responses were smoothed out due to movements using the function of savgol filter in the Python Scipy package twice with a time window of 18,000 and mode of nearest.

Other Physiological Reactions:

When speed was increased during activities involving increased joint movement and continued for an extended period, other physiological reactions can come into play, such including sweating. A preliminary study on the sensor response for simplified sweat analysis demonstrated that it was influenced by moisture.

To explore this further, the wearer was instructed to repeat the radio calisthenics for another two rounds, with a four-minute pause in between. As shown in FIG. 33D and FIG. 37, sensor readings exhibited continuous drift over sixteen minutes, in addition to frame-to-frame sensor readings corresponding to joint movements. The wearer reported sweating during this procedure, and an ablation test was conducted by soaking five textile sensor units in a simplified solution comprising 9 g NaCl and 1000 mL DI Water. The mean base capacitance from the factory is 100.6 pF. After soaking, the capacitance was 60.4 nF, and after drying it for 24 hours at 60° C. it was 93.9 pF. It was observed that the wet solution changed the capacitance by several orders of magnitude. The drift distribution of all sensors over the body was also evaluated over time. As shown in FIG. 33D and FIG. 38, the drift first occurred near the armpits and knees and spread across the whole body, which coincided with the reported distribution of sweat. Thus, it is believed that the sensor described herein could also be used to monitor sweat. Despite this drift, the calibration model described herein is capable of calibrating the sensor with comparable accuracy, as shown in FIG. 33D. However, it is also important to note that the combined effect of motion and sweat on sensor readings may not be ideal for certain applications, because of the need for extensive data collection under specific conditions.

Pattern Recognition:

Frame-by-frame accurate pose reconstruction is undeniably crucial for certain applications. Additionally, two alternative approaches were also considered to analyzing human behavior. Human motions consist of sequences of poses that characterize specific activities, such as reaching, grasping, and placing objects using our upper limb joints, or walking with varying step widths and over different terrains using our lower limbs. Understanding these patterns over certain periods enables us to discern human activities and enhance performance. Moreover, in addition to frame-by-frame pose reconstruction, analyzing raw sensor values in the frequency domain provides temporal information about frequency and magnitude. This approach focused on extracting data on speed, spatial distribution of joint movements across the entire body, and other relevant information directly. Furthermore, the drift effect can be negligible when only the speed and relative movement range of whole body joints were considered.

As shown in FIG. 39A, to perform an analysis of upper limb pattern recognition, the wearer was instructed to hold a tennis ball in front of the chest (center position) and reach to left and right sides iteratively at specific height levels of upper, middle, and lower positions, as depicted in FIG. 39A and FIG. 40A. To control the speeds (0.6×, 0.8×, 1.0×, 1.2×, and 1.4×) of these motions, the Google Metronome software was used, with the base speed (1.0×) set to 90 beats per minute (BPM). The wearer was instructed to switch between motions every one minute.

As shown in FIG. 39B, in order to perform an analysis of lower limb pattern recognition, the wearer was instructed to walk on a treadmill (M-Gait, Motek, Netherlands) at various speeds, step widths, and slopes. The wearer was instructed to switch between motions every one minute.

(a) Upper Limb Pattern Recognition Analysis:

The wearer was instructed to hold the tennis ball in front of the chest (center position) and reach to left and right sides iteratively at specific height levels of upper, middle, and lower positions, as depicted in FIGS. 39A and 39B and FIGS. 40A and 40B. To control the speeds (0.6×, 0.8×, 1.0×, 1.2×, and 1.4×) of these motions, the Google Metronome software was used, with the base speed (1.0×) set to 90 beats per minute (BPM). FIGS. 39A and 39B shows the frame-by-frame prediction accuracy for the motions. The lower limbs exhibit precise tracking, while the upper body remains within one degree of accuracy, except for the elbows, which exhibit an error of over three degrees. As demonstrated in FIGS. 39A and 39B and FIGS. 40A and 40B, periodic sensor readings were complex in time domain but clean in frequency domain, allowing for the extraction of movement frequency and amplitude and eliminate stationary pose offset. Detailed qualitative analysis visualized in FIGS. 40A and 40B shows that the wearer uses shoulders more than elbows for upper height, the elbows predominantly for middle height, and the elbows slightly more than the shoulders for lower height, at all speeds. Additionally, quantitative evaluations were conducted by classifying motions based on their speeds and heights. Given that motions occur sequentially, a long short-term memory (LSTM) network structure was employed to capture time dependence. The LSTM includes a parameter for look-back steps, defining how many past data points are considered to predict the current pattern in the sequence. At controlled speeds and heights (FIGS. 39A and 39B), the motion heights and speeds can be accurately identified: (1) Heights are precisely classified at speeds of 0.6× and 1.4×, with accuracy decreasing at speeds of 0.8×, 1.0×, and 1.2×. (2) Speeds were accurately classified for middle and lower heights but slightly less so for upper heights. Misclassifications may result from similarities in movement behavior over the sequence time-window; the LSTM's time-window parameter (1 step/10 ms employed here) affected classification. When all recorded data with five different speeds and three heights were shuffled into 15 classes, the trained LSTM model (with one look-back step) satisfactorily identify all classes, as shown in FIGS. 39A and 39B.

(b) Lower Limb Pattern Analysis:

An analysis was conducted for lower limb movements by instructing the wearer to walk on the treadmill at various speeds (0.6×, 0.8, 1.0× equivalent to 1.18 m/s, and 1.2×), step widths (narrow-, narrow, regular, wide, and sway), and slopes (−6°, −3°, 0°, 3°, 6°, and 9°). The accuracy study in FIGS. 39A and 39B reveals precise frame-by-frame reconstruction within all joints, with an error margin of two degrees. Qualitative frequency analysis in FIGS. 39A and 39B and FIGS. 42A and 42B demonstrated that:

(1) The wearer increases the iteration frequencies of lower limb movements to catch up with increased speed overall, with a specific increase in joint angles at 0.8× speed (FIGS. 42A and 42B).

(2) Besides asymmetric gait amplitudes from left to right, the wearer redistributes thigh and knee angles and frequencies to adapt to changes in step widths, using more thigh and low speed for sway and more knee and faster speed for narrower ones, with wide step width as an exception.

(3) For declined slops, the wearer tends to use smaller joint-angle gaits and faster speed, while for inclined slops, the wearer tends to slow down the speed but increase thigh angles and reduce knee angles. Quantitative evaluations of the pattern classification task demonstrate that walking speed levels can be classified with approximately 80% accuracy or higher (FIGS. 39A and 39B), 100% accuracy for step widths (FIG. 39), and above 90% accuracy for slopes (FIGS. 39A and 39B). All 15 classes of shuffled walking gaits can be satisfactorily classified, as depicted in FIGS. 39A and 39B.

The lower body walking analysis follows a similar approach to the upper body analysis. Two standard dataset splitting strategies were compared for joint angle prediction: 1) random splitting over time sequence into training, validation, and test datasets with a ratio of 3:1:1, and 2) splitting along the time sequence with the same ratio, as shown in FIGS. 42A and 42B. In the frequency analysis, additional studies were conducted on speed, step width, and slope, as shown in FIGS. 42A and 42B. During the speed test, the wearer increased their lower limb iteration frequency to catch up the increased walking speed. It is worth noting that the wearer increased their lower limb bending angle to accommodate the speed change from 0.6× to 0.8×, as shown in FIGS. 42A and 42B.

In the step width test, the wearer had higher frequencies for narrow-, narrow, and wide step width compared to regular, because narrow- and narrow step widths have smaller step lengths due to limited limb movements, while wide step widths have smaller step lengths in the heading direction. For the sway, the wearer had larger bending angles and smaller frequencies. It is also interesting that the wearer's left and right lower limb movements show asymmetry, as shown in FIGS. 42A and 42B. In the slope test, the wearer tended to use smaller gaits and faster speed for declined slopes, while the wearer tended to slow down the speed but increase thigh angles and reduce knee angles for inclined slops, as shown in FIGS. 42A and 42B.

The upper body pick and place dataset of 1.0× speed (90 BPM) in FIG. 39A had 24,600 samples; the lower body walking dataset of 10× speed (1.18 m/s) with regular step width in FIG. 39B had 17,750 samples. All these datasets were randomly split into training, validation, and test subdatasets with a ratio of 3:1:1, respectively. The upper body pick and place dataset has fifteen classes of upper position at 0.6×, 0.8×, 1.0×, 1.2×, 1.4× speed (1.0×=90 BPM) with (5740, 5775, 5795, 5990, 5950) samples, center position with (5400, 6225, 5525, 5820, 5850) samples, and lower position with (5700, 5350, 6120, 5890, 5680) samples. The lower body walking dataset has fifteen classes of regular step width at 0.6×, 0.8×, 1.0×, 1.2× speed (1.0×=1.18 m/s), Narrow-, Narrow, Regular, Wide, Sway step width at 1.0× speed, slopes of −6°, −3°, 0°, 3°, 6°, 9° at 1.0× speed and regular step width. Each class had 18200 samples. All the samples are split into training, validation, and test datasets with a ratio of 3:1:1 in the time sequential order. A long short-term memory (LSTM) recurrent neural network with three layers, hidden size of 50, one fully connected layer was used, and a Softmax operator. Training involved cross entropy loss, Adam optimizer (learning rate: $1\times10^{-3}$; epsilon: $10^{-4}$), one look-back step, and batch size of 64 in 1,000 iterations. We used the $fft$ function in the Python Scipy package to implement frequency analysis in FIGS. 39A and 39B, FIGS. 40A and 40B, and FIGS. 42A and 42B.

In addition to frame-by-frame pose reconstruction, multidimensional analysis strategies were used for analyzing human motions based on data from the stretchable fabric garment. The stretchable fabric garment demonstrated accuracy comparable to the O-MoCap system and can be utilized for precise pattern classification. Time-frequency domain analysis of the stretchable fabric garment data provides multifaceted information on human motion.

To evaluate the joint accuracy for upper body pick and place analysis, additional ablation studies were conducted, as illustrated in FIGS. 40A and 40B. Setting the speed at 1.0× (90 BPM), the wearer performed repetitive movements for the upper, middle, and lower heights individually for one minute each, followed by a one-minute session incorporating a mixture of all movement heights at varying combinations. The dataset was systematically ablated to access the generalizability of these movements to alternative settings. When utilizing the entire movement dataset, accuracy was optimal, with angle errors below 2 degrees (except for elbows). However, when attempting to predict mixture movements using solely upper, middle, and lower height data, accuracy notably declined, with angle errors tripling. This decrease in performance can likely be attributed to the transitioning between different height levels, a scenario not adequately represented in the isolated repetitive movements dataset. Conversely, when attempting to predict individual upper, middle, and lower height movements using mixture movement data, accuracy worsened further, with angle errors quadrupling. This decline could be attributed to both the limited sample size within the one-minute mixture movement dataset and the discrepancy in motion distributions among the different datasets. In order to improve accuracy, it is highly desirable to collect data covering a wide range of poses and transition speeds between movements.

Pattern Movement Study:

In addition to predicting joint angles frame by frame, the raw data of the stretchable fabric garment was analyzed in the frequency domain to provide an alternative perspective on human movements.

For the pattern movement study in FIG. 43A, the wearer was instructed to wear the stretchable fabric garment and a smart watch (Apple Watch Series 9) for 24 hours were recorded. The watch recorded heart rate, body temperature, steps, and sleep stages. For the pattern movement study in FIG. 43B, flexible fabric garment data, jump height (Vertec vertical jump tester, JumpUSA), Borg rating of perceived exertion (RPE), and heart rate (EQ02+LifeMonitor, purchased from Equivital) were recorded. The wearer was given time to familiarize themselves to walking on the treadmill at a rate of 1.18 m/s prior to the testing. A vertical squat jump test (maximal jump height among three attempts), as the baseline, was used to identify when the participant was being fatigued. Following the jumps, participant walked on the treadmill at 1.18 m/s and 0° of incline for 5 min, which was repeated after participants were being fatigued. During the motor fatiguing protocol, the inclination angle of the treadmill was increased by 2.5° every five minutes until participants had a Borg rating of perceived exertion (RPE) >17/20 and reached ~85% of their maximum age-predicted heart rate or due to voluntary exhaustion, where they expressed to pause the protocol due to fatigue.

After the conditions were met, the motor fatiguing protocol was paused and participants asked to perform three vertical squat jumps. If participants' vertical jump height was reduced by 20%, the motor fatiguing protocol was terminated. Otherwise, the motor fatiguing protocol resumed from the last incline setting achieved. This dataset was referred to as the "fatigue modeling dataset." For the vision calibration procedure in FIG. 30, the stretchable fabric garment data and a mono-camera video (Apple iPhone 13 Pro) was recorded while the wearer was implementing a 4-min radio calisthenics.

Fast Fourier transformation (FFT) was used to extract the amplitude and frequency of each sensor, which allowed for the analysis of local joint movement amplitude and speed, as shown in FIGS. 40A and 40B. For movements at different heights at the same speed (e.g., 0.6×), the wearer engaged different joint combinations: shoulders more for upper height, elbows more for middle height, and both shoulders and elbows (with a slight emphasis on shoulders) for lower height, as shown in FIGS. 40A and 40B. This trend remained consistent across all speeds, and a similar pattern was observed in both the left and right limbs. It is noteworthy that at different speeds, there was a reallocation of joint movements by the wearer. FIGS. 40A and 40B display the sensor responses at different speeds, which are clearly distinguishable.

Moreover, understanding movement patterns over certain periods allows for the discernment of human activities and enhances performance. The Long Short-Term Memory (LSTM) network structure was introduced to capture the time dependence in motion data. As part of an ablation study, a k-Nearest Neighbors (kNN) model and a Multi-Layer Perceptron (MLP) model were used for the pattern recognition task. These comparisons are presented in FIGS. 41A and 41B. Overall, it was determined that the LSTM model outperformed both the MLP and kNN models, with the MLP model performing better than kNN model. This can primarily be attributed to two factors: 1) similarity between poses during motion across different movement classes, and 2) nonlinearity in the data samples, where kNN averages over the closest two data samples while MLP finds nonlinear interpolation between data samples.

The LSTM uses a "lookback step" parameter to establish time dependence and control the length of historical data considered to predict the current status. The length of the lookback step was investigated, as shown in FIGS. 41A and 41B. With only one lookback step, the accuracy converges to a very high level during the training procedure, with small fluctuations over time, owing to the similarity in short-time movement patterns. With increased length, more time-steps are taken into account, tending to improve accuracy with a slower convergence speed during the training procedure. However, when the length is comparatively long, the accuracy drops because finding a long time-sequence match between test data and training data is nontrivial. This trade-off of the lookback step must be considered. As described herein, a lookback step length of one may be used. However, other lookback step lengths may also be used to improve accuracy.

Pose reconstruction and pattern classification typically require data collection in confined laboratory spaces and extensive manual labeling efforts. Given the diverse nature of human motions, it is essential for the stretchable fabric garment to extend beyond lab environments. To achieve this, the stretchable fabric garment described herein was used for continuous 24-hour monitoring of the wearer's activities. This allowed for capture of their behavior throughout the day, including sleep, morning and evening routines, meals, commute, and work, as illustrated in FIGS. 43A-43C. By analyzing the signals from the right shoulder (RS) and right thigh (RT) sensors over the entire day, it was possible to qualitatively visualize how the wearer utilized their upper and lower limbs. Observations revealed static or quasi-static poses during sleep, increased upper and lower limbs movements during the morning routine, and decreased activity during the evening routine, and steady coupled or iterative upper and lower limbs movements during commute, work and lunch.

The phases of sleep and work+lunch (FIGS. 43A-43C) were explored in more detail. Using an Apple Watch Series 9 as a simplified reference for heart rate and sleep phases, frequent limb changes were observed during "Awake", quasi-static poses during "REM", steady poses with occasional changes during "Core", and steadily increased bending angles during "Deep", with most transitions between sleep phases accompanied by a pose change. It is believed that the interesting observation of increased bending angles during "Deep" might be due to decreased heart rate and lowered body temperature. During work and lunch, the wearer used upper limbs more for office work and lunch while sitting, with lower limbs used more frequently and intensely for commuting and lab work. All these raw sensor readings provide qualitative information about human behaviors, opening up possibilities for wide applications reliant on movement data.

Endurance activities like long-distance walking or hiking can lead to motor fatigue over time. To model this fatigue, the wearer was instructed to walk on a treadmill with gradually increasing incline gradients (FIGS. 43A-43C). During the walking trials, jump heights of the wearer were recorded (FIG. 43) as well as subjective difficulty using Borg rating of perceived exertion (RPE) (FIG. 43), after their heart rate exceeds 85% of their maximum age-predicted values (FIGS. 43A-43C). The fatigue procedure concluded once a reduced jump height of 20% was observed.

During the fatigue procedure, an increased heart rate was observed along with increased inclination and faster heart rate elevation (FIGS. 43A-43C), increased difficulty (FIGS. 43A-43C), and slightly reduced jump height (FIGS. 43A-43C) over time. Based on the data from the stretchable fabric garment, the wearer initially adapted to the procedure with decreased gait frequencies, and steadily increased their gait frequencies as the treadmill inclination angle increased. However, as the fatigue procedure continued, the wearer reduced the gait frequencies with less stability (FIGS. 43A-43C, FIGS. 44A and 44B). Moreover, in conjunction with the wearer's report of sweating during the procedure, sensor unit drift was observed coinciding with the increase in heart rate. The drift (FIGS. 44A and 44B) initially occurred near the armpits and knees, then propagated to the upper and lower limbs, eventually covering the entire body, including the abdomen and back. All these observations are qualitative, indicating the potential for the stretchable fabric garment to be utilized in real-world human behavior analysis applications.

For the fatigue modeling analysis, fast Fourier transformation (FFT) was used to extract the gait frequency information during the fatigue procedure. There were a total of 16 walking trials, and FFT was applied to each trial. The Gaussian curve fit function from Python Scipy was then used to extract the mean frequencies, as illustrated in FIGS. 44A and 44B. As shown in FIGS. 44A and 44B, left pelvis (LP), left thigh (LT), left knee (LK), right knee (RK), right thigh (RT), and right pelvis (RP) data indicate that the wearer initially adapted to the procedure with decreased gait frequencies, and steadily increased them as the treadmill inclination angle increased. However, as the fatigue procedure continued, the wearer reduced the gait frequencies with less stability (FIGS. 43A-43C, FIGS. 44A and 44B). For the overtime drift analysis in FIGS. 44A and 44B, a similar approach was used to FIG. 37. The drift (FIGS. 44A and 44B) initially occurred near the armpits and knees, then propagated to the upper and lower limbs, eventually covering the entire body, including the abdomen and back.

Behavior Analysis:

Equipped with signals or joint information predicted from these signals of the stretchable fabric garment, the goal was to analyze and understand behavior. While manual checking is an option, large foundation models like GPT-4V can also be used to convert signals of the stretchable fabric garment into motion videos which can then be used as inputs to analyze behavior in textual form (see FIG. 37, FIGS. 42A and 42B). This method of analyzing motion can also facilitate the collection of long-term motion data.

Once the sensor signals are received, the sensor signals can be translated into human poses. To leverage large language models (LLMs) tools, the signals of the stretchable fabric garment are converted into RGB videos.

For each motion sequence, approximately ten key frames were selected as input and examples were presented to analyze human motion for single joints, multiple joints, the upper body, and the lower body (FIG. 45).

Raw sensor readings of the stretchable fabric garment can be used for qualitative evaluation, to predict body joint angles on test datasets.

Data Processing:

The stretchable fabric garment data was preprocessed by linearly interpolating sensor values to 100 Hz (60 Hz for vision calibration pipeline) using the function of interp in the Python Numpy package. A visual 3D software (C-Motion Inc., Germantown, MD, USA) was used to extract the joint angles from the optical motion capture system (100 Hz). This process includes labeling markers, data filtering with a 4th order Butterworth low-pass filter (cutoff frequency of 10 Hz) to eliminate marker vibration caused by inertia effects, and joint angle extraction. The stretchable fabric garment data was synchronized with the O-MoCap informed joint angles by visually matching the peaks at the beginning and the end of data collection procedures, the wearer was instructed to squat five times at the beginning and the end of each data collection procedure. For the pattern recognition study, respective motion classes were assigned to each frame of motions (100 Hz). For the vision calibration procedure, video frames were extracted at 60 Hz, and visually synchronized with linearly interpolated stretchable fabric garment data.

Example 3

The design and fabrication of the glove are shown in FIG. 24. Ten capacitive fabric sensors capture the motion of the metacarpophalangeal (MCP) and proximal interphalangeal (PIP) joints of each finger. The distal interphalangeal (DIP) joint is excluded since its motion is coupled to the motion of the PIP joint and it possesses a limited range of motion. Each sensor is directly integrated into the garment. The entire top layer of the glove acts as a common electrical ground for all of the sensors, and the bottom layer serves as one of the two dielectric layers within each sensor, as shown in FIG. 24.

It is noted that the use of a common ground can be used in wearable devices other than gloves as described above. For example, it may be desirable to use a common ground in a wearable device in which the sensor is situated in an area where space for wiring is limited. It may also be desirable to use a common ground in a wearable device having a large surface area where reducing the number of wires can speed up manufacturing and can also reduce the potential for shorting.

The sensors reside on the underside of the glove's top layer, which, when worn, allows each sensor to rest directly on top of the finger. By fabricating the sensors as a part of the garment itself rather than attaching them onto one, the amount of material added is minimized, improving comfort and reducing any mechanical restriction of finger motion.

The layout of the sensors with respect to a single finger is shown in FIG. 24. The sensors were sized to each finger joint in order to accurately capture its motion. To fabricate the glove, the top outer electrode layer and bottom dielectric layers were laser cut first, then the top layer of the glove was looped through the bottom patterned layer of the glove to act as the common ground and first dielectric layer of each sensor. Next, the remaining inner electrode and dielectric layers of each sensor were added to the existing base ground and dielectric.

The breathable adhesive and a heat press were used to adhere all the layers together at 160° C. The glove was then sewn together and the sensors were folded over and adhered to complete the five layer configuration. Wire leads were attached to each electrode within the glove, and one more was connected to the base of the top layer, which is the common ground. These leads were sewn to the base of the glove closest to the wrist so as to not interfere with motion. Following the fabrication of the glove, a cuff was sewn onto the wrist of the glove with a Velcro® fastener, which acts to stabilizer the glove and prevent shifting and slipping of the glove during motion.

To investigate the response of the sensor integrated into a glove, electromechanical characterization of the unit was performed both in free space and with on-hand boundary conditions. The free space characterization of the sensor was performed via a uniaxial tension test using a materials testing system (Instron® 3345) at a rate of 5 mm/s with a 0.2 N preload. Raw capacitance was measured using an LCR meter (E4980AL, Keysight Technologies). The sensors were loaded into the Instron such that their initial gauge length was the distance between the clamps. Strain limiting tabs were placed on either end of the sensors to prevent strain where the grips of the Instron clamped the sensors (shaded regions in FIG. 25 inset). Five sensors were pre-stretched to 100% of their initial gauge length 10 times each before testing to account for the plastic deformation resulting from the initial strain.

FIG. 25 shows the free space electromechanical characterization of the unit sensors in terms of the average normalized change in capacitance versus strain for five fabric sensors. The dimensions of the sensor are shown in the top right inset. The shaded regions of the sensor schematic represent strain-limiting tabs while the remaining portion of the sensor is the gauge area. The vertical axis shows capacitance values normalized with respect to the capacitance of the gauge of each sensor since the strain limiting tabs did not stretch throughout the duration of the uniaxial tension test. The lower strain region ($\varepsilon<10\%$) is highlighted in the top left corner of the graphic. This regime shows the expected operation region of the sensors resulting from the small displacements they will experience on the hand. The normalized change in capacitance as a function of strain for the sensor is shown with an error cloud representing the standard deviation of five samples. Elastomer-based capacitive strain sensors exhibit a linear signal response because the dielectric elastomer is an isotropic material. In contrast, the sensors described in this example have a nonlinear signal response due to the fabrics' anisotropy and inherent changes in the fabric's mesostructure during deformation.

Following free space characterization, further characterization to evaluate the effects of on-hand boundary conditions was performed. In contrast to the previous free-space characterization, strain in the on-hand characterization was attributed to joint bending and the associated pressure points. As such, change in capacitance with respect to joint bend angle was measured rather than strain. Using the fabrication process described above, a sample glove was fabricated with sensors only spanning the pointer finger and thumb. The pointer and thumb were selected because it is assumed that the motion of the pointer finger is representative of the middle, ring, and pinky fingers, while the motion of the thumb is unique. Strain limiting tabs were placed to outline the gauge length of the sensors, as done in the free space characterization. The integrated sensors were pre-stretched to 100% strain 10 times to expose the sensors to the same amount of plastic deformation as the free space sensors.

During data collection, the joint being characterized was moved into the frame of the motion capture system (PhaseSpace, Inc.) at a neutral horizontal (zero-degree) position. The respective joint was bent to the maximum range achievable, held for three seconds, and then returned to the neutral horizontal position. Capacitance was measured with a commercial capacitive sensing breakout board (MPR121; Adafruit) and an Arduino Uno, and the capacitance measurements were synchronized with the motion capture measurements using the Robot Operating System (ROS).

The four subplots in FIG. 26 relate the normalized change in capacitance to joint bending angle ($\theta$) for four different joints. The top row shows the relationship between the bending angle ($\theta$) and normalized change in capacitance for the PIP joints of the thumb and pointer finger while the bottom row represents the same relationship for the MCP joints. In these bound-unit characterizations, the sensors are subjected to pressure effects in addition to axial strain, introducing additional nonlinearities and giving the curves a different shape than the free space experiments. This phenomenon is especially apparent in the sensors on PIP joints, which are subjected to greater compression from bending over the PIP joint and fingertip. The PIP joints are also subjected to larger ranges of $\theta$ than the MCP joints. In general, the change in capacitance imposed by the PIP and MCP joints is much smaller than the change in capacitance observed in free space. A comparison between the observed normalized change in capacitance with respect to bending angle ($\theta$) can be mapped to strain in the regime of 0-10% in FIG. 25.

To map the corresponding change in capacitance of each sensor to joint bend angle for the fully fabricated glove, data correlating these metrics were obtained. The same data collection process discussed above using motion capture was replicated for the fully fabricated glove system to calibrate the relationship between capacitance and ground truth joint angles from the motion capture system. Six trials were taken for each respective joint with the glove being removed and re-worn between trials to account for variations caused by the shifting placement of the glove expected in a practical application. Following the completion of the data trials, angle data representing the flexion of the joints from the neutral axis were extracted and aligned with the capacitance data. The final calibration curve for each sensor on each joint is presented in FIG. 27, where the markers represent the mean and the error cloud represents the standard deviation. The x-axis of each subplot refers to the angle defined in each inset diagram.

The pressure effects can be observed in the sensor response in FIG. 27, especially for the PIP joints, which is congruent with the bound-unit characterization results shown in FIG. 26. Overall, the PIP joint data are similar in both magnitude and trend. The MCP joint data are shown in the bottom row of FIG. 27. The MCP joint of the middle finger has the most prominent protrusion and curvature when flexed, so there is a greater pressure imposed on that sensor at higher bend angles, resulting in a more sharply increasing capacitance value at higher angles. There is a tapering effect for the MCP joint of the pinky at higher joint angles. The pinky MCP joint protrudes the least of any joint on the glove. Therefore, it is not surprising that the resulting change in capacitance is relatively low with a small range.

Following the calibration of the system shown in FIG. 27, further experimentation was performed to determine the accuracy of the glove. Data was acquired to obtain ground truth joint bend angle and a measured joint bend angle was calculated from the capacitance value recorded during motion. These calculated angles were compared to the ground truth angle measurement to assess the accuracy of the glove. Similar to previous modes of data acquisition, a motion capture system (PhaseSpace, Inc.) was used to take another data trial for each joint. The mode of data collection remained the same as the calibration step except that there was no extended hold at the maximum flexion point; instead, there was a constant motion between the zero and maximum joint bend angle. The resulting capacitance measurements were then used to predict the joint angle compared to the ground truth angle from the motion capture system. A nearest-neighbor interpolation model was applied using each of the calibration curves outlined in FIG. 27 as the known relation to calculate the measured angle directly from capacitance. The resulting mean error and standard deviation between the measured and ground truth angles are reported for each joint in Table 2. The thumb MCP joint demonstrates the lowest mean error (3.096 degrees) while the middle PIP joint has the highest mean error (9.486 degrees).

TABLE 2

| Fingers | Joint | Mean Error (degrees) | Standard Deviation (degrees) |
|---|---|---|---|
| Pointer | MCP | 5.399 | 4.326 |
| | PIP | 8.794 | 7.574 |
| Middle | MCP | 4.498 | 3.742 |
| | PIP | 9.486 | 5.679 |
| Ring | MCP | 5.045 | 4.378 |
| | PIP | 5.010 | 4.237 |
| Pinky | MCP | 7.972 | 7.250 |
| | PIP | 7.359 | 4.715 |
| Thumb | MCP | 3.096 | 2.352 |
| | PIP | 5.305 | 3.294 |

FIGS. 28A-28D show the resulting ground truth versus measured angles for the joints with the highest (middle PIP) and second-lowest (middle MCP) reported mean errors. Although the thumb MCP shows the lowest mean error, we plot the middle MCP joint instead because it has a greater range of motion. The ground truth and measured angles for the joints over five flexion cycles are shown as a function of time in seconds in FIGS. 28A and 28C, while in FIGS. 28B and 28D, the measured angle is plotted vs. ground truth angle (the error cloud shows the standard deviation). The one-to-one mapping between the measured and actual angles confirms the accuracy and utility of the sensors in the glove application.

Figure 28:
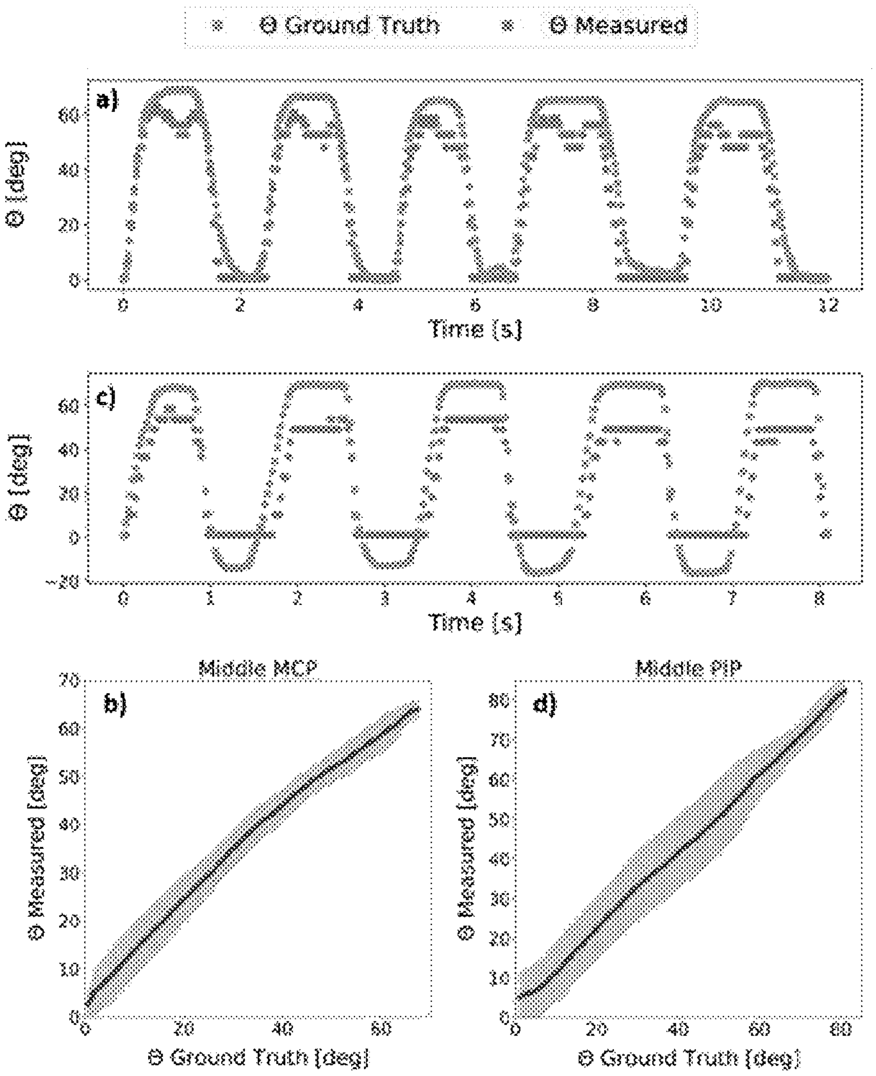

FIGS. 28A and 28C show that the model is under-predicting the maximum value of θ at the peak and is most accurate during dynamic motions, which could be an effect of small amounts of noise present in the sensor when held at a constant value. Further, the calibration step did not account for angles above the defined neutral axis, and thus any motion corresponding to a negative θ is not accurately estimated. It is believed that such negative θ values resulted from the hand not being held directly perpendicular to the plane in which the analysis was performed or from joint hyperextension. It is also noted that the timescale of the data taken for the MCP joint is slightly longer than that of the PIP joint.

Following the quantification of the accuracy of the glove, it was desired to visually present the joint bend angles directly from the glove's capacitance readings. To demonstrate the accuracy and utility of the fabric sensor glove, the pose of a hand in Euclidean free space was dynamically reconstructed. The corresponding segmented images from the real-time reconstruction of the moving hand are shown in FIG. 29. A demonstration of varying gestures was invoked through the use of American Sign Language spelling out "YALE." The top row shows the actual position of the hand while the bottom row shows the reconstruction of the hand with the intended letter from the capacitance values recorded from each sensor during motion. FIG. 29 shows similar matching between the intended position and the reconstruction. Throughout each gesture, the thumb is the most inconsistent when compared to the actual form factor of the hand. Due to the number of degrees of freedom of the thumb and its complex motions, this is an expected result. While this work only characterized the motion of the thumb with respect to a single plane, it provides a basis for greater data acquisition yielding more advanced reconstructions.

As described herein, the characteristics of commonly worn fabric materials were leveraged to introduce a sensing technology explicitly designed for comfort and long-term functionality in real-world human motion monitoring. The materials and sensor designs presented serve as a foundation for skin-interfaced wearable sensing technologies, enabling the creation of sensory garments capable of recording physiological movements with high signal fidelity. The air permeability and water vapor transmission properties of the materials used allow the sensor to be highly breathable, which is crucial for maintaining thermophysiological comfort, a characteristic often neglected in wearable systems. The sensor has not only demonstrated a strain-sensing range, sensitivity, and cyclic performance comparable to other state-of-the art soft strain sensors, but it also allows for easy integration with commercial activewear, retaining a comfortable clothing-like feel. The easy and low-cost implementation of the fabric sensors in an Arduino or other similar environment, as well as the adaptability and customization of the manufacturing process, allows the technology's rapid deployment for the detection of motion of large joints (elbows, hips, and knees) and potentially smaller joints (e.g., finger joints).

As described herein, the capabilities of the stretchable fabric sensor described herein is shown in combination with a fabric sensing glove. The fabrication demonstrated an array of ten capacitive fabric sensors with minimal infrastructure, such that the full natural motion of the hand remains intact. Free-space characterization demonstrates the electromechanical response with respect to uniaxial strain. Bound-unit characterizations performed on the hand for the pointer finger and thumb demonstrated the effects of coupled strain and localized pressure points when the sensor is applied to finger joints. The PIP and MCP joint sensors exhibited monotonic, nonlinear signal responses. On-hand calibration of the whole glove shows a repeatable and recognizable change in capacitance with respect to joint bend angle for all joints. Overall, the system demonstrates the ability to reconstruct joint bend angles with a root mean square error of 7.2 degrees. Finally, the glove was used to reconstruct dynamic hand poses in American Sign Language using the output capacitance values from the sensors.

A relation is also described to predict the sensor's relative change in capacitance as a function of its elastic properties, dielectric properties, and environmental factors such as temperature and humidity. Future work will focus on the characterization of positional drift and accuracy to enable in situ long-term motion monitoring. Adapted versions of the sensors can bridge the gap between skin-sensor interfacing to facilitate the translation of these technological advances to sports medicine and clinical settings addressing a broad spectrum of conditions, including movement disorders, knee osteoarthritis, and running injuries.

As described herein, a stretchable fabric garment encompassing one or more textile sensor units is demonstrated to provide an innovative tool that is accurate, customizable, comfortable (breathable), portable, washable, and affordable, enabling the precise capture of human pose and motion. Various methods are demonstrated for interpreting data of the stretchable fabric garment, allowing for the extraction of multifaceted information to analyze human pose, motion, and behavior. The potential for large-scale applications in tracking long-term human daily activities, evaluating endurance, and building large motion models for behavior understanding and social interaction analysis using a stretchable fabric garment as described herein is shown.

What is claimed is:

1. A wearable electronic device comprising one or more textile sensor units or stretchable electronic sensors for measuring and monitoring capacitive response resulting from the motion of the user, the wearable electronic device comprising:

(a) one or more stretchable electronic sensors and/or textile sensor units, wherein the one or more stretchable electronic sensors and/or one or more textile sensor units comprise, in order:
 a first outer stretchable conductive fabric layer;
 a first inner stretchable dielectric layer;
 an inner stretchable conductive fabric layer;
 a second inner stretchable dielectric layer; and
 a second outer stretchable conductive fabric layer;
 wherein an adhesive layer is sandwiched between each of the layers of the stretchable electronic sensor or textile sensor unit, wherein the adhesive layer comprises an adhesive film, wherein the adhesive film preserves porosity between adjacent layers, and wherein the layers of the stretchable electronic sensor or textile sensor unit are joined together;

(b) a stretchable fabric garment, wherein the one or more stretchable electronic sensors or textile sensor units are attached to or incorporated into the stretchable fabric garment at a location where it is desired to monitor motion of a user.

2. The wearable electronic device according to claim 1, wherein the wearable electronic device further comprises:

(c) stretchable conductive interconnects, wherein the stretchable conductive interconnects extend from each of the one or more stretchable electronic sensors or textile sensor units to a controller; and (d) the controller, wherein the controller to receive signals from the textile sensor unit and measure and monitor capacitive response resulting from the motion of the user.

3. The wearable electronic device of claim 2, wherein the stretchable conductive interconnects are adhered to the stretchable fabric garment using an adhesive.

4. The wearable electronic device of claim 2, wherein the controller transmits information to an external computer.

5. The wearable electronic device of claim 2, further comprising wires connected to a terminal end of each of the stretchable conductive interconnects, wherein the wires connect the stretchable conductive interconnects to the controller.

6. The wearable electronic device according to claim 1, wherein the wearable electronic device is configured to apply compression to the stretchable electronic sensor or textile sensor unit so as to maintain contact between the textile sensor unit and the user's skin.

7. The wearable electronic device of claim 6, wherein the compression is provided by the stretchable fabric garment.

8. The wearable electronic device according to claim 1, wherein the stretchable fabric garment is selected from the group consisting of a glove, a sock, an arm sleeve, a leg sleeve, a bodysuit, a modular knee sleeve, a modular ankle sleeve, a modular elbow sleeve, leggings, tights, a shirt, a unitard, a neck brace, and combinations of one or more of the foregoing.

9. The wearable electronic device according to claim 1, wherein the air permeability of the wearable electronic device and each of the one or more stretchable electronic sensors and/or textile sensor units is greater than 50 $l/m^2$ s, preferably between 50 and 1,000/$m^2$ s and/or wherein the water vapor permeability of the wearable electronic device and each of the one or more stretchable electronic sensors and/or textile sensor units is greater than about 30 $g/m^2$ h, preferably in the range of about 30 to about 150 $g/m^2$ h.

10. The wearable electronic device of claim 1, wherein the inner stretchable conductive fabric layer of each of the one or more stretchable electronic sensors or textile sensor units has a surface area that is less than the first inner stretchable dielectric layer or the second inner stretchable dielectric layer.

11. The wearable electronic device of claim 1, wherein the first outer stretchable conductive fabric layer, the second outer stretchable conductive fabric layer and the inner stretchable conductive fabric layer of each of the one or more stretchable electronic sensors or textile sensor units has a surface resistivity of less than about 10 Ω/sq, more preferably less than about 1 Ω/sq.

12. The wearable electronic device of claim 1, wherein the adhesive layer is a thermoplastic adhesive, preferably wherein the adhesive layer is a thermoplastic film or web, more preferably wherein the thermoplastic film or web is a hot melt adhesive film, more preferably wherein the thermoplastic film or web is selected from the group consisting of ethylene-vinyl acetate, polyolefin-based hot melt adhesives, polyamides, thermoplastic polyurethane, epoxies, polyvinyl acetate, polyimides, polyacrylates, polyesters, and combinations of the foregoing.

13. The wearable electronic device of claim 1, wherein the stretchable fabric garment comprises one of the first inner stretchable dielectric layer or the second inner dielectric layer of the one or more stretchable electronic sensors, whereby the stretchable fabric garment itself forms part of the stretchable electronic sensor.

14. The wearable electronic device of claim 1, wherein the one or more textile sensor units are adhered to the stretchable fabric garment at one or more locations where it is desired to measure motion of a wearer.

15. A method of making the wearable electronic device according to claim 1, wherein the wearable electron device comprising one or more textile sensor units or one or more stretchable electronic sensors, and wherein the wearable electronic device comprises a stretchable fabric garment, the method comprising the steps of:

a) sandwiching an adhesive film between the stretchable fabric garment and the one or more textile sensor units to adhere the one or more textile sensor units to the stretchable fabric garment at locations where it is desired to monitor motion of a user, or alternatively, integrating one or more stretchable electronic sensors into the stretchable fabric garment, wherein the stretchable fabric garment comprises one of the first inner stretchable dielectric layer or the second inner stretchable dielectric layer, wherein the layers are joined together by laminating the layers using at least one of heat or pressure;

(b) attaching stretchable conductive interconnects to the stretchable fabric garment, wherein the stretchable conductive interconnects are attached by sandwiching an adhesive film between the stretchable fabric garment and the stretchable conductive interconnects, where each stretchable conductive interconnect extends from one of the at least one textile sensor unit or stretchable electronic sensor to a controller; and (c) positioning a controller on the stretchable fabric garment, wherein the controller is connected to each of the stretchable conductive interconnects to receive signals from the at least one textile sensor unit or stretchable electronic sensor and measure and monitor capacitive response resulting from the motion of the user.

16. The method according to claim 15, wherein the air permeability of the textile sensor unit or stretchable electronic sensor is greater than 50 $l/m^2$ s, preferably between 50 and 1,000 $l/m^2$ s and/or wherein the water vapor permeability of the textile sensor unit is greater than about 30 $g/m^2$ h, preferably in the range of about 30 to about 150 $g/m^2$ h.

17. The method according to claim 15, further comprising the step of calibrating one or more of the textile sensor units or stretchable electronic sensors of the wearable electronic device.

18. The method according to claim 17, wherein at least one of the one or more textile sensor units or stretchable electronic sensors is calibrated to measure a change in a magnitude of capacitance for a single joint.

19. The method according to claim 17, wherein more than one of the at least one of the one or more textile sensor units or stretchable electronic sensors is calibrated to measure a change in a magnitude of capacitance for multiple joints.

* * * * *